(12) United States Patent
Akiyama

(10) Patent No.: US 7,072,865 B2
(45) Date of Patent: Jul. 4, 2006

(54) BROADCAST RECEIVING METHOD AND APPARATUS AND INFORMATION DISTRIBUTING METHOD AND APPARATUS

(75) Inventor: Koichiro Akiyama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 452 days.

(21) Appl. No.: 09/893,667

(22) Filed: Jun. 29, 2001

(65) Prior Publication Data

US 2002/0001386 A1  Jan. 3, 2002

(30) Foreign Application Priority Data

Jun. 30, 2000  (JP)  ............... 2000-199629

(51) Int. Cl.
  *H04L 9/08*  (2006.01)
  *G06F 17/60*  (2006.01)
(52) U.S. Cl. .................. 705/51; 705/55; 705/57; 705/59; 380/278; 380/279; 380/281; 380/378; 725/31; 725/68; 235/382
(58) Field of Classification Search .............. 705/51, 705/55, 57, 59; 380/278, 279, 2; 725/31, 725/68; 235/382
See application file for complete search history.

(56) References Cited

U.S. PATENT DOCUMENTS 6,373,952 B1 * 10/2002 Akiyama et al. ........... 380/278
6,463,155 B1 * 10/2002 Akiyama et al. ........... 380/278
6,477,649 B1 * 11/2002 Kambayashi et al. ....... 713/200

FOREIGN PATENT DOCUMENTS

JP  11-252529  9/1999
JP  02002300158 A * 10/2002

OTHER PUBLICATIONS

Free Speech and Copyright in Cyberspace: Legal Issues Surrounding the Internet Online Libraries & Microcomputers, vol.: 13, No.: 3, p.: N/A, Mar. 1995.*
Koichiro Akiyama, et al., "Pay Mobile-Audio Broadcasting System", Toshiba Review, vol. 54, No. 7, (1999), pages 38-40.
U.S. Appl. No. 09/893,667, filed Jun. 29, 2001, Akiyama.
U.S. Appl. No. 10/858,377, filed Jun. 2, 2004, Akiyama et al.

* cited by examiner

*Primary Examiner*—James P. Trammell
*Assistant Examiner*—Daniel L. Greene
(74) *Attorney, Agent, or Firm*—Oblon, Spivak, McClelland, Maier & Neustadt, P.C.

(57) ABSTRACT

A broadcast receiving method comprises storing first control information in a storage device, the first control information containing information unique to a receiver and required for the receiver to select broadcasted and encrypted contents information, and receiving second control information with a receiver via a bi-directional communications channel, the second control information being for updating at least some contents of the first control information, updating the first control information in the storage device on the basis of the second control information, receiving broadcasted key information independent from the receiver and required to decrypt the contents information, and selecting and decrypting the encrypted contents information based on the key information and updated first control information.

9 Claims, 40 Drawing Sheets

Channel contract information
| 1 | 2 | 3 | 4 | 5 | 6 | 7 | 8 |
|---|---|---|---|---|---|---|---|
| 0 | 1 | 0 | 0 | 1 | 0 | 1 | 1 |
FIG. 2
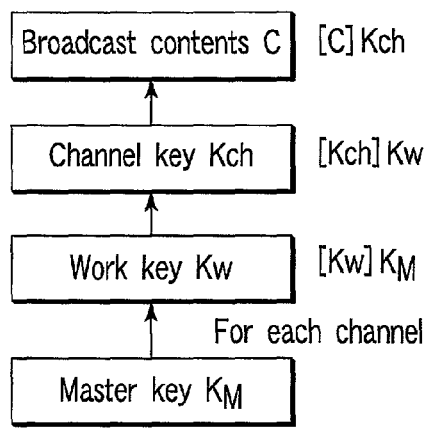
FIG. 3
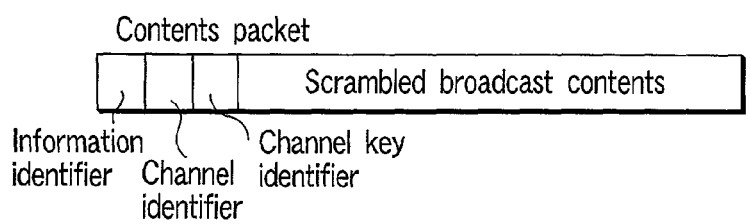
FIG. 4
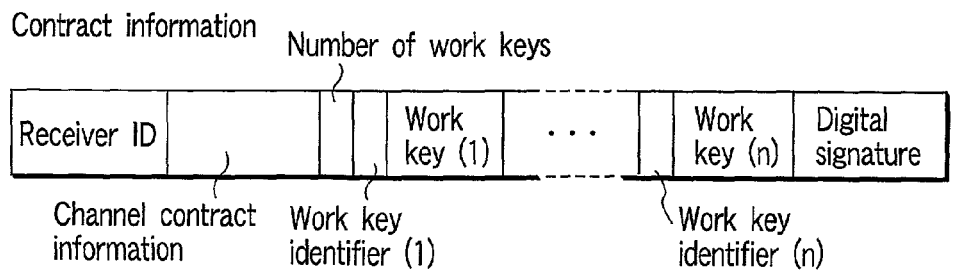
FIG. 5

Channel contract information

Individual control packet

Common control packet

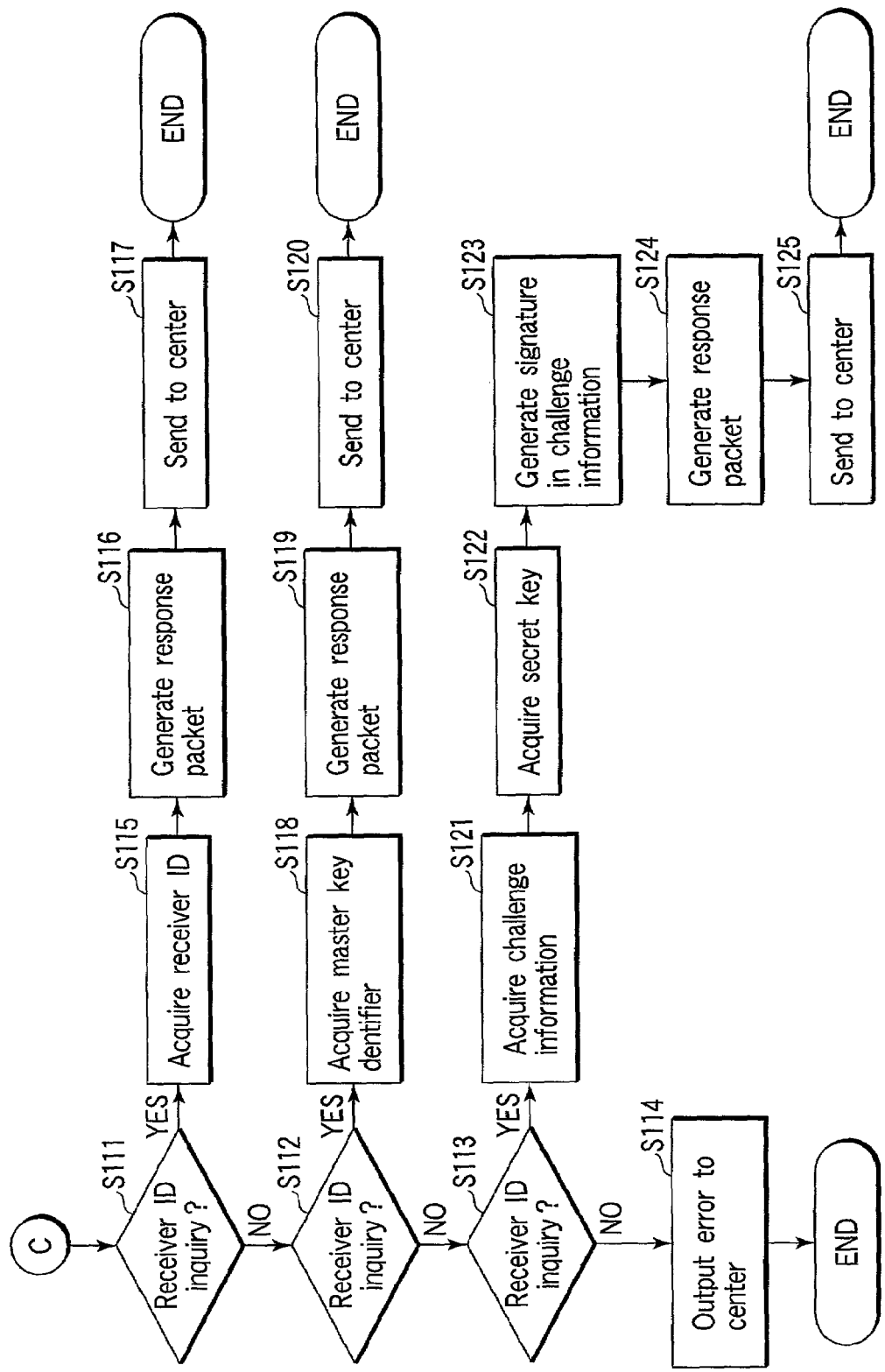
F I G. 20

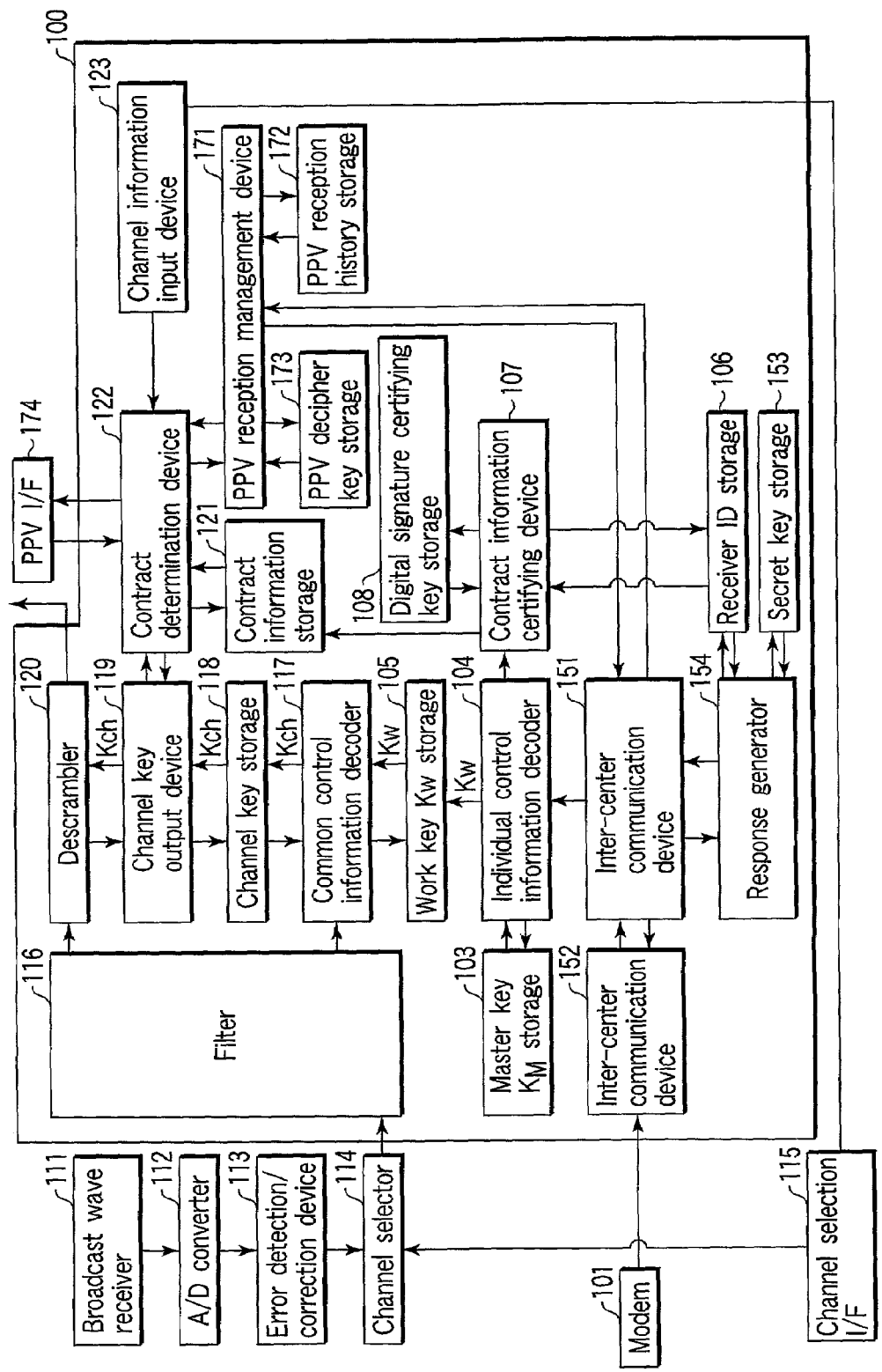
F I G. 21

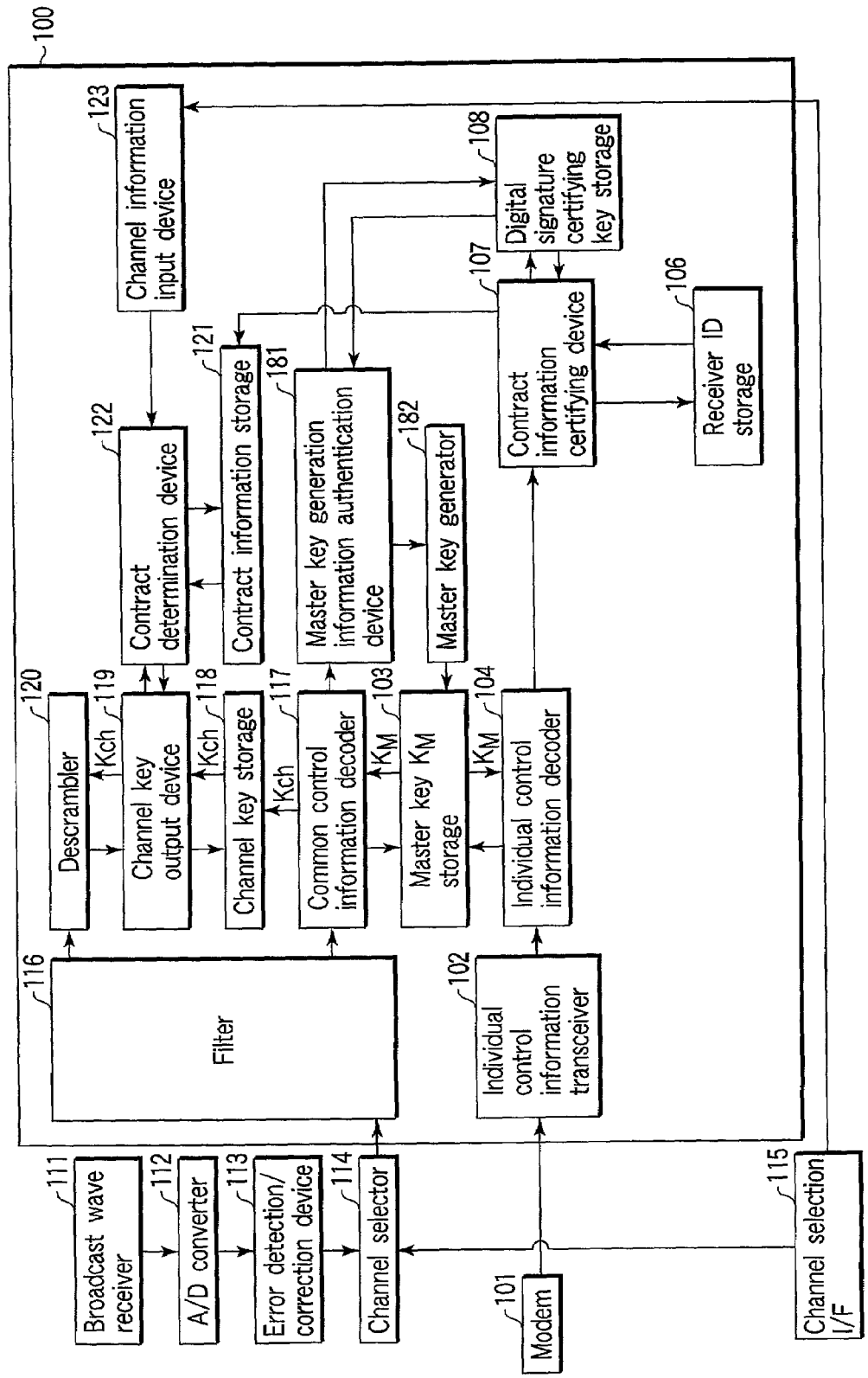
F I G. 24

Contract information

Subscriber data

| Subscriber ID | Receiver ID | Master key identifier | Master key | Channel contract information | Dial number |
|---|---|---|---|---|---|

Transmission completion flag

F I G. 31

Channel key data

| Subscriber ID | Receiver ID | Master key identifier | Master key | Old channel contract information | New channel contract information | Dial number |
|---|---|---|---|---|---|---|

Transmission completion flag

Audiovisual validity flag

F I G. 39

Information identifier

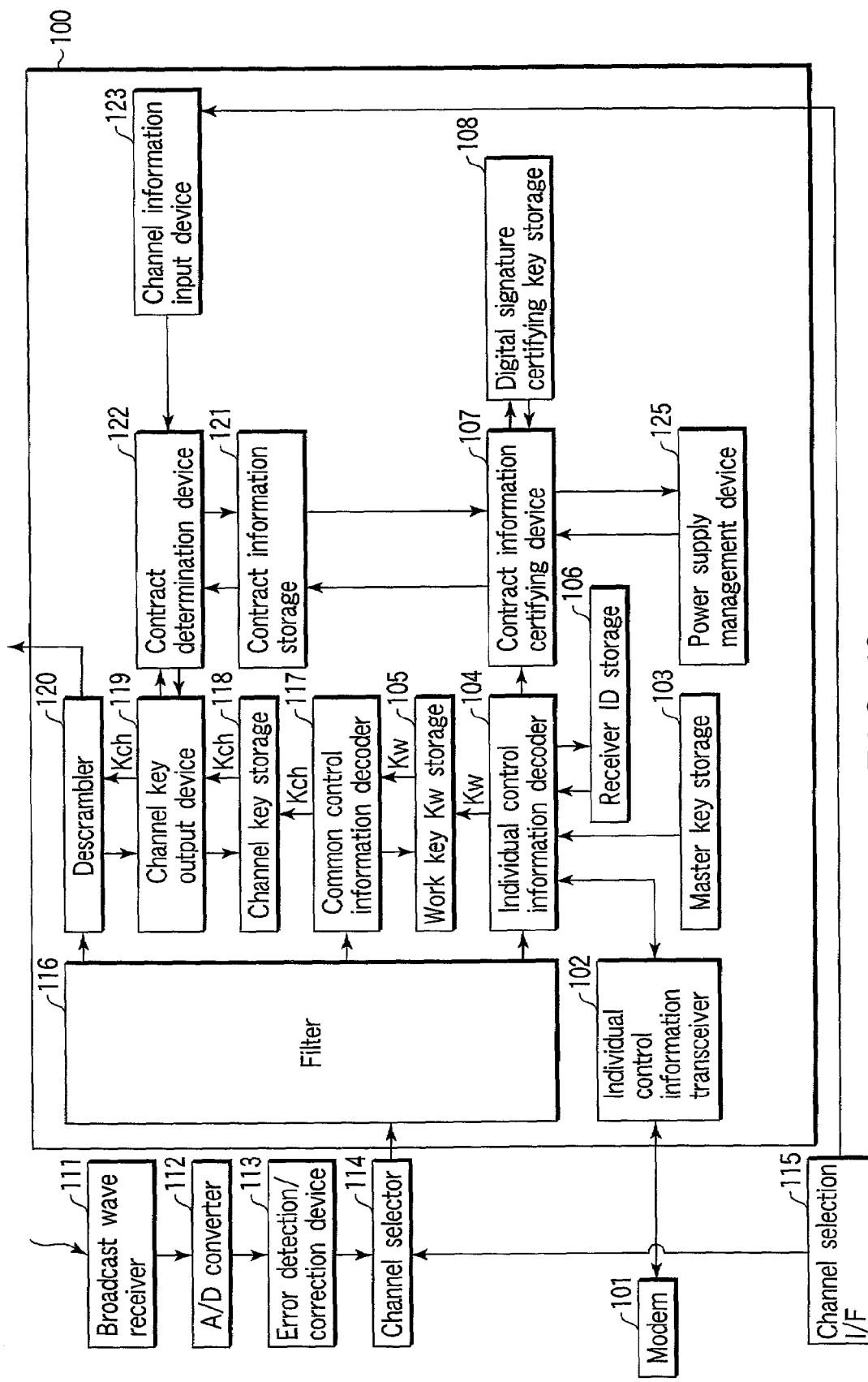
F I G. 46

Individual control packet

Information identifier

Command segment

Number of receiver IDs

Command identifier

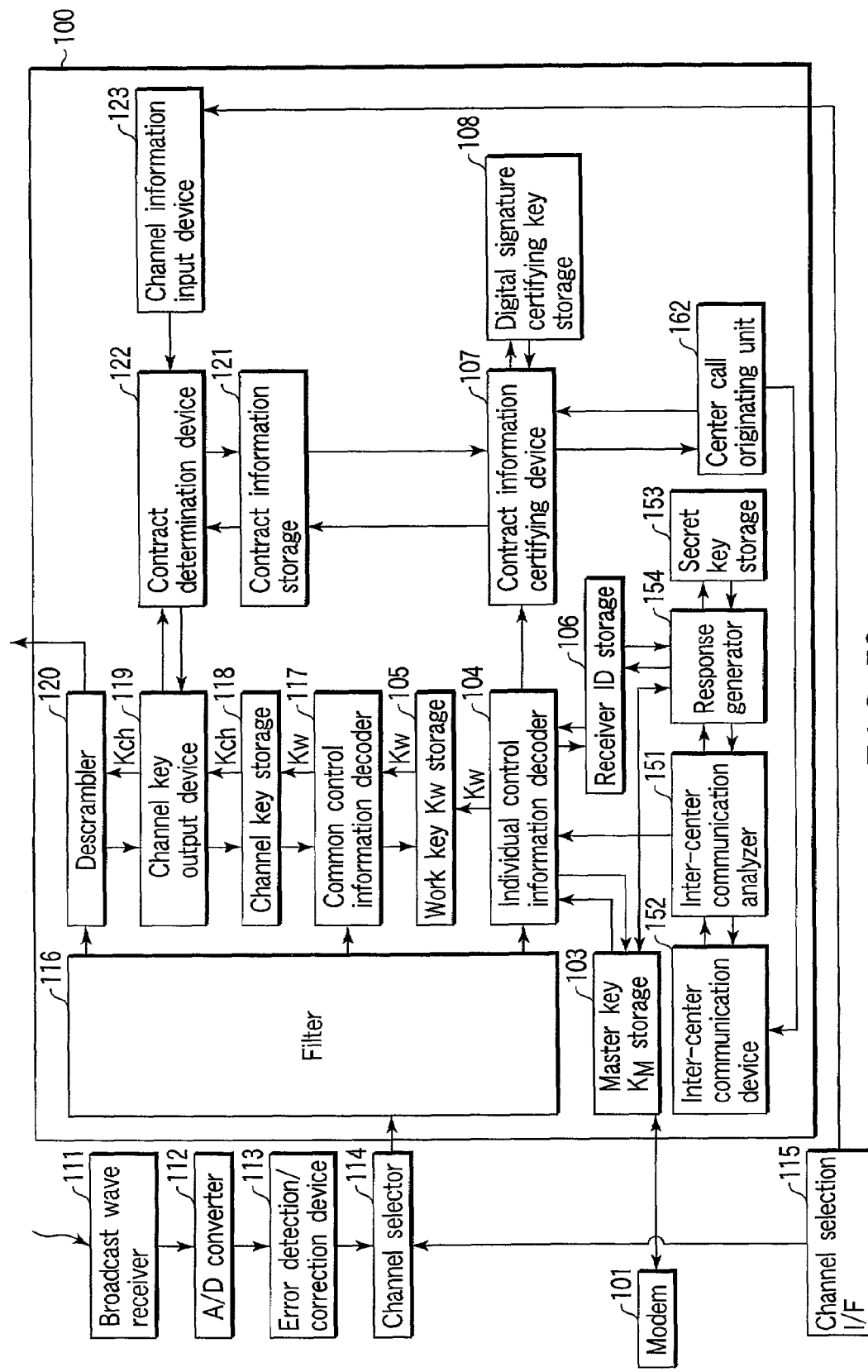
F I G. 50

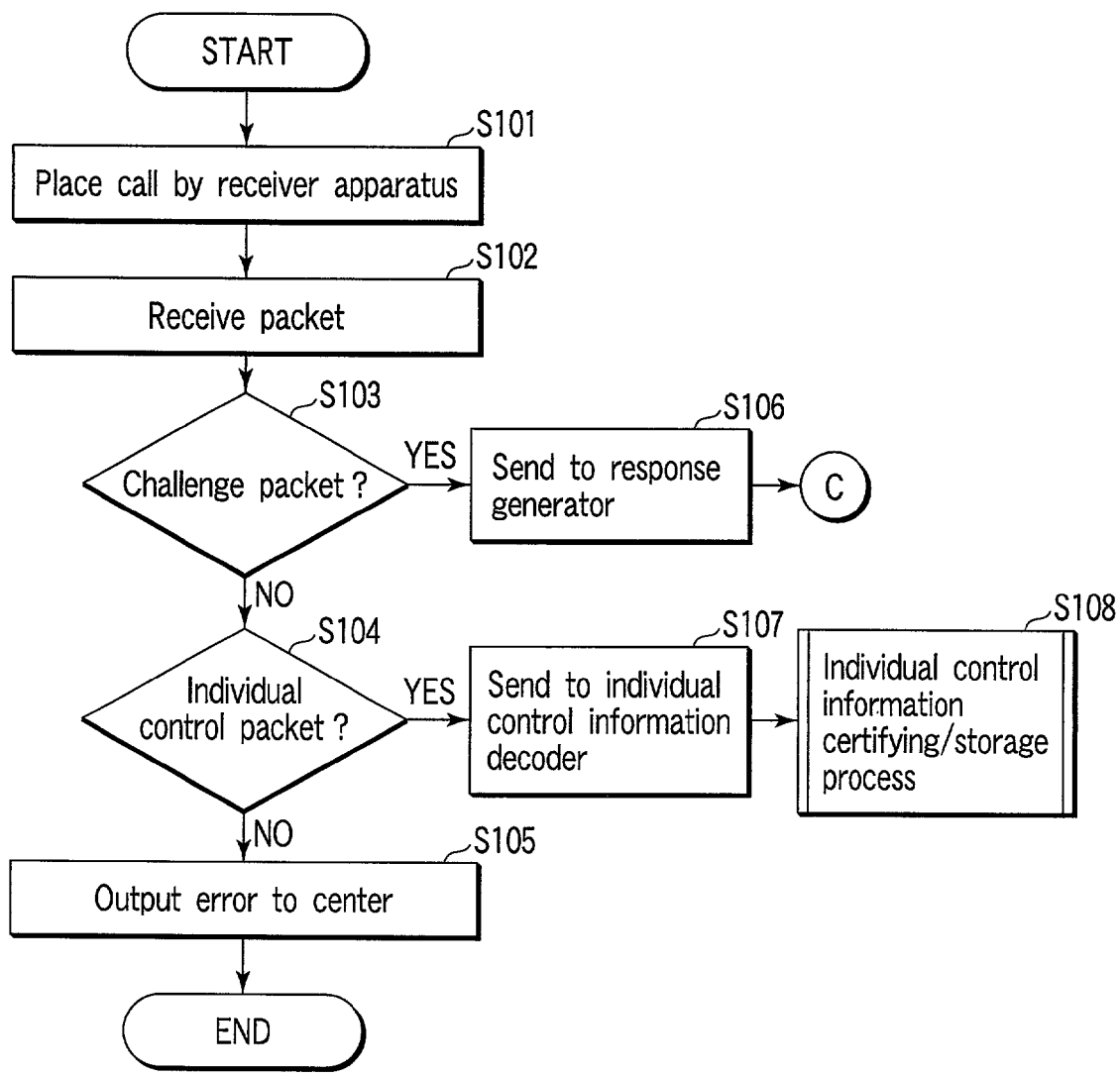
F I G. 56

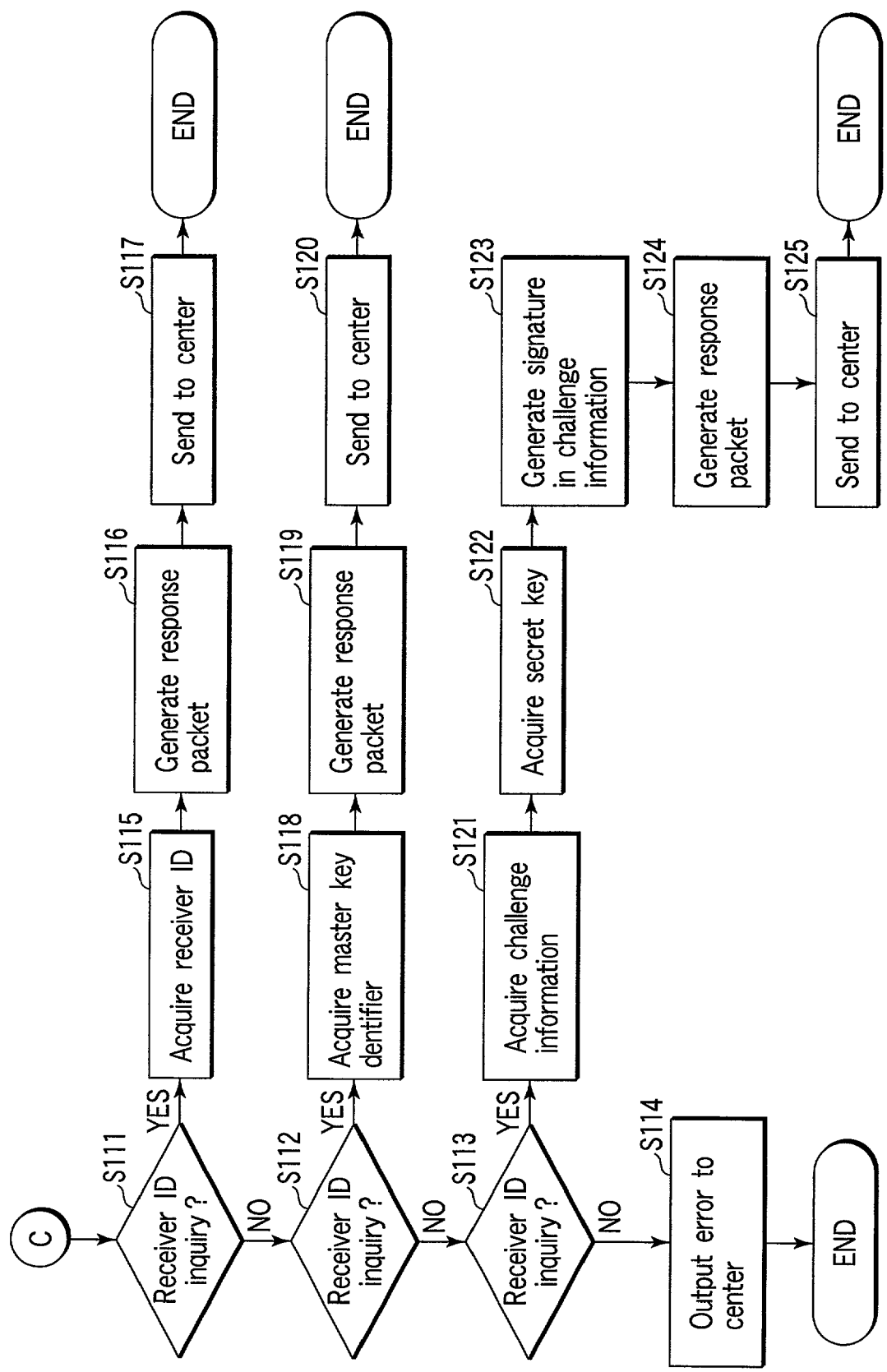
F I G. 57

BROADCAST RECEIVING METHOD AND APPARATUS AND INFORMATION DISTRIBUTING METHOD AND APPARATUS

CROSS-REFERENCE TO RELATED APPLICATIONS

This application is based upon and claims the benefit of priority from the prior Japanese Patent Application No. 2000-199629, filed Jun. 30, 2000, the entire contents of which are incorporated herein by reference.

BACKGROUND OF THE INVENTION

1. Field of the Invention

The present invention relates to, e.g., a pay broadcast system.

2. Description of the Related Art

As digitization is applied not only to communication satellite (CS) but also to cable TV and ground broadcast, digital broadcast is expected to provide advanced services and to play an important role in broadcast services.

The great feature of digital broadcast is to be able to largely increase the number of broadcast channels compared to analog broadcast, since the use efficiency of frequencies required to send programs can be improved due to introduction of information compression techniques. Furthermore, since a high-level error correction technique can be applied, high-quality, uniform services can be provided.

As a result of digitization, not only conventional video & audio broadcast but also text & data broadcast (data broadcast) are available. For example, news can be broadcasted as text data, and PC software can be delivered during broadcast. Systems for providing such services have appeared successively.

As receiver apparatuses, not only conventional floor models but also mobile receiver apparatuses such as a portable information terminal that can be used even when the user is on the move, a mobile terminal which is premised on use in an automobile and is equipped in the automobile have appeared.

In order to implement pay broadcast services in such system, customer management according to the reception term and contract contents must be made (for example, encrypted broadcast contents are sent, and are descrambled based on the contract contents). The customer management according to the reception term allows the user to watch programs on contract channels within the reception term specified by payment of a predetermined fee.

Key information used to descramble or decrypt in a receiver apparatus must be reliably provided to only right audience (according to the contract channels and reception term) upon preventing wrong audience.

To realize this, conventionally, a master key is prepared in each broadcast receiver apparatus, and contract information indicating a contract form that includes work keys of contract channels, viewable channel information, and the like is encrypted using the master key and is sent via a broadcast wave. Note that the work key is unique to a channel, and can decrypt a channel key of that channel, which is sent as encrypted data. The channel key is used to descramble (decrypt) the scrambled (encrypted) broadcast contents.

In such conditional access system, the work keys and contract information, which are encrypted using the master key (set for each receiver apparatus) correspond to conditional access information unique to the receiver apparatus, and channel keys encrypted using the work keys (common to a plurality of receiver apparatuses) correspond to common conditional access information.

Conventionally, even unique conditional access information is sent via a broadcast wave (which is unsuitable for sending individual information). Information for an individual subscriber unnecessarily occupies the transmission band since it is sent to all subscribers, and must be repetitively sent during a required period since information indicating whether or not that subscriber received the information cannot be obtained.

Furthermore, the work keys contained in individual conditional access information are set for each reception term (normally, one month), and a broadcast station must individually send those keys every reception term, and must repetitively send them for a predetermined period since a contract management center cannot detect if each receiver apparatus actually received that information. For this reason, individual conditional access information currently accounts for a large part of conditional access information.

On the other hand, CS broadcast or the like provides a PPV (pay per view) service that charges a user a fee for a program that he or she watched. In order to allow a subscriber to watch a desired program immediately after audiovisual operation, the subscriber need not directly contact a contract management center upon audiovisual operation, but a reception history is stored in a receiver apparatus, and the center periodically repossesses the reception history. However, with such arrangement, if the subscriber knowingly or accidentally disconnects a public telephone network to which the center established connection to repossess the reception history, the center cannot repossess the reception history.

BRIEF SUMMARY OF THE INVENTION

It is an object of the present invention to provide a broadcast receiving method, which can provide secure pay broadcast services, which can prevent wrong audience without pressing the broadcast band even when the number of subscribers increases, a broadcast receiving apparatus using the method, an information distributing method, and an information distributing apparatus using the distributing method.

The first aspect of the present invention provides a broadcast receiving method comprising: storing first control information in a storage device, the first control information containing information unique to a receiver and required for the receiver to select broadcasted encrypted contents information; receiving second control information with the receiver via a bi-directional communications channel, the second control information being for updating at least some contents of the first control information; updating the first control information in the storage device on the basis of the second control information; receiving broadcasted key information independent from the receiver and required to decrypt the contents information; and selecting and decrypting the contents information based on the key information and updated first control information.

The second aspect of the present invention provides a storing first control information in a storage device, the first control information containing information unique to a receiver and required for the receiver to select broadcasted encrypted contents information; receiving second control information with the receiver via a bi-directional communications channel, the second control information being for updating at least some contents of the first control information; updating at least some contents of the first control information in the storage device based the second control information; receiving broadcasted key information independent from the receiver and required to decrypt the contents information; and decrypting the contents information based on the key information and the control information the at least some of which are updated.

The third aspect of the present invention provides a broadcast receiving apparatus communicating with a first distributor which performs bi-directional communications, and a second distributor which performs broadcast transmission, comprising: a storage device configured to store first control information containing unique information required to select encrypted contents information broadcasted by the second distributor; a first receiver configured to receive second control information distributed by the first distributor via the bi-directional communications, the second control information being used to update at least some contents of the control information stored in the storage device; an update device configured to update the first control information in the storage device based on the second control information; a second receiver configured to receive key information broadcasted by the second distributor, the key information being required to decrypt the contents information and common to all broadcast receivers; and a selection/decrypting device configured to select and decrypt the contents information based on the first control information and the key information.

The fourth aspect of the present invention provides a broadcast receiving apparatus communicating with a first distributor which performs bi-directional communications, and a second distributor which performs broadcast transmission, comprising: a storage device configured to store first control information containing unique information required to decrypt encrypted contents information broadcasted by the second distributor; a first receiver configured to receive second control information distributed by the first distributor in the bi-directional communications, the second control information being used to update at least some contents of the first control information stored in the storage device; an update device configured to update the first control information in the storage device based on the second control information; a second receiver configured to receive key information broadcasted by the second distributor, the key information being required to decrypt the contents information and common to all broadcast receivers; and a decrypting device configured to decrypt the contents information based on the first control information and the key information.

The fifth aspect of the present invention provides a method of distributing information between a distributor and at least one receiver, comprising: receiving broadcasted and encrypted contents information with the receiver; and distributing first control information between the receiver and distributor via a bi-directional communications channel, the first control information being used to update at least some contents of second control information stored in the receiver, and the second control information containing information unique to the receiver and required for the receiver to decrypt the contents information.

The sixth aspect of the present invention provides a method of distributing information between a distributor and at least one receiver, comprising: receiving broadcasted encrypted contents information; and broadcasting key information to the receiver, the key information being independent from the receiver and being required for the receiver to decrypt the contents information, the contents information being decrypted based on the key information and decrypt control information containing information unique to the receiver and required to decrypt the contents information.

The seventh aspect of the present invention provides an information distributing apparatus communicating with a receiver, comprising: a distributor configured to distribute individual control information for updating at least some contents of decrypt control information to the receiver, the receiver decrypting the contents information based on decrypt control information including information unique to the receiver and key information independent from the receiver and required for the receiver to decrypt the contents information.

The eighth aspect of the present invention provides an information distributing apparatus communicating with a receiver, comprising: a distributor configured to distribute individual control information for updating at least some contents of decrypt control information to the receiver, the receiver decrypting the contents information based on decrypt control information including information unique to the receiver and key information independent from the receiver and required for the receiver to decrypt the contents information.

The ninth aspect of the present invention provides a method for distributing information to a receiver comprising: broadcasting key information to the receiver, the key information being independent from the receiver and required to decrypt encrypted contents information, the receiver selecting and decrypting the contents information based on first control information and the key information, the first control information containing information unique to the receiver and required to select the contents information; distributing second control information to the receiver via a bi-directional communications channel, the second control information being for updating at least some contents of the first control information in the receiver; and broadcasting the individual control information if receipt of the individual control information is not confirmed by the receiver.

The tenth aspect of the present invention provides a method for distributing information to a receiver comprising: broadcasting key information to the receiver, the key information being independent from the receiver and required to decrypt encrypted contents information, the receiver decrypting the contents information based on decrypt control information and the key information, the decrypt control information containing information unique to the receiver and required to select the contents information; distributing individual control information to the receiver via a bi-directional communications channel, the individual control information being for updating at least some contents of the decrypt control information stored in the receiver; and broadcasting the individual control information when receipt of the individual control information cannot be confirmed by the receiver.

The eleventh aspect of the present invention provides an apparatus distributing information to a receiver comprising: a first distributor configured to distribute broadcasted key information independent from the receiver and required to decrypt encrypted contents information; a second distributor configured to distribute first control information to the receiver via a bi-directional communications channel, the first control information being for updating at least some contents of second control information stored in the receiver and containing information unique to the receiver and required to select the contents information; and a third distributor configured to broadcast the first control information when receipt of the first control information is not confirmed by the receiver as a destination of the individual control information.

The thirteenth aspect of the present invention provides an apparatus distributing information to a receiver comprising: a first distributor configured to broadcast key information independent from the receiver and required to decrypt encrypted contents information; a second distributor configured to distribute first control information to the receiver via a bi-directional communications channel, the first control information being for updating at least some contents of second control information stored in the receiver, the second control information containing information unique to the receiver and required to decrypt the encrypted contents information; and a third distributor configured to broadcast the first control information when receipt of the first control information is not confirmed by the receiver as a destination of the individual control information.

The fourteenth aspect of the present invention provides an information receiving apparatus which communicates with first and second distributors, comprising: a storage device configured to store first control information required to decrypt broadcasted and encrypted contents information; a first receiver configured to receive second control information distributed from the first distributor via a bi-directional communication channel, the second control information being used to update at least some contents of the first control information stored in the storage device or broadcasted by the first distributor; a transmitter configured to transmit receipt of the information when the first receiver receives the second control information via the bi-directional communications channel; an update device configured to update the second control information in the storage device based on the second control information received by the first receiver; and a second receiver configured to receive key information broadcasted by the second distributor, the key information being required to decrypt the encrypted contents information and common to a plurality of broadcast receiving apparatuses, wherein the contents information is decrypted based on the decrypt control information stored in the storage device and the key information received by the second receiver.

BRIEF DESCRIPTION OF THE SEVERAL VIEWS OF THE DRAWING

FIG. 2 shows an example of channel contract information;

FIG. 3 shows an example of the key configuration used in a conditional access system;

FIG. 4 shows an example of the data format of a contents packet;

FIG. 5 shows an example of contract information;

FIG. 20 is a flow chart for explaining the reception processing operation of an individual control packet;

FIG. 21 is a block diagram showing an example of the arrangement of principal part of a broadcast receiver apparatus according to the third embodiment of the present invention;

FIG. 24 is a block diagram of a broadcast receiver apparatus according to the fourth embodiment of the present invention;

FIG. 31 shows an example of subscriber data stored in a subscriber database shown in FIG. 29;

FIG. 39 shows an example of subscriber data used in an information distributor apparatus of individual control information (packet) according to the seventh embodiment of the present invention;

FIG. 46 is a block diagram of a broadcast receiver apparatus according to the 10th embodiment of the present invention;

FIG. 50 is a block diagram showing an example of the arrangement of principal part of a broadcast receiver apparatus according to the 11th embodiment of the present invention;

FIG. 56 is a flow chart showing the processing operation after the receiver apparatus receives a call originating command; and FIG. 57 is a flow chart showing the processing operation after the receiver apparatus receives a call originating command.

DETAILED DESCRIPTION OF THE INVENTION

The embodiments of the present invention will be described hereinafter with reference to the accompanying drawings.

Terms will be defined first. An action that encrypts contents and permits only limited persons (to be referred to as right contractors, subscribers, or users hereinafter) who have made a predetermined contract/subscription procedure or the like to view broadcast contents upon receiving broadcast contents of one or a plurality of channels is generally called conditional access. A system that implements conditional access is generally called a conditional access system. In this embodiment, for example, a conditional access system for pay broadcast services will be exemplified.

Information that describes contract states for respective channels for each subscriber to implement conditional access is called channel contract information. For example, channel numbers are assigned to respective channels, and a bit stream which represents a channel contract state depending on whether or not a bit corresponding to a channel number is "1", as shown in FIG. 2, is the channel contract information. In FIG. 2, contracts for the second, fifth, seventh, and eighth channels have been entered into.

Figure 6:
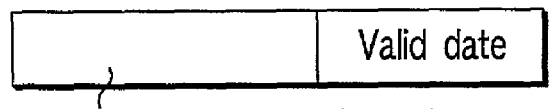
FIG. 6 shows another example of channel contract information.

Furthermore, channel contract information may be formed by appending, to the channel contract information shown in FIG. 2, information such as an expiration date of the channel contract information or the like, which limits the channel contract information, and information that expresses the contract form of a subscriber in more detail, as shown in FIG. 6.

Individual subscribers of the pay broadcast service according to this embodiment have different contract contents (channels they want to watch, periods for which they watch programs, and the like). More specifically, in order to allow conditional access of a broadcast receiver apparatus possessed by such subscriber, control information of the broadcast receiver apparatus based on different contract contents (use conditions) for respective subscribers must be individually distributed. Such control information is called individual control information. Note that the individual control information is also called an individual control packet, since it is distributed in a packet format. The individual control packet corresponds to an EMM (Entitlement Management Message) or EMM-S (Entitlement Management Message for S-band) of the existing CS broadcast standards (reference: "BS digital broadcast conditional access system specifications ARIB STD-B25" (Association of Radio Industries and Businesses)).

Broadcast contents information (to be also simply referred to as contents hereinafter) is encrypted by key information which differs for each channel, i.e., a "channel key" in this embodiment. Hence, in order to allow each subscriber to enjoy contents of a desired (contracted) channel using a broadcast receiver apparatus each subscriber possesses, control information common to all subscribers (all broadcast receiver apparatuses possessed by subscribers) like key information depending on contents information must also be distributed. Such control information is called common control information. Note that the common control information is called a common control packet since it is also distributed in a packet format. This common control packet corresponds to ECM (Entitlement Control Message) or ECM-S (Entitlement Control Message for S-band) of the existing CS broadcast standards (reference: "BS digital broadcast conditional access system specifications ARIB STD-B25" (Association of Radio Industries and Businesses)).

When the broadcast receiver apparatus of each subscriber reliably receives the individual control information and common control information, the subscriber can watch contents according to the contract contents of the subscriber.

An arrangement (mainly, hardware) that implements the conditional access system inside the receiver apparatus will be referred to as a conditional access device or conditional access chip throughout the embodiments to be described below. The conditional access chip assumes a tamper free structure immune to external read, write, and change with respect to its internal memory and hardware arrangement, since it includes secret information for conditional access.

In the following description, a process for decrypting encrypted contents information using a channel key is also called descrambling.

The conditional access system to be described in the following embodiments mainly comprises a broadcast receiver apparatus possessed by each service subscriber, and an information distributor apparatus (also called a contract management apparatus) as a contract management center (to be also simply referred to as a center hereinafter) that distributes individual control information, common control information, encrypted contents information, and the like to the broadcast receiver apparatus.

In the following embodiments, a function associated with a bi-directional communication corresponds to a transceiver 102 and modem 101. However, since the present invention is directed to the conditional access device, a detailed arrangement and description of a bi-directional communication function device will be omitted. For example, it may be connected to the transceiver 102 via a predetermined connection cable to build a bi-directional communication function device.

(First Embodiment)

The first embodiment of the present invention will be described below.

The first embodiment is directed to a conditional access system when each receiver apparatus has an individual master key. Since such conditional access system must periodically and individually transmit encrypted control information containing channel contract information and the like to each receiver apparatus, the transmission volume of conditional access becomes large. However, since such system can assure high security (e.g., a narrow affected range upon breaking of the master key), CS broadcast and the like conventionally adopt such system. However, the volume of control information to be sent to each receiver apparatus becomes huge with increasing number of subscribers in recent years, and this embodiment provides solution for such problem.

The conditional access system adopts a key configuration, as shown in, e.g., FIG. 3. More specifically, a work key Kw which is specified for each channel and is common to all receiver apparatuses is encrypted using an individual master key KM, and the encrypted key is sent. Furthermore, a channel key Kch is encrypted using that work key Kw, and the encrypted key is sent. Since broadcast contents are encrypted by a conventional cryptography technique, they can be decrypted using that channel key. Note that the channel key must normally be changed at short periods (e.g., 10 min) to prevent cryptanalysis. If an individual master key is used to send this channel key, the transmission volume becomes huge. For this reason, a work key common to all receiver apparatuses must be used. Since it is dangerous to use an identical work key for several months, that key must also be changed, and is encrypted using an individual master key. Hence, even when the master key is known, free subscription can be prevented by changing the work key.

Data to be received by the broadcast receiver apparatus via a broadcast wave in the conditional access system of this embodiment include two different packets, i.e., a contents packet and common control packet. The contents packet has a packet format shown in FIG. 4, and includes an information identifier (packet identifier), channel identifier, channel key identifier, and scrambled broadcast contents (encrypted using a channel key).

The information identifier indicates the type of packet of interest, and describes an identifier indicating the contents packet. The channel identifier indicates the channel of the broadcast contents of interest. The channel key identifier indicates the identifier of a channel key used to decrypt the broadcast contents of interest. The broadcast contents are raw program data, and are encrypted using a channel key Kch designated by the channel key identifier. Note that all these pieces of information in this embodiment are fixed-length data.

Figure 8:
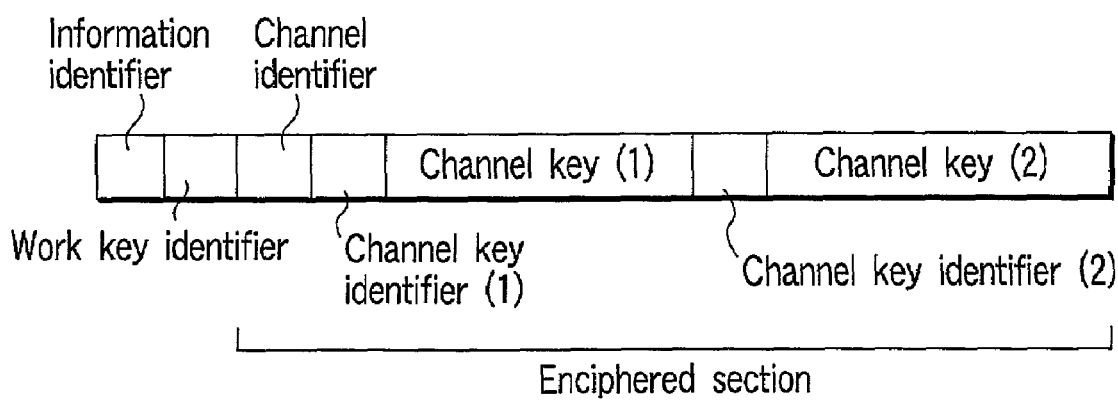
FIG. 8 shows an example of the data format of a common control packet.

The common control packet has a packet format shown in FIG. 8, and includes an information identifier, work key identifier, channel identifier, channel key identifier (1), channel key (1), channel key identifier (2), and channel key (2). The channel identifier to channel key (2) are encrypted using a work key designated by the work key identifier.

The information identifier indicates the type of packet of interest, and describes an identifier indicating the common control packet. The channel identifier indicates a channel of the common control packet of interest. The work key identifier indicates a work key Kw used to encrypt the common control packet of interest. The channel key identifier is an identifier of the channel key which follows, and the channel key is that used to encrypt the broadcast contents of the channel designated by the channel identifier.

The reason why two pairs of channel identifiers and channel keys are contained is to send the current channel key and the next channel key at the same time so as to smoothly switch the channel key, since the channel key is changed at relatively short periods. Of course, whether or not two pairs of channel identifiers and channel keys are sent does not directly influence the present invention, and a pair of channel identifier and channel key may be sent.

Figure 7:
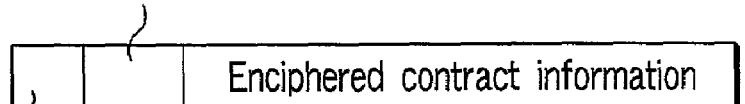
FIG. 7 shows an example of the data format of an individual control packet.

The broadcast receiver apparatus according to this embodiment receives individual control information from a public telephone network via a modem. The individual control information is sent in a packet format as in the common control information. The individual control packet is comprised of an information identifier, master key identifier, and encrypted contract information, as shown in FIG. 7. The information identifier indicates the type of packet of interest, and describes an identifier indicating the individual control packet. The master key identifier is identification information of a master key that can decrypt the encrypted contract information, and describes the master key identifier of the receiver apparatus which received the packet of interest, if it is exchanged normally.

The contract information is made up of, e.g., a receiver ID, channel contract information, the number n of work keys, n pairs of work keys and work key identifiers, and digital signature, as shown in FIG. 5. The receiver ID is the identifier of a receiver apparatus which is to receive the contract information of interest, and stores an ID which matches the receiver ID stored inside the conditional access device in the receiver, if it is exchanged normally. The channel contract information indicates the contract state of the receiver apparatus having that receiver ID, and is, for example, data with the format shown in FIG. 2. Work key identifier i is the identifier of work key i which follows. In this embodiment, since a work key is set for each channel, pairs of work keys and work key identifiers are set in correspondence with the channel contract information. The digital signature is information used to check the authenticity of the contract information, and is used to prevent tampering. Note that since all these pieces of information are fixed-length data in this embodiment, a description of an algorithm for extracting each information from the received packet will be omitted.

Figure 1:
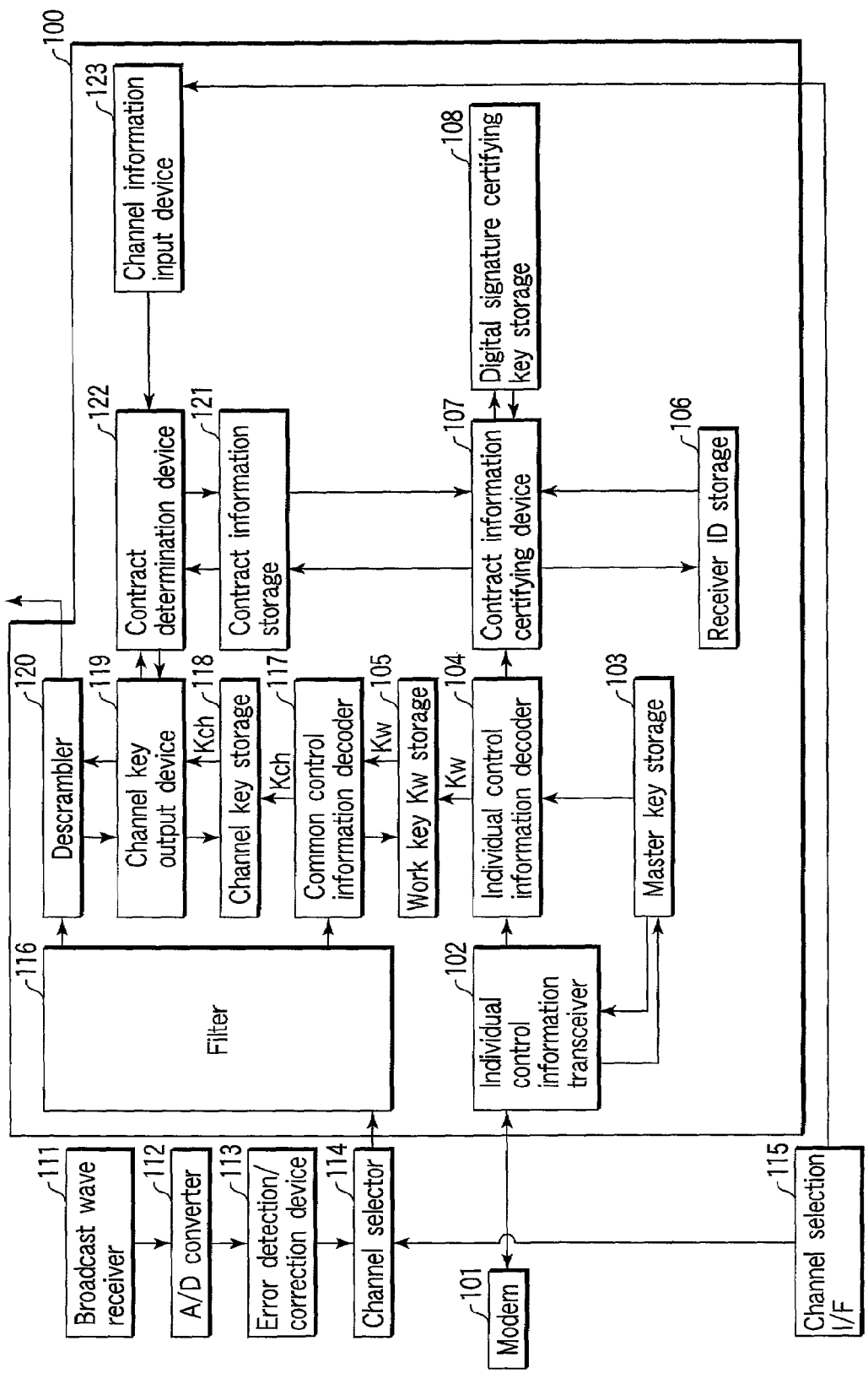
FIG. 1 is a block diagram of a broadcast receiver apparatus according to the first embodiment of the present invention.
Figure 9:
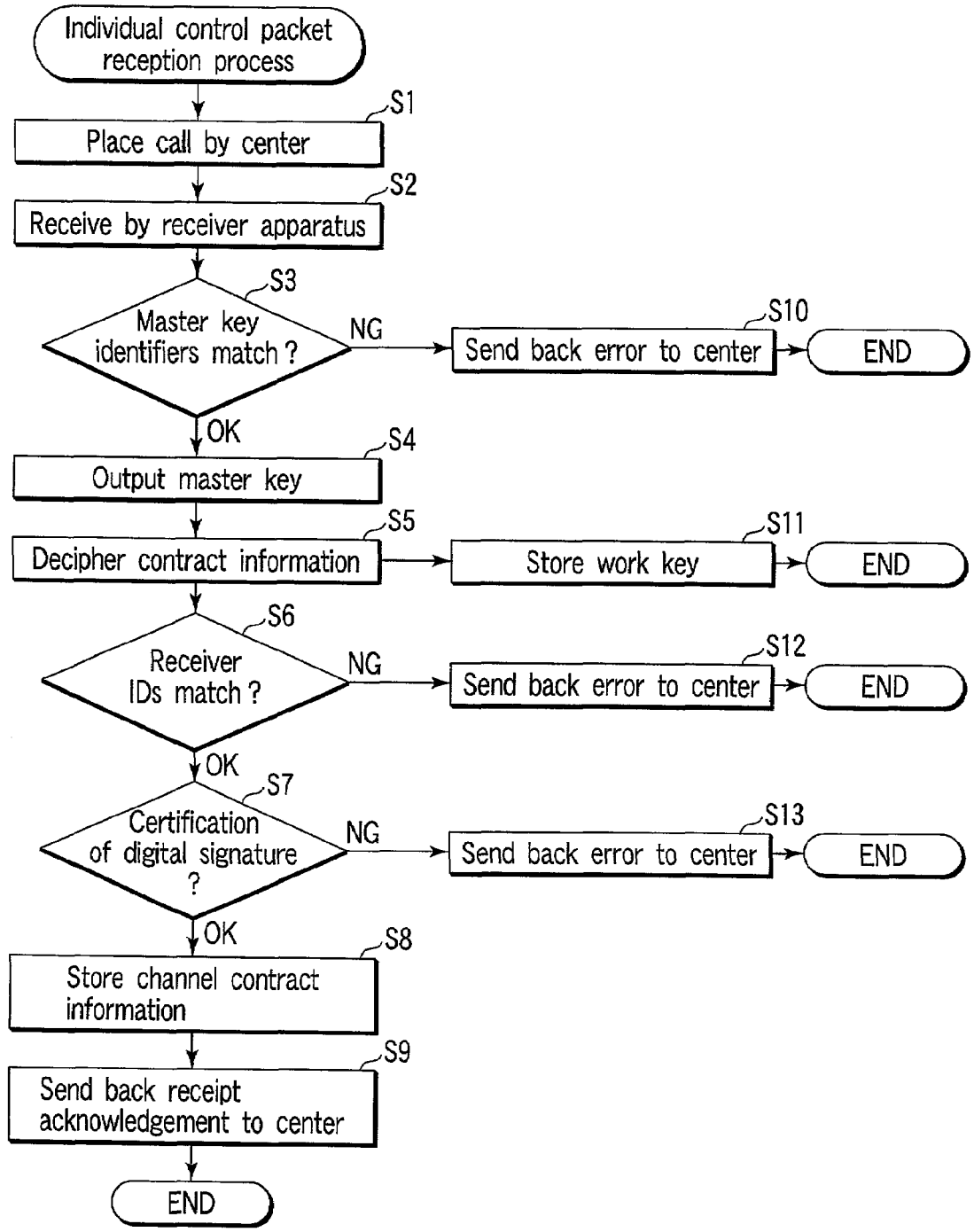
FIG. 9 is a flow chart for explaining the reception processing operation of an individual control packet by the broadcast receiver apparatus shown in FIG. 1.
Figure 10:
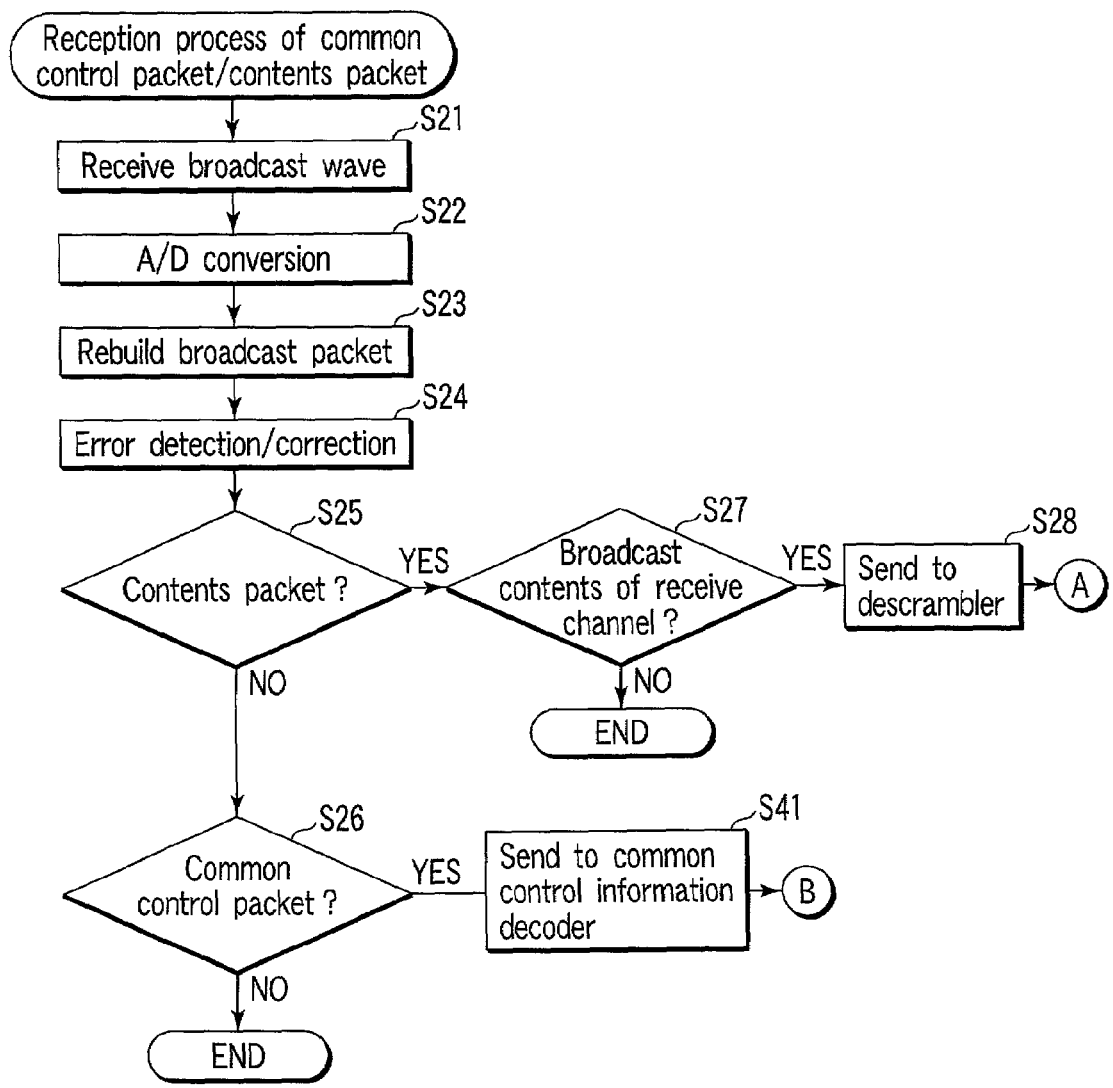
FIG. 10 is a flow chart for explaining the reception processing operation of a common control packet/contents packet by the broadcast receiver apparatus shown in FIG. 1.

The arrangement and processing operation of the broadcast receiver apparatus (to be also simply referred to as a receiver hereinafter) of this embodiment will be described below. FIG. 1 shows the arrangement of principal part of the broadcast receiver apparatus, FIG. 9 shows the reception processing operation of information (individual control packet) which is distributed via a bi-directional communication, and FIGS. 10 to 13 show the reception processing operation of information (common control packet and contents packet) distributed via a broadcast wave.

The reception processing operation of an individual control packet received via the public telephone network will be described below on the basis of FIG. 9 with reference to FIG. 1. Upon receiving an individual control packet, the broadcast receiver apparatus shown in FIG. 1 answers an outgoing call from the conditional access management center to establish a session for exchanging the individual control packet (step S1).

Upon receiving an individual control packet via the public telephone network and a modem 101 (step S2), an individual information transceiver 102 of the receiver apparatus recognizes based on the information identifier in that packet that the received packet is an individual control packet, and acquires a master key identifier from that packet. If the acquired master key identifier does not match a master key stored in a master key storage 103, the individual information transceiver 102 sends an error message to the center exploiting the established session (steps S3 and S10). If the master key identifier matches the master key, that master key is output from the master key storage 103 (step S4) to decrypt contract information in the individual information packet (step S5). Work key information (pairs of work key identifiers and work keys and the like) contained in the decrypted contract information is stored in a work key storage 105 (step S11).

A contract information certifying device 107 compares the receiver ID contained in the decrypted contract information with the receiver ID stored in a receiver ID storage 106 (step S6). If the two IDs do not match, the device 107 outputs an error message to the center via the individual information transceiver 102 (step S12). If the two IDs match, the contract information certifying device 107 certifies or authenticates the digital signature using key information (secret key or public key) stored in a digital signature authentication key storage 108 (step S7). If authentication fails, the device 107 sends back an error message indicating that to the center via the individual information transceiver 102 (step S13); if authentication succeeds, the device 107 stores channel contract information contained in the decrypted contract information in a contract information storage 121 (step S8), and sends a receipt acknowledgement indicating that update of contract information has terminated normally to the center via the individual information transceiver 102 (step S9), thus ending the processing.

The digital signature authentication process in the contract information certifying device 107 will be explained below. Note that the digital signature is roughly categorized into two types. One type is a digital signature using common key crypt, in which the center and receiver apparatus have a common cryptography algorithm and common secret key, the contract information shown in FIG. 5 except for the digital signature is sequentially encrypted for respective blocks using the secret key, and the last block is used as a digital signature. Note that the sequential cryptography is a cryptography technique in which the previous block influences cryptography of the current block. For example, the current block is encrypted using the secret key, and the EX-OR of the encrypted result and that of the previous block is used as the encrypted result of the current block. With this technique, even when middle blocks are tampered with, since a different digital signature is generated (in most cases), tampered blocks can be detected.

As a digital signature, a technique for computing a feature amount, called a hash value, of the entire data to be signed, and encrypting that value is known in addition to the aforementioned technique. The hash value is computed from the entire data, and if data is changed even by 1 bit, not only the hash value differs considerably, but also it is difficult to generate data having the same hash value. With this property, tampering can be detected. Note that the hash value is fixed-length data, and is generated by a hash function.

Signature authentication using common key crypt can be done at high speed and requires only a small circuit scale. However, since the receiver apparatus has the same information as that of the center, this technique is vulnerable to hacking or the like.

The other type of digital signature is a method using public key crypt system, and data signed using a secret key is authenticated using a public key. Since it is very difficult to derive a secret key based on a public key, even when a third party hacks into the receiver apparatus to extract the public key, it is considerably difficult to tamper with data. This method can assure very high security, but has low speed and requires a large circuit scale.

With such excellent properties of the digital signature, the receiver apparatus authenticates the information distributor apparatus (also called the contract management apparatus) (via the digital signature appended to the individual control packet). However, in order to solve the problems addressed in the present invention, the digital signature is not indispensable. That is, the digital signature is not indispensable in the individual control packet of the present invention, and the present invention can be carried out using the individual control packet excluding the digital signature without any inconsistency.

The reception processing operation of a common control packet and contents packet distributed via a broadcast wave will be described below based on FIGS. 10 to 13 with reference to FIG. 1.

In the receiver apparatus, a broadcast wave is received by a broadcast receiver (reception device) 111 (step S21), and is converted (A/D-converted) by an analog-to-digital converter 112 from an analog signal into digital data (step S22).

The digital packet data is sent to an error detection/correction device 113 to undergo error detection/correction (steps S23 and S24). It is then checked with reference to the information identifier of the received packet if the received packet is a common control packet or contents packet, and processing corresponding to the checking result is executed (steps S25 and S26).

Figure 12:
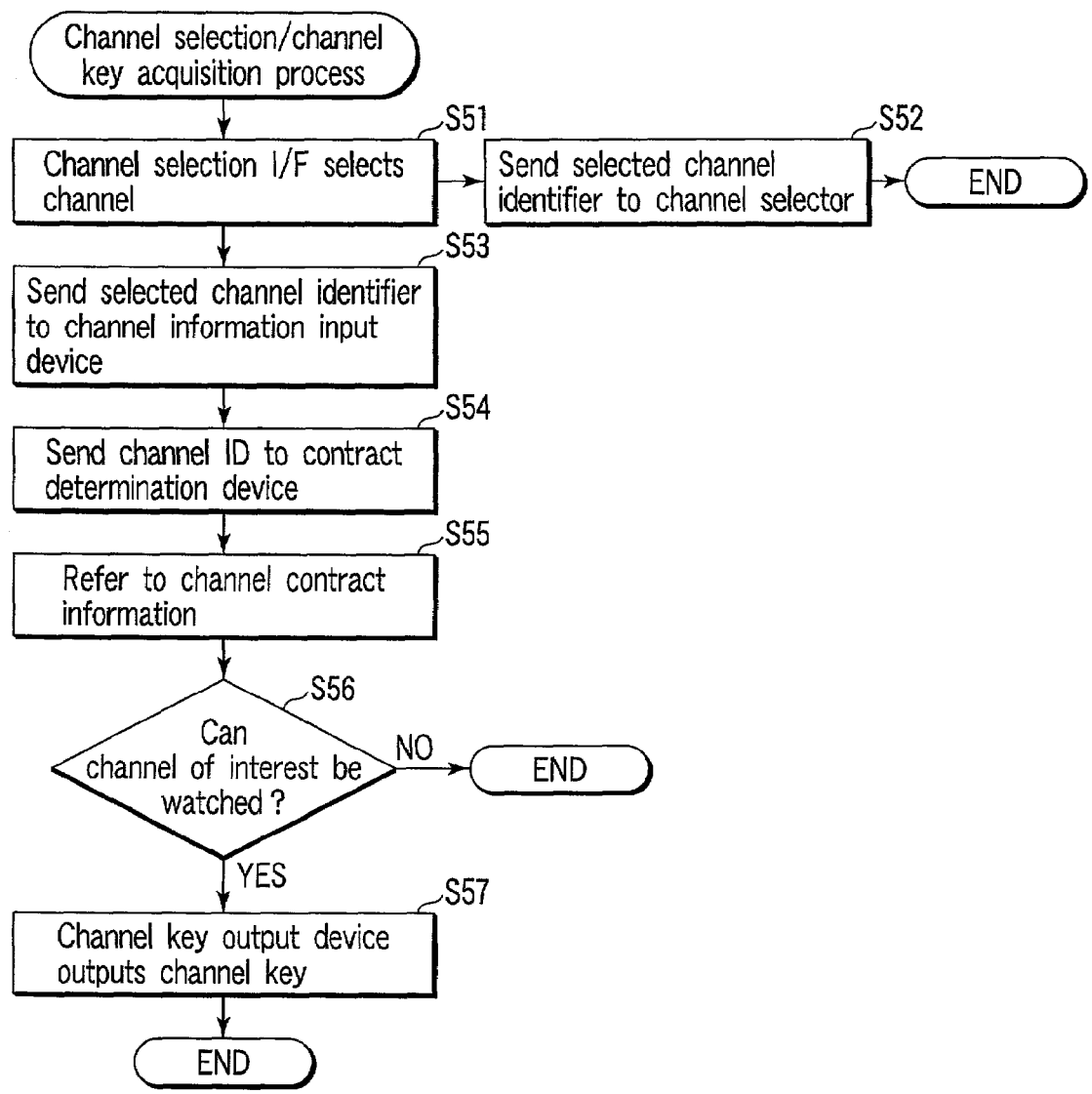
FIG. 12 is a flow chart for explaining the channel select/channel key acquisition processing operation.

A channel selection interface (I/F) 115 acquires the channel identifier of the currently selected channel, and passes the acquired channel identifier to a channel selector 114 and channel information input device 123 (steps S51 to S53 in FIG. 12).

If the received packet is a contents packet, the channel identifier of the currently selected channel is obtained via the channel selection interface (I/F) 115, and the channel selector 114 selects only a contents packet of that channel and sends that packet to a filter 116 of a conditional access device 100. The filter 116 sends the packet to a descrambler 120 (steps S27 and S28).

On the other hand, if the received packet is a common control packet, that packet is sent to a common control information decoder 117 via the channel selector 114 and filter 116, thus starting decrypting (step S41).

The process associated with the contents packet will be described in detail below with reference to the flow chart in FIG. 11. The contents packet is sent from the filter 116 to the descrambler 120 by the aforementioned process. The descrambler 120 extracts a channel identifier and channel key identifier from the contents packet, and passes them to a channel key output device 119, and requests the device 119 to output a channel key. The channel key output device 119 extracts a channel key from a channel key storage 118 on the basis of the contract determination result of a given channel in a contract determination device 122.

That is, as shown in FIG. 12, the contract determination device 122 extracts the channel identifier of the currently selected channel from the channel information input device 123 (step S54), and refers to the channel contract information shown in FIG. 2, which is already stored in the contract information storage 121. If a bit of the channel contract information corresponding to the acquired channel identifier is "1", the device 122 sends a "permit" signal to the channel key output device 119; if that bit is "0", the device 122 sends an "inhibit" signal thereto (step S55). If the determination result="permit" is received, the channel key output device 119 obtains a channel key having the channel key identifier extracted from the contents packet from the channel key storage 118, and passes it to the descrambler 120 (step S57). If the determination result="inhibit" is received, the process associated with the contents packet ends.

Figure 11:
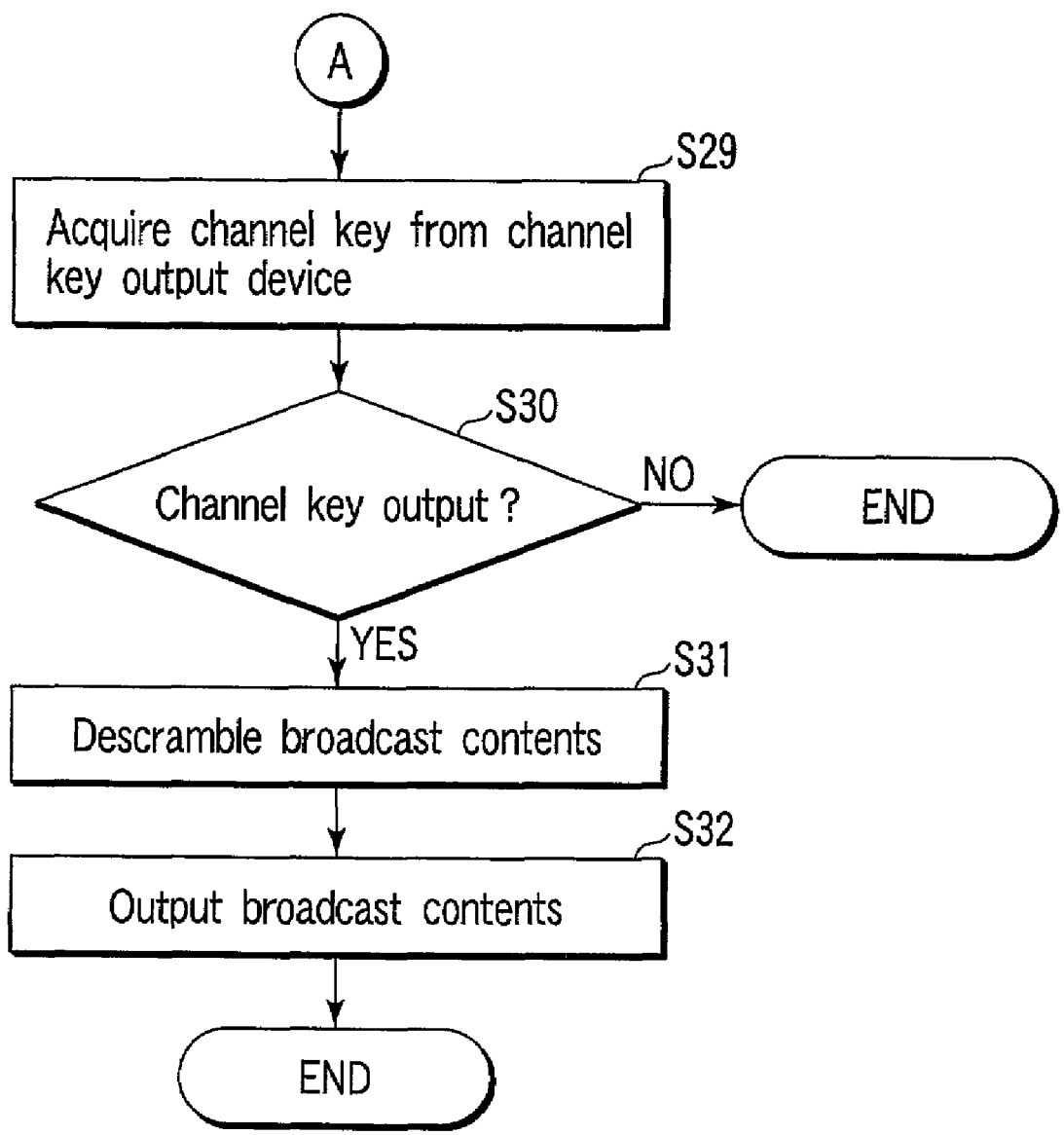
FIG. 11 is a flow chart for explaining the reception processing operation of a common control packet/contents packet.

Upon receiving the channel key from the channel key output device 119, the descrambler 120 decrypts the encrypted contents information contained in the contents packet using that key (steps S29 to S32 in FIG. 11).

Figure 13:
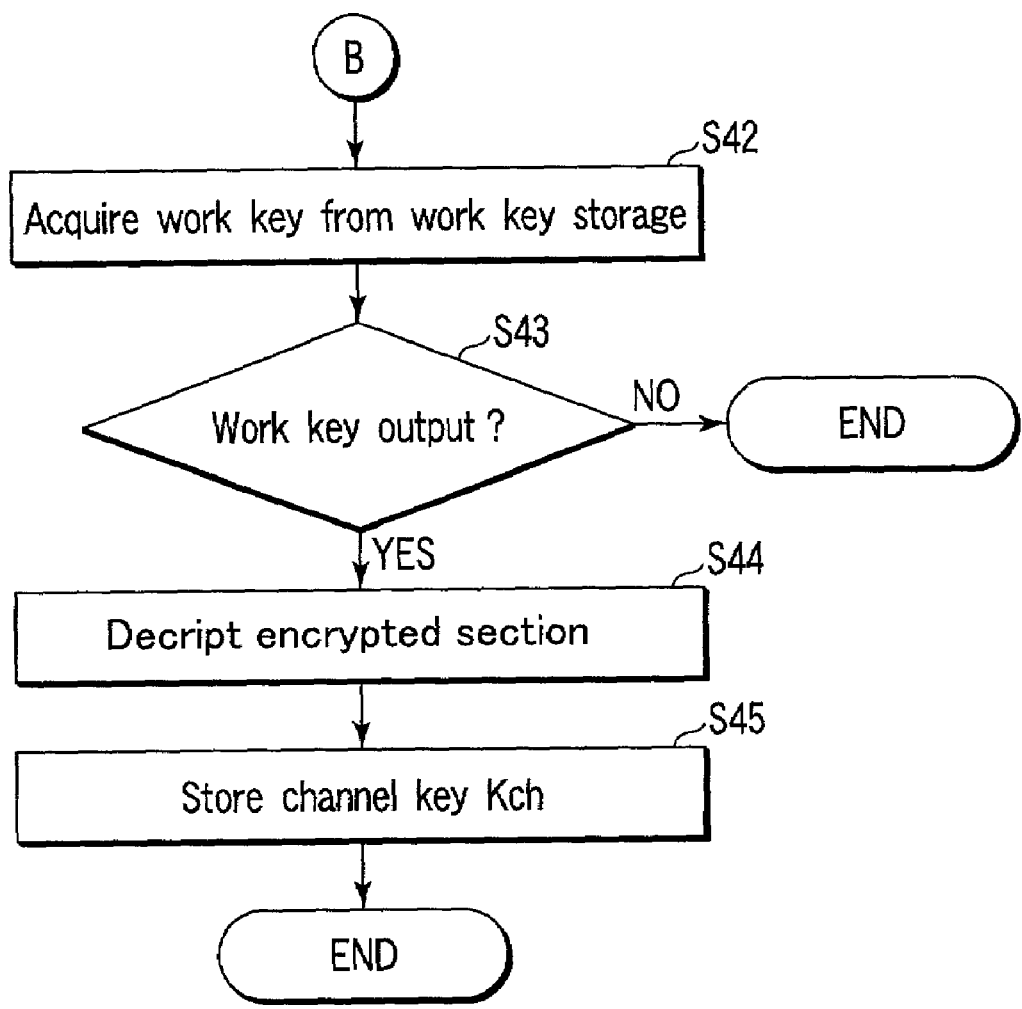
FIG. 13 is a flow chart for explaining the reception processing operation of a common control packet/contents packet.

The process associated with the common control packet will be explained below with reference to FIG. 13. The common control packet is sent from the filter 116 to the common control information decoder 117. A work key is acquired from the work key storage 105 on the basis of a work key identifier contained in an unencrypted section of the control packet (step S42). If the work key cannot be acquired, the process ends (step S43). If the work key can be acquired, information of an encrypted section in the common control packet is decrypted using the work key (step S44). A channel key Kch is acquired from the decrypted information, and is stored in the channel key storage 118 (step S45).

As described above, according to the broadcast receiver apparatus shown in FIG. 1, since the channel contract information which is stored in the broadcast receiver apparatus and is required to select and decrypt the received contents information, and individual control information used to periodically update a work key need not be sent via a broadcast wave, individual control information need not be repetitively sent. This is because the center can confirm during an information exchange process via a bi-directional communication if the individual control information is received. In this manner, the individual control information to be distributed from the center to each subscriber can be greatly reduced.

(Second Embodiment)

In this embodiment, a receiver apparatus as a destination is authenticated by challenge-response certification before the conditional access management center sends individual control information via the public telephone network. With this method, the center can authenticate a receiver apparatus more reliably by various challenges (inquiries) and their responses (answers) that only an authentic receiver apparatus knows.

Figure 14:
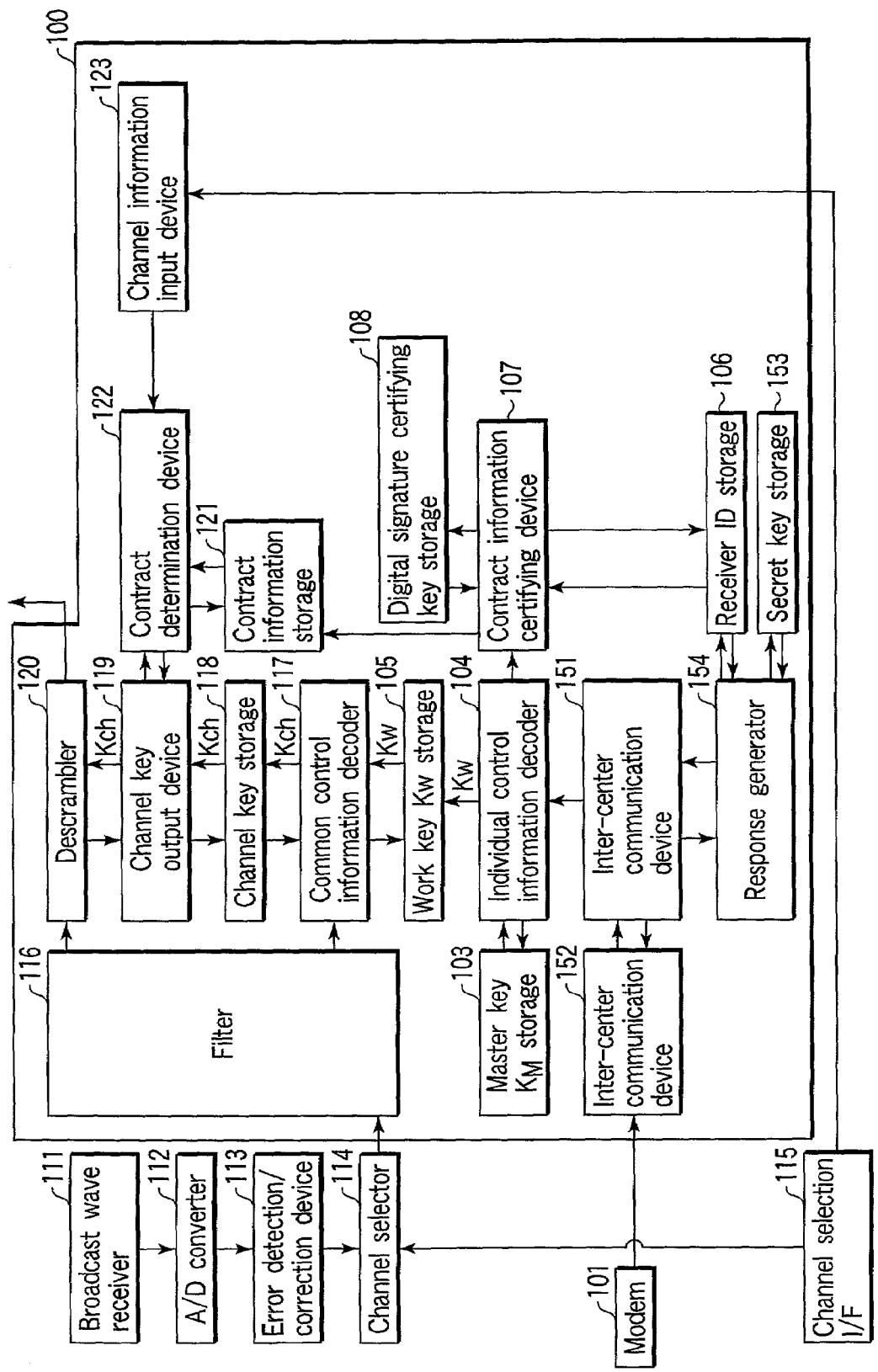
FIG. 14 is a block diagram of a broadcast receiver apparatus according to the second embodiment of the present invention.

FIG. 14 shows an example of the arrangement of principal part of a broadcast receiver according to the second embodiment, and the arrangement of a processing device upon acquiring individual control information via the modem 101 is different from that in FIG. 1.

Since the reception process of common control information is the same as that in the first embodiment, only differences will be explained below. That is, the format of individual control information and its reception processing operation are different from the first embodiment.

Figure 15:
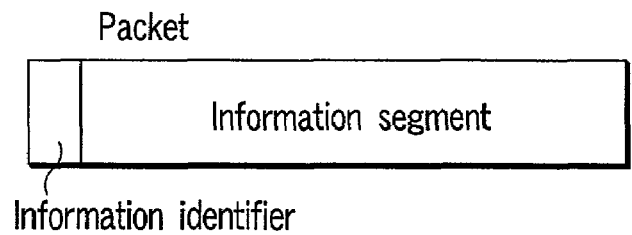
FIG. 15 shows an example of the data format of a packet according to the second embodiment.

The individual control packet exchanged via the modem has a format shown in FIG. 15, i.e., is made up of an information identifier and information segment, and can be categorized into three types of packets by different information segments. In this embodiment, for example, the same packet as the individual control packet shown in FIG. 7 (this packet will be referred to as an individual control packet hereinafter to be distinguished from other two types of packets), a challenge packet, and a response packet are available.

Figure 16:
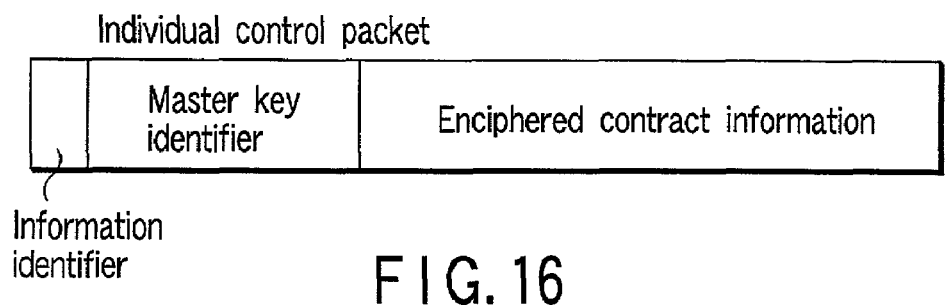
FIG. 16 shows an example of the data format of an individual control packet.

The information segment of the individual control packet is comprised of a master key identifier and encrypted contract information, as shown in FIG. 16. This format is the same as that shown in FIG. 7, and the contract information is the same as that in FIG. 5.

Figure 17:
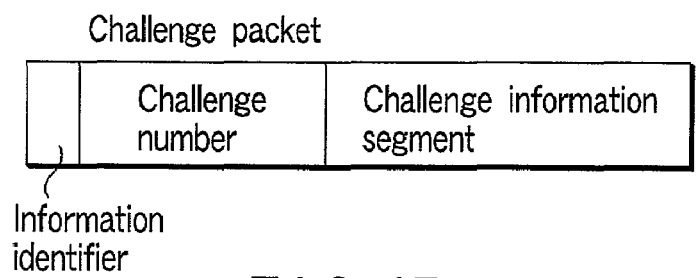
FIG. 17 shows an example of the data format of a challenge packet.

The information segment of the challenge packet is made up of a challenge number and challenge information segment, as shown in FIG. 17. The challenge number is a management number of an inquiry or question called a challenge sent from the center to the receiver apparatus. Challenges assumed in this embodiment include a challenge for inquiring a receiver ID, a challenge for inquiring a master key identifier, and a challenge for generating a signature in challenge information using a secret key (unique to the receiver apparatus). In addition, a challenge for decrypting encrypted challenge information, and returning the decrypted result is available. When objective data is required like in the challenge for signing using the secret key, that data is described in the challenge information to be sent.

The basis of challenge and response is to make an inquiry that cannot be answered unless information that only the receiver apparatus as a destination and center know is used, and confirm that the receiver apparatus is an authentic apparatus (registered in the subscriber DB of the center) if a right answer to that inquiry is obtained.

Figure 18:
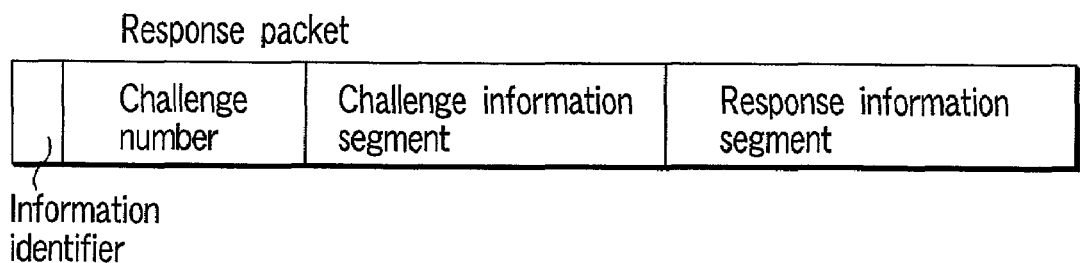
FIG. 18 shows an example of the data format of a response packet.

The information segment of the response packet is comprised of a challenge number, challenge information segment, and response information segment, as shown in FIG. 18. Assume that the response information segment has a predetermined format depending on the challenge number (as in the challenge information segment).

Figure 19:
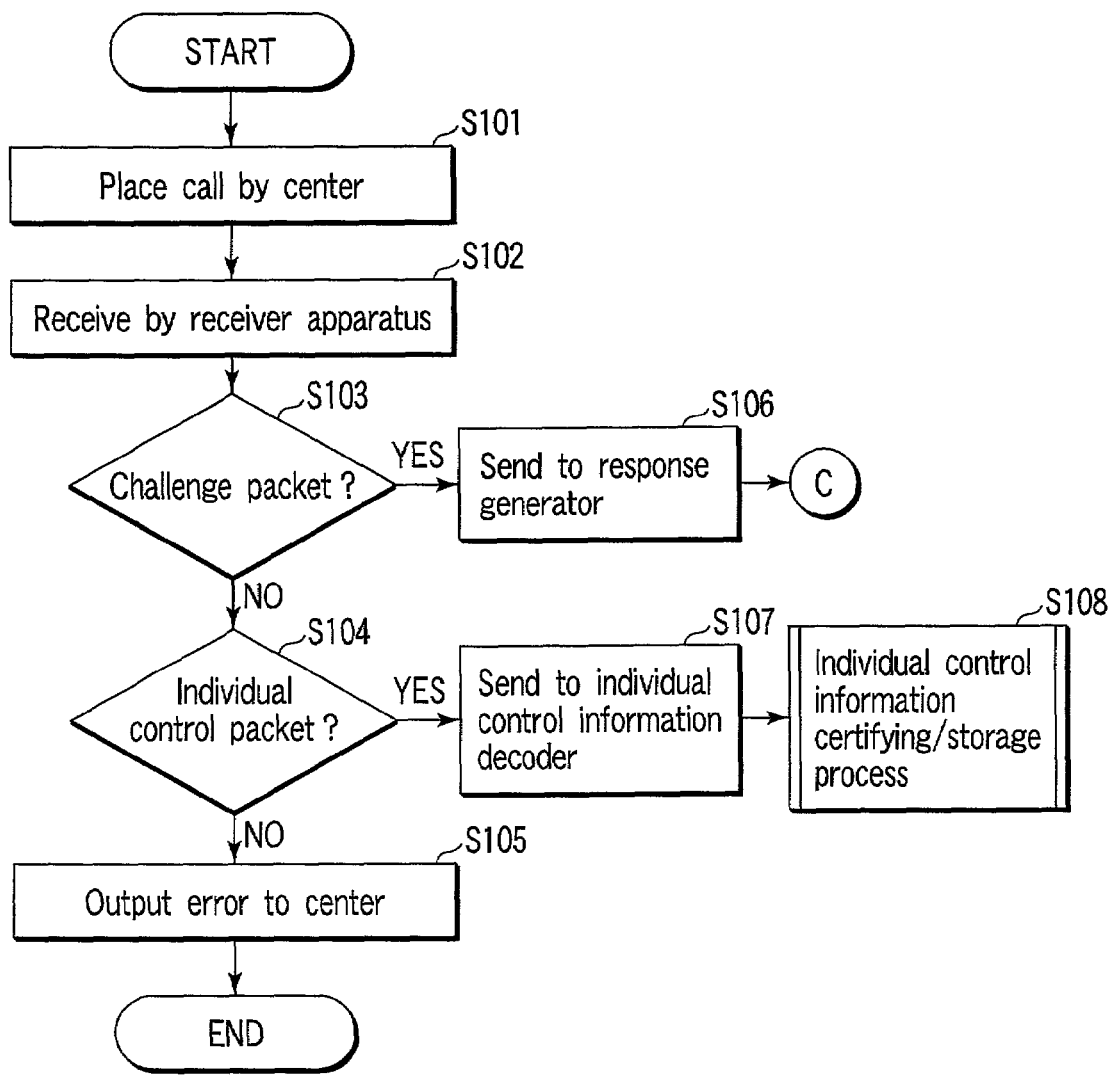
FIG. 19 is a flow chart for explaining the reception processing operation of an individual control packet.

The reception processing operation of an individual control packet will be explained below with reference to FIG. 14 and the flow charts shown in FIGS. 19 and 20.

When the contract management center calls each receiver apparatus (step S101), the receiver apparatus receives that call by an inter-center communication device 152 via the modem 101, and receives a packet (step S102). If an inter-center communication analyzer 151 determines based on the information identifier of the received packet that the received packet is a challenge packet (step S103), the analyzer 151 sends that packet to a response generator 154 (step S106). If the received packet is an individual control packet (step S104), the analyzer 151 sends that packet to an individual control information decoder 104 (step S107) to execute authentication and storage processes of the individual control information by the same process as in the first embodiment (step S108). If the received packet is neither of them, an error message is sent to the center (step S105).

The processing operation of the response packet will be described in detail below with reference to the flow chart shown in FIG. 20.

If the challenge is a receiver ID inquiry (step S111), the response generator 154 extracts the receiver ID from the receiver ID storage 106 (step S115), generates a response packet (FIG. 18) by converting that receiver ID into a predetermined response information format (step S116), and sends that packet to the center via the inter-center communication device 152 (step S117).

If the challenge is a master key identifier inquiry (step S112), the response generator 154 acquires a master key identifier (step S118), generates a response packet as in step S116 (step S119), and sends it to the center (step S120).

If the challenge is a signature generation inquiry (step S113), the response generator 154 acquires a challenge information segment as data to be signed (step S121), acquires a secret key stored in a secret key storage 153 of the receiver apparatus (step S122), and generates a signature for the challenge information segment (step S123). The generated signature is converted into the format of a response information segment in accordance with the predetermined format, and is sent in the form of a response packet to the center (steps S123 to S125). If the challenge applies to none of the above three challenges, an error message is sent to the center (step S114).

The center sends one or a plurality of challenges to the receiver apparatus, and if all responses received from the receiver apparatus are correct, the center sends an individual control packet as in the first embodiment. In this way, since the individual control information can be sent after it is confirmed that the receiver apparatus as a destination is authentic, a corrupted receiver apparatus can be eliminated. The second embodiment is superior to the first embodiment in this respect.

Conversely, since the receiver apparatus authenticates the information distributor apparatus (contract management apparatus) (as described in the first embodiment), mutual authentication between the receiver apparatus and information distributor apparatus can be made in this embodiment. However, as described in the first embodiment, such embodiment is not indispensable in the present invention, and an embodiment in which the information distributor apparatus (contract management apparatus) authenticates a receiver apparatus as in the present invention is essential.

(Third Embodiment)

This embodiment repossesses information that must be repossessed from a receiver apparatus such as an audiovisual history or the like, which is indispensable to PPV (pay per view) upon sending individual control information from the conditional access management center via the public telephone network.

PPV is a charging system premised on charging per program. When a subscriber wants to watch a PPV program, the subscriber himself or herself selects a program he or she wants to watch by operating, e.g., a remote controller, thus descrambling and watching the program. An audiovisual fee of each PPV program is added to that for normal contract channels upon charging. In the existing PPV system, a descramble key is held in the receiver apparatus in secrecy, and upon detecting PPV operation, the selected program is descrambled using the descramble key and a reception history is stored in a PPV reception history storage in the receiver apparatus.

This is because the traffic on the public telephone network and the communication cost increase if the receiver apparatus connects to the center in every PPV reception operation. However, in the existing system, the PPV reception history in the receiver apparatus must be repossessed, and often fails to be repossessed (if, for example, a subscriber disconnects a telephone line).

To solve such problems, this embodiment proposes a system that can periodically repossess PPV audiovisual information from each subscriber who watches normal contract channels by executing contract information update and reception history repossession in a single session.

Figure 22:
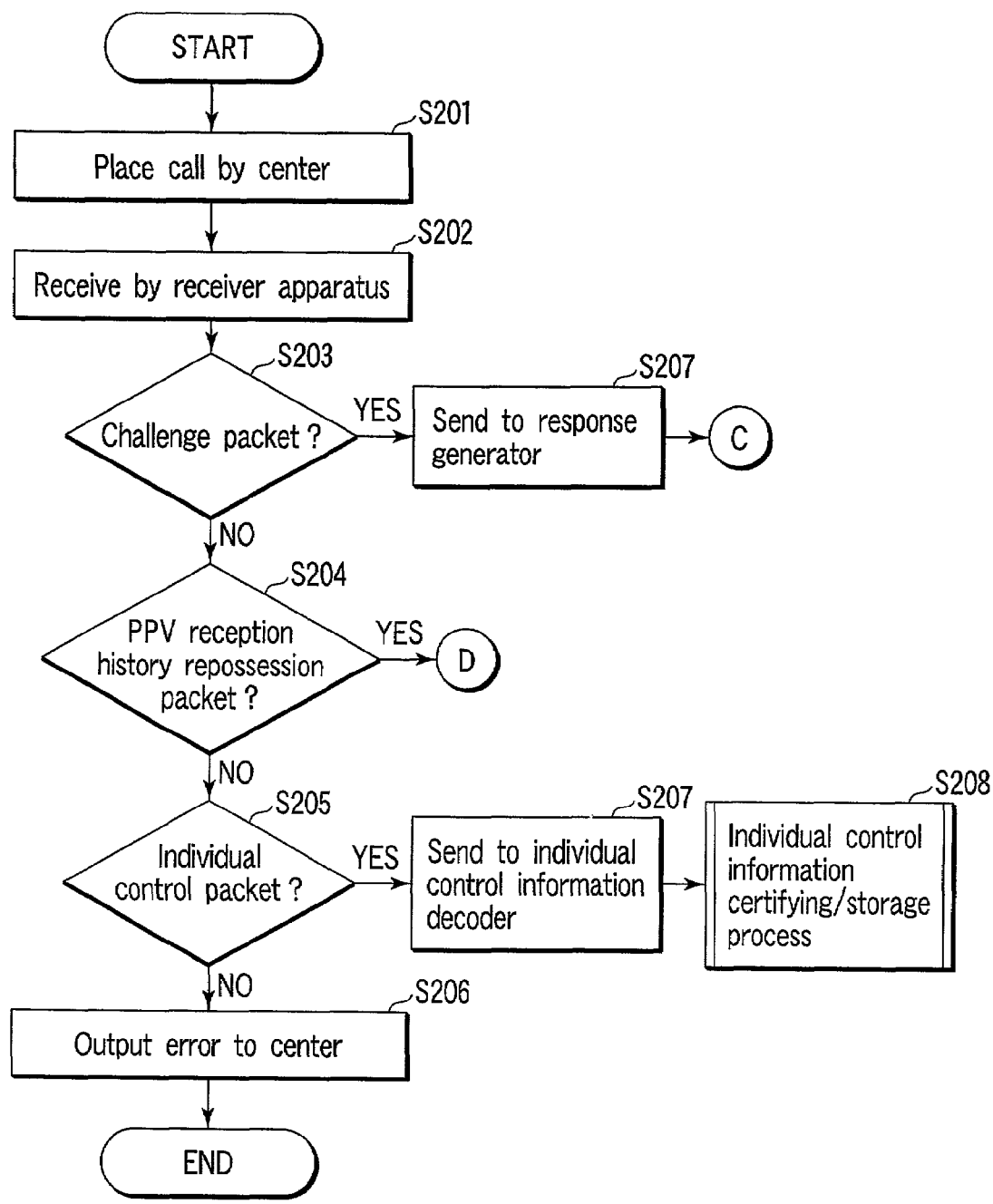
FIG. 22 is a flow chart for explaining the reception processing operation of an individual control packet.
Figure 23:
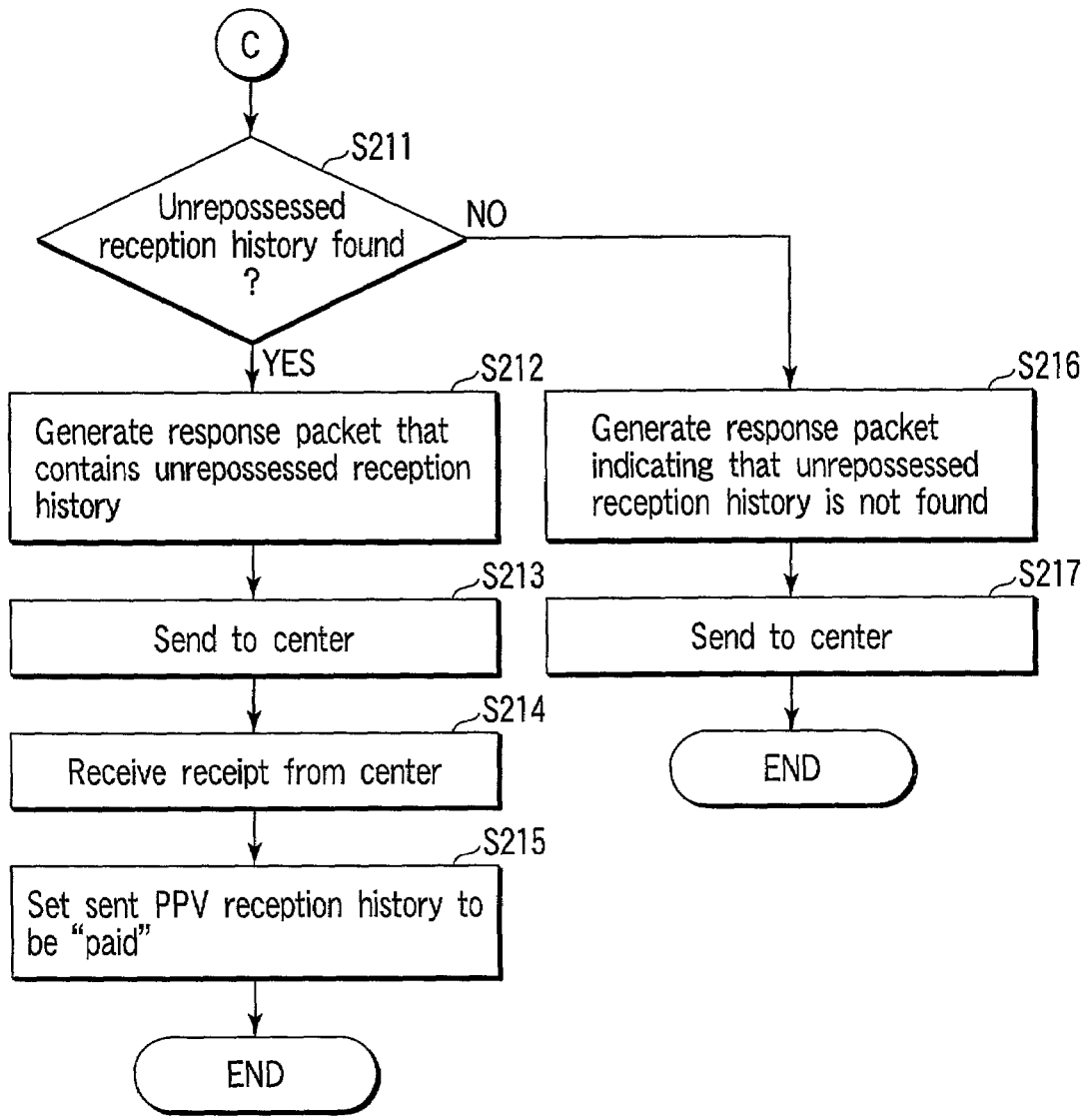
FIG. 23 is a flow chart for explaining the reception processing operation of an individual control packet.

FIG. 21 shows the overall arrangement of this embodiment, and FIGS. 22 and 23 show the algorithm of principal part. Since this embodiment has many overlaps with the first variation described as the first and second embodiments in terms of arrangement, only differences (that pertain to PPV) will be explained below.

Upon receiving a call from the center, the receiver apparatus receives a packet sent from the center (steps S201 and S202), and the flow branches depending on whether the received packet is a challenge packet, PPV reception history repossession packet, or individual control packet. If the received packet is none of these three packets, an error message is output to the center (step S206), thus ending the process.

The PPV reception history repossession packet can be considered as a variation of challenge packet, and can be implemented by a method of assigning a challenge number for PPV reception history repossession. Assume that the PPV reception history repossession packet is a challenge packet implemented by assigning a challenge number for PPV reception history repossession, for the sake of simplicity.

If the received packet is a challenge packet other than PPV reception history repossession (step S203 in FIG. 22) or if it is an individual control packet (step S205 in FIG. 22), the same process as in the second embodiment is executed. The process executed when the received packet is a PPV reception history repossession packet (step S204 in FIG. 22) will be explained below with reference to the flow chart shown in FIG. 23.

If the received packet is a PPV reception history repossession packet, the inter-center communication analyzer 151 instructs a PPV reception history management device 171 to repossess a PPV reception history. The PPV reception management device 171 searches a PPV reception history storage 172, and if an unrepossessed reception history is found (step S211), the device 171 converts that reception history into a response packet (e.g., generates a response packet so that the reception history is contained as an information segment of the response packet shown in FIG. 18) and sends that packet to the inter-center communication analyzer 151, which sends the packet to the center via the inter-center communication device 152 (steps S212 and S213). If an unrepossessed reception history is not found, the device 171 generates a response packet indicating this, and sends that packet to the center (steps S211, S216, and S217).

Upon receiving the packet, if the PPV reception history is contained, the center sends a receipt (step S214). Upon receiving the receipt, the PPV reception management device 171 of the receiver apparatus executes a repossession completion process of the sent PPV reception history (step S215).

Since a challenge packet for repossessing a PPV reception history is sent prior to an individual control packet, the PPV reception history can be repossessed simultaneously with update of contract information (channel contract information, work keys, and the like). Furthermore, if security is given by, e.g., appending a digital signature to a receipt acknowledgement of a PPV reception history sent from the center, the system can be robust against an attack that inputs receipt information to the receiver apparatus by some method before the PPV reception history is sent to the center to tamper with an unrepossessed PPV reception history to be repossessed.

In the first to third embodiments, principal processes are done only within the conditional access device 100. But only the descrambler 120 may be mounted outside the conditional access device 100. The descrambler 120 requires a high-speed process since it must decrypt in real time (since it decrypts broadcast contents), while other portions need not always operate, and have a slight margin in processing time. Hence, such implementation can provide many advantages. For example, when the receiver apparatus is used common to other broadcast systems, all the broadcast systems may adopt a common scramble system of broadcast contents, and only a conditional access portion (that must hold secret information for each broadcast system) may be implemented on a detachable medium such as an IC card or the like.

The first to third embodiments described above and the fourth embodiment to be described below also allow such implementation.

(Fourth Embodiment)

Figure 25:
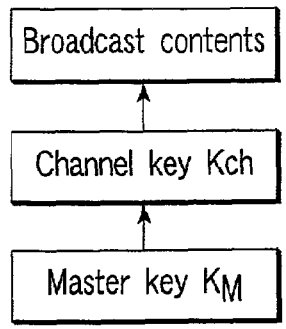
FIG. 25 shows an example of the key configuration used in a conditional access system according to the fourth embodiment.

The fourth embodiment will explain a conditional access system when all broadcast receiver apparatuses have a common master key. The conditional access system of the fourth embodiment has a simple structure without any work keys, as shown in FIG. 25, since the master key is common to all receiver apparatuses, and plays a role of a work key in the first embodiment. Such conditional access system is very effective in terms of a reduction of the transmission volume of individual control information (under the condition of transmission via a broadcast wave) since it has a simple arrangement (see Jpn. Pat. Appln. KOKAI Publication No. 11-243536). However, since a common master key is used, and every receiver apparatuses can equally receive channel keys of all channels, conditional access is implemented depending only on channel contract information.

Figure 26:
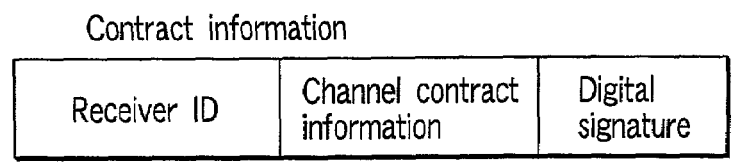
FIG. 26 shows an example of contract information according to the fourth embodiment.

FIG. 24 shows an example of the arrangement of principal part of a broadcast receiver apparatus according to this embodiment. An individual control packet used in the fourth embodiment is a packet having the format shown in FIG. 7. However, since the fourth embodiment does not use any work keys, encrypted contract information contained in the individual control packet consists of a receiver ID, channel contract information, and digital signature, as shown in FIG. 26.

Figure 27A:
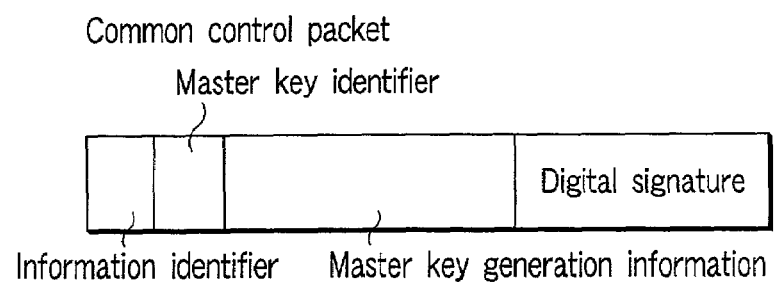
FIGS. 27A and 27B respectively show a common control packet used to distribute master key generation information, and a common control packet used to distribute a channel key.
Figure 27B:
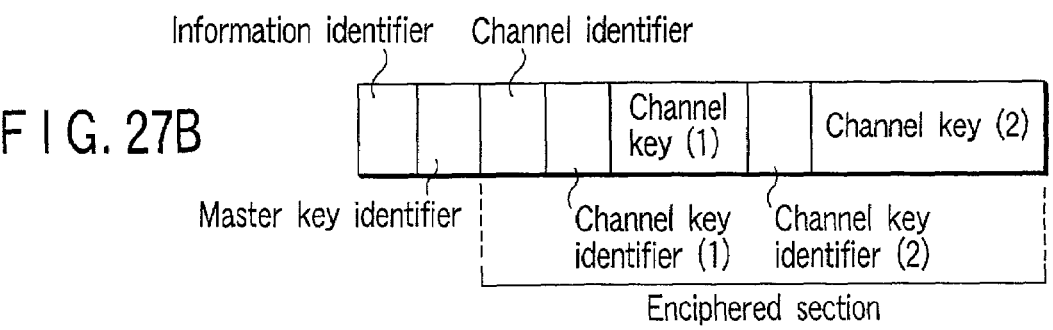

A common control packet includes two different types, i.e., a packet for distributing channel key information, and a packet for distributing master key generation information. The packet for distributing a channel key has a format shown in FIG. 27A as in the first embodiment (see FIG. 8), and the packet for distributing master key generation information is comprised of an information identifier, master key identifier, master key generation information, and digital signature, as shown in FIG. 27B. Referring to FIG. 27B, the information identifier indicates that the packet of interest is a packet for distributing master key generation information, and is used to distinguish that packet from other packets. The master key identifier is an identifier of a master key generated based on the master key generation information which follows. The digital signature is used to prevent the master key generation information from being tampered with, and may use either secret or public key crypt, as in the first embodiment.

Only the difference between the processing operation of the broadcast receiver apparatus according to the fourth embodiment and that of the first embodiment will be explained below. That is, the reception processing operation of a common control packet is different from the first embodiment, and will be explained using the flow chart shown in FIG. 28.

Figure 28:
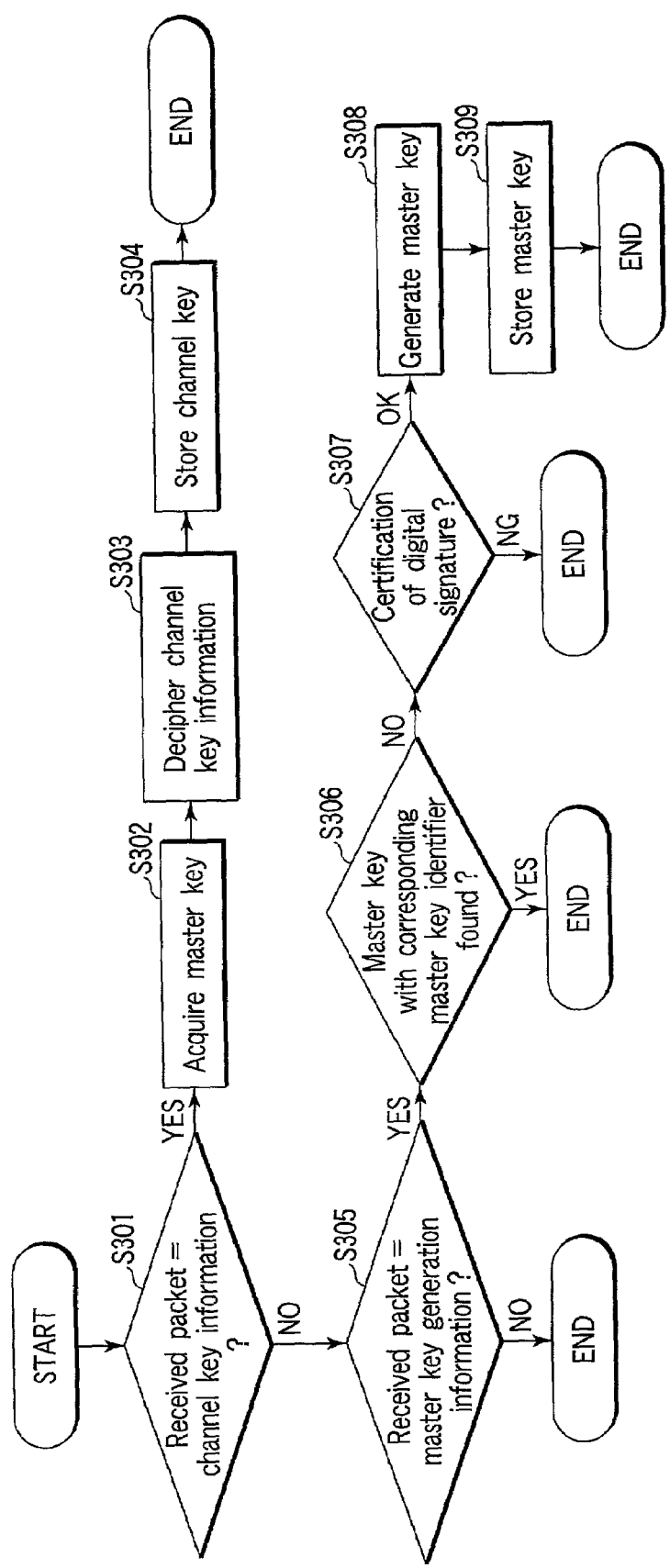
FIG. 28 is a flow chart for explaining common control (packet reception processing operation)

The flow chart shown in FIG. 28 starts when the receiver apparatus receives a common control packet, and the filter 116 passes the received common control packet to the common control information decoder 117. It is checked with reference to the information identifier of the received packet if that packet is a packet for distributing a channel key (step S301). If the received packet is a packet for distributing a channel key, a master key identifier is extracted from the unencrypted section of that packet, and a master key having that master key identifier is acquired from the master key storage 103 (step S302). The encrypted section of the received packet is decrypted using the acquired master key (step S303). A channel key obtained as a result of decrypt is stored in the channel key storage 118 (step S304), thus ending the process.

On the other hand, if the received packet is a packet for distributing master key generation information (step S305), it is checked if a master key corresponding to the master key identifier extracted from that packet is stored in the master key storage 103 (step S306). If the master key is already stored, the process ends. If the corresponding master key is not stored, a new master key is generated. A master key generation information authentication device 181 authenticates the digital signature contained in that packet (step S307). If authentication fails, the process ends; otherwise, a master key generator 182 generates a master key from the master key generation information contained in the packet in accordance with a predetermined algorithm (step S308), and stores the generated master key in the master key storage 103 (step S309), thus ending the process.

A brief explanation of master key generation information and the master key generation process will have to be given.

The master key generation information is random number seed information used to generate a master key, and a master key is generated by means for generating a random number using the random number seed, and the predetermined algorithm and parameters of the master key generator 182. Since generation is done within tamper resistant hardware, no security problem is posed if the master key generation information remains unencrypted.

(Fifth Embodiment)

The fifth embodiment will explain an information distributor apparatus (to be also referred to as a contract management center apparatus or contract management apparatus hereinafter) for sending individual control information (packet) to the broadcast receiver apparatus described in the first embodiment. Since the present invention is characterized by sending an individual control packet and common control packet using independent communication means, two information distributor apparatuses for respectively sending an individual control packet and common control packet will be explained. Since such arrangement can reduce the complexity of conditional access management in practice, a stable system can be built.

Figure 29:
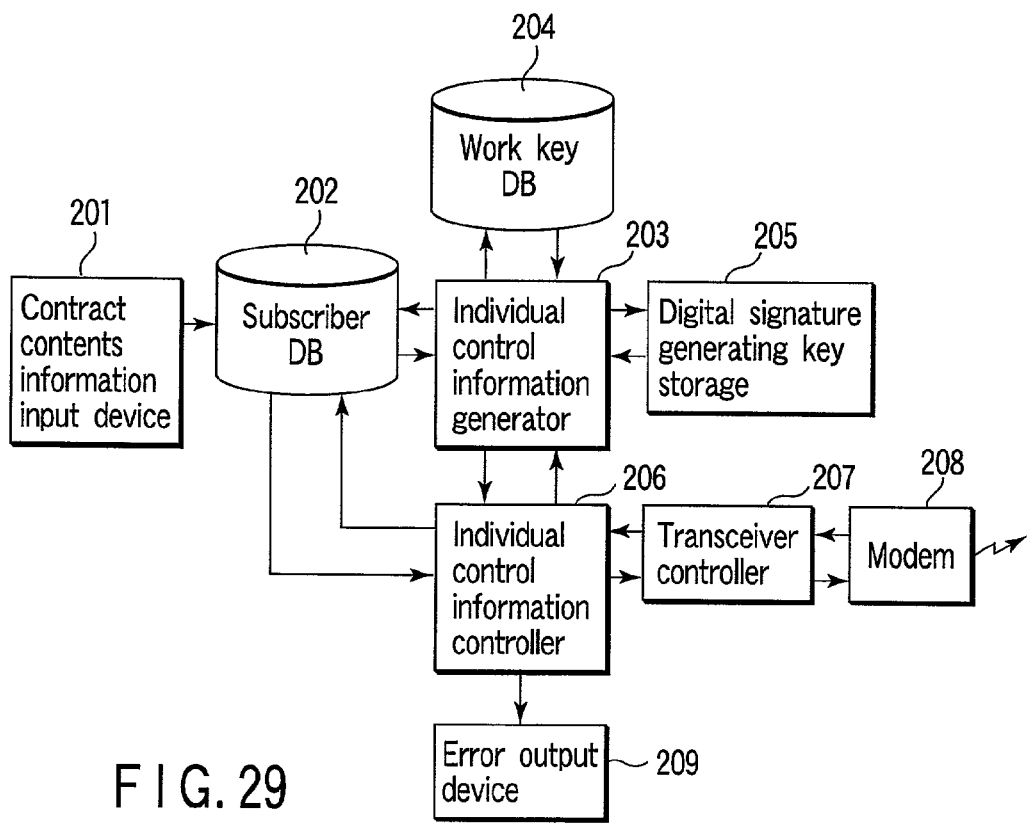
FIG. 29 is a block diagram showing an example of the arrangement of principal part of an information distributor apparatus of individual control information according to the fifth embodiment of the present invention, which corresponds to the broadcast receiver apparatus according to the first embodiment (FIG. 1)
Figure 32:
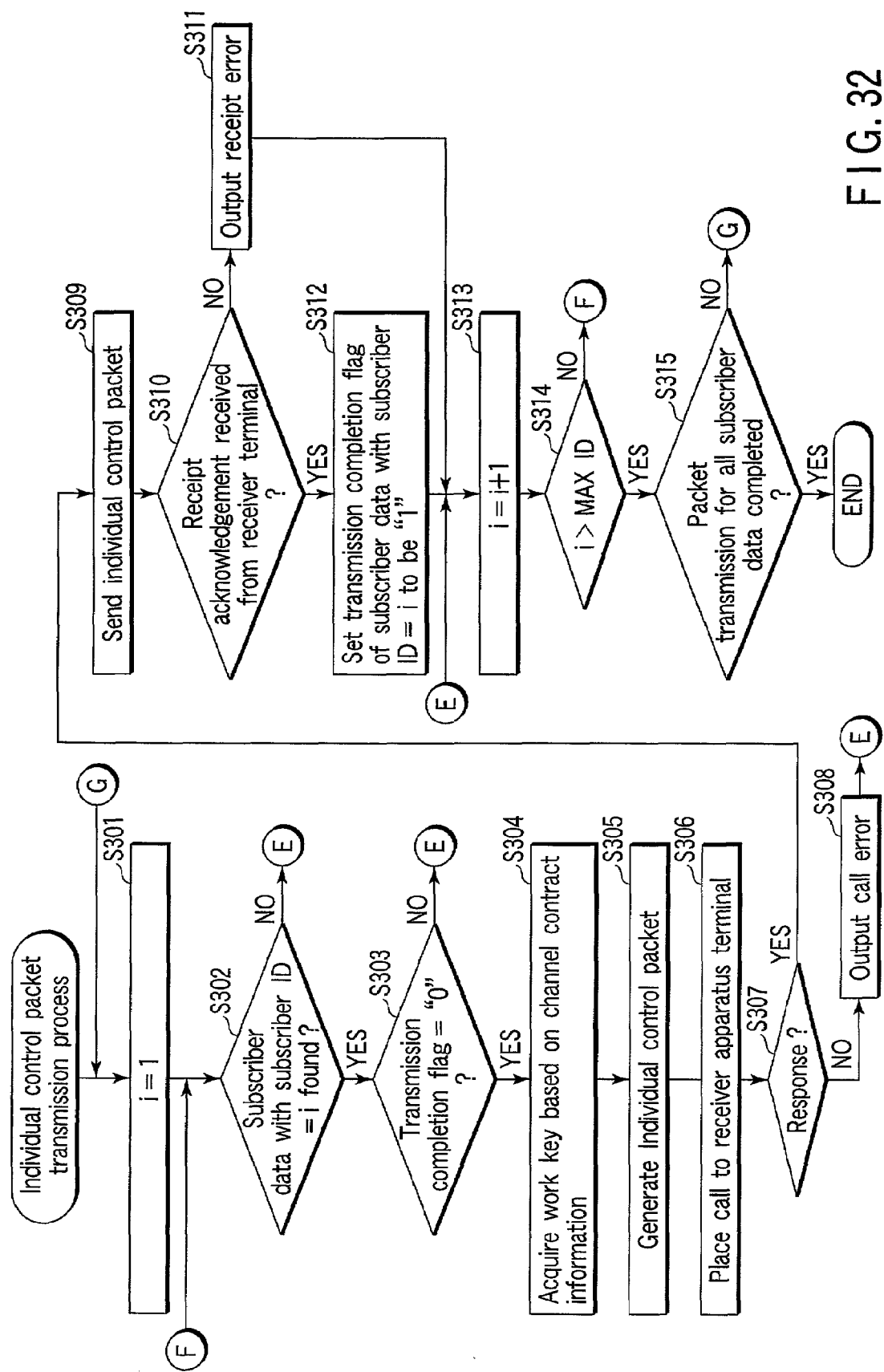
FIG. 32 is a flow chart for explaining the transmission processing operation of an individual control packet.

The arrangement and processing operation of an information distributor apparatus for an individual control packet will be explained below. FIG. 29 shows an example of the arrangement of principal part of an information distributor apparatus, and FIG. 32 is a flow chart showing the transmission processing operation of an individual control packet.

A subscriber database (DB) 202 stores subscriber data used to manage contract states for respective subscribers, and one subscriber data has a format shown in FIG. 31, i.e., is comprised of a subscriber ID, receiver ID, master key identifier, master key, channel contract information, transmission completion flag, and dial number.

The subscriber ID is a management number assigned to each subscriber and, in this embodiment, numbers from "1" to "MAXID" are assigned for the sake of simplicity. The receiver ID indicates that of a subscriber designated by the subscriber ID. The master key identifier is an identifier of a master key currently stored in the receiver apparatus of that subscriber, and the master key is the one corresponding to the master key identifier. The channel contract information represents the contract state of the subscriber, as shown in FIG. 2, and the transmission completion flag indicates if the channel contract information is sent to that subscriber. If the flag is "0", it indicates that the channel contract information is not sent yet; if the flag is "1", it indicates that the channel contract information has already been sent. The dial number is the telephone number of the public telephone network which is connected to the receiver apparatus of the subscriber. Note that the subscriber data is formed by data input from a contract information input device 201.

The transmission processing operation of an individual control packet by the information distributor apparatus shown in FIG. 29 will be explained below with reference to the flow chart shown in FIG. 32. This process is periodically launched by an individual control information controller 206 every time a work key is updated. Initially, variable i=1 is set, and it is checked if a subscriber record with a subscriber ID=i is stored in the subscriber DB 202 (steps S301 and S302).

The process when such subscriber record is not stored will be explained. If such subscriber record is not stored, the flow jumps to step S313 to increment i by one. After it is confirmed that i<"MAXID" (step S314), the flow returns to step S302 to check the subscriber ID based on new i. If variable i>MAXID in step S314, since this means that all subscriber data have been processed once, the subscriber DB 202 is searched for subscriber data with a transmission complete flag="0", i.e., to which an individual control packet is not sent yet (step S315). If such subscriber data is found, the flow returns to step S301 to repeat the process by setting variable i=1. If subscriber data with the transmission complete flag="0" is not found in step S315, the process ends.

By incrementing i until variable i exceeds MAXID, it is checked if subscriber data having that variable i as the subscriber ID is present (step S302). If such data is present, the transmission completion flag of that subscriber data is checked. If the flag is "1", since an individual control packet has already been sent to that subscriber (step S303), i is incremented by one (steps S313 and S314) to check the presence of the next subscriber ID (step S302). Note that since this process (steps S302, S303, S313, and S314) also appears frequently in the following description, it will be referred to as an increment process hereinafter for the sake of simplicity.

If subscriber data with subscriber ID=i is found in step S302, the transmission completion flag of that subscriber data is checked (step S303). If the flag is "1", i is incremented by one to check the presence of the next subscriber ID (steps S314 and S302).

If the transmission completion flag is "0" in step S303, the individual control information controller 206 acquires work keys of channels the subscriber of interest can watch from a work key database (DB) 204 on the basis of the channel contract information of the subscriber data (step S304). Since work keys are set for respective channels (as described in the first embodiment), a process for acquiring a work key is required in correspondence with the number of contract channels.

An individual control information generator 203 generates a contract information segment with the format shown in FIG. 5, except for a digital signature, on the basis of the acquired work keys, the receiver ID of the subscriber data, and the channel contract information, generates a digital signature by encrypting the contract information segment using a digital signature generating key stored in a digital signature generating key storage 205, and generates an individual control packet by appending a master key identifier and information identifier to the information segment (step S305). The generated packet is sent to a transceiver controller 207, which originates a call using the dial number contained in the subscriber data (step S306). If this call is not received by the corresponding receiver apparatus, a reception error is output (steps S307 and S308), and the flow advances to step S313 to execute the increment process, thus processing the next subscriber data.

If the call is received by the receiver apparatus, the transceiver controller 207 transmits an individual control packet according to a predetermined protocol (step S307). If a receipt acknowledgement is received from the receiver apparatus within a predetermined period after transmission (step S310), the transmission completion flag of the subscriber data of interest is set at "1" (step S312), and the increment process in step S313 and subsequent step is executed. After that, the flow returns to process the next subscriber record.

The process ends when variable i exceeds "MAXID", and it is confirmed that the transmission completion flags of all subscriber data are "1" (step S315).

Figure 30:
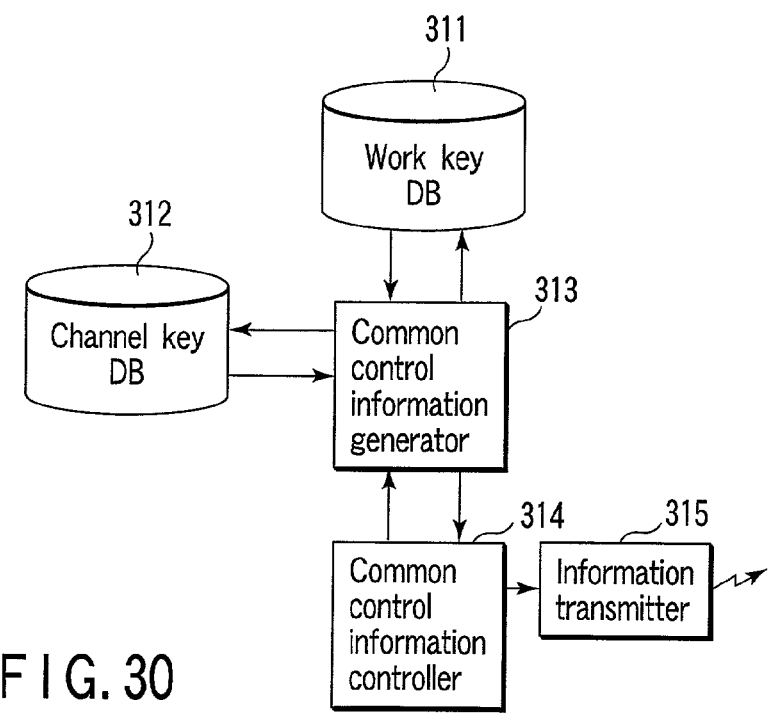
FIG. 30 is a block diagram showing an example of the arrangement of principal part of an information distributor apparatus of common control information according to the fifth embodiment of the present invention, which corresponds to the broadcast receiver apparatus according to the first embodiment (FIG. 1)
Figure 34:
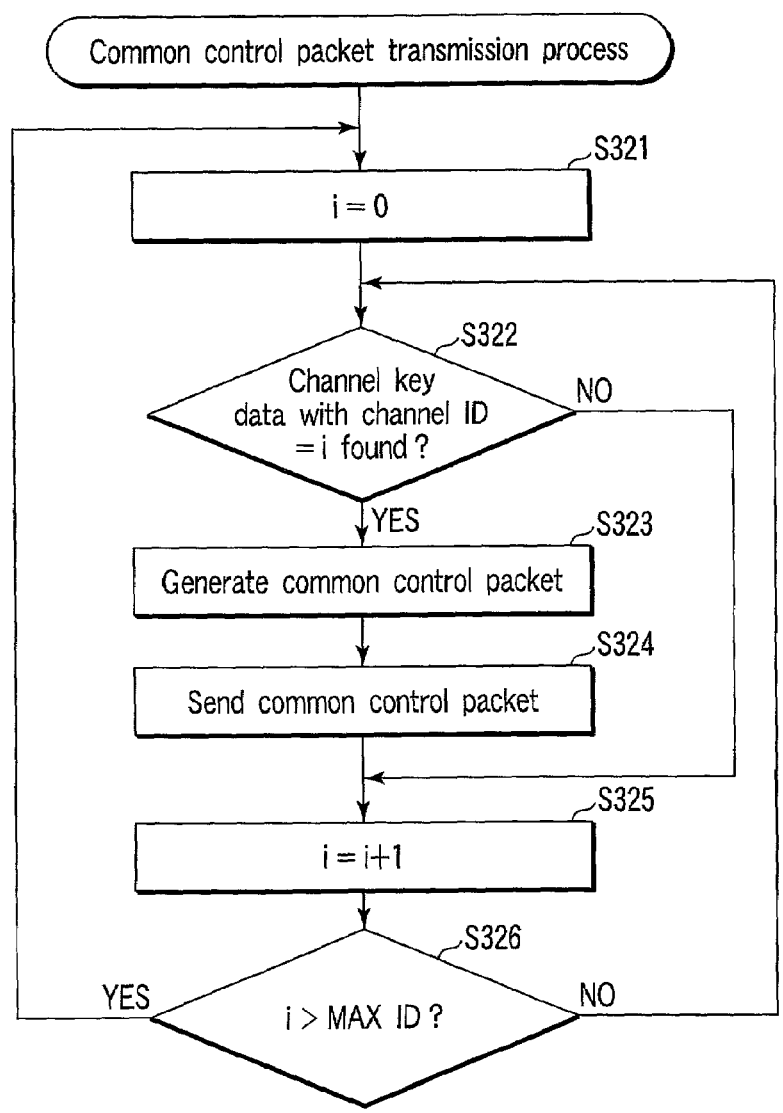
FIG. 34 is a flow chart for explaining the transmission processing operation of a common control packet.

The arrangement and processing operation of an information distributor apparatus of a common control packet will be explained below. FIG. 30 shows principal part of the information distributor apparatus, and FIG. 34 is a flow chart showing the transmission processing operation of a common control packet. This process starts simultaneously with the beginning of broadcast, and is repeated without any interruption while the broadcast continues. Initially, i=1 is set (step S321), and a channel key database (DB) 312 is checked to detect if channel key data with channel ID=i is present (step S322).

Figure 33:
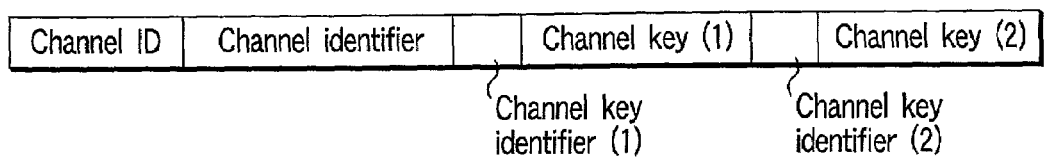
FIG. 33 shows an example of channel key data stored in a channel key database shown in FIG. 30.

In the channel key DB 312, channel key data for respective channels are registered. One channel key data is comprised of a channel ID, channel identifier, channel key identifier (1), channel key (1), channel key identifier (2), and channel key (2), as shown in FIG. 33. The channel ID is a number for database management, which is assigned to each channel, and assumes a value ranging from "1" to "MAXID" in this embodiment. The channel identifier is information that allows the receiver apparatus to identify each channel, and is the same as that described in the first to fourth embodiments. Furthermore, the channel key identifiers and channel keys are the same as those described in the first to fourth embodiments. The reason why two pairs of channel keys and channel key identifiers are contained is that the currently effective channel key and the next channel key must be sent together. However, the currently used channel key alone may be sent depending on the arrangement.

If channel key data with the channel ID=i is not found, the flow jumps to step S325 to increment i by one. If i<"MAXID" (step S326), the flow returns to step S322, i.e., to check the next channel ID. Otherwise, since this means that a channel transmission process for all data has been completed once, step S321 is executed, i.e., i=1 is set to start from channel data check.

A case will be examined below wherein channel key data with the channel ID=i is found in step S322. In such case, a common control information generator 313 acquires a channel identifier, channel key identifier (1), channel key (1), channel key identifier (2), and channel key (2) from that channel data. Also, the generator 313 searches the work key DB 311 using the channel identifier or channel ID as a key to extract an effective work key of that channel, and encrypts data to be encrypted of a common control packet. Furthermore, the generator 313 generates a common control packet by appending the work key identifier of the work key used, and the information identifier to the above data, and passes the packet to a transmitter 315 (step S324). The transmitter 315 transmits the generated common control packet via a broadcast wave.

In the fifth embodiment, since an individual control packet is sent via bi-directional communication means such as the public telephone network or the like, not only the information volume of control information that occupies the broadcast band can be reduced, but also the reception state of the individual control packet can be recognized on the information distributor apparatus side. In this way, since the transmission pattern is changed in consideration of the properties of the individual and common control packets, a necessary broadcast band can be assured, and the security of the conditional access system can be improved.

(Sixth Embodiment)

This embodiment is directed to an information distributor apparatus (to be also referred to as a contract management center apparatus or contract management apparatus hereinafter) corresponding to the broadcast receiver apparatus described in the second embodiment, in which the transmitting side confirms the authenticity of the receiver apparatus by the challenge-response scheme.

This embodiment is also directed to an information distributor apparatus (to be also referred to as a contract management center apparatus or contract management apparatus hereinafter) used in a conditional access system which repossesses a PPV (pay per view) reception history before the contract management center sends an individual control packet via the public telephone network.

The arrangement and processing operation of an information distributor apparatus which can implement both the functions will be explained below.

Figure 35:
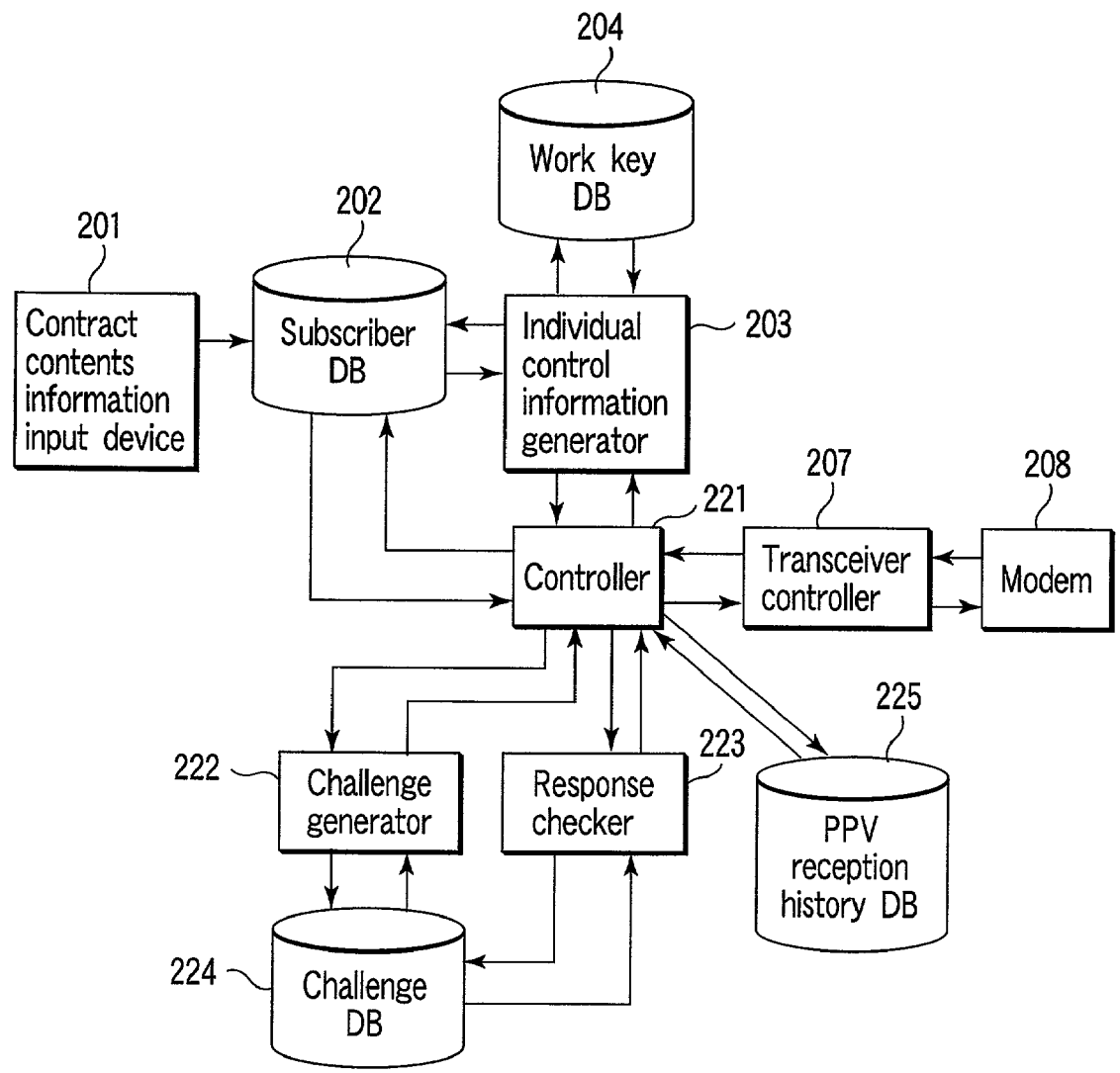
FIG. 35 is a block diagram showing an example of the arrangement of principal part of an information distributor apparatus of individual control information according to the sixth embodiment of the present invention, which corresponds to the broadcast receiver apparatus according to the second embodiment (FIG. 14)
Figure 36:
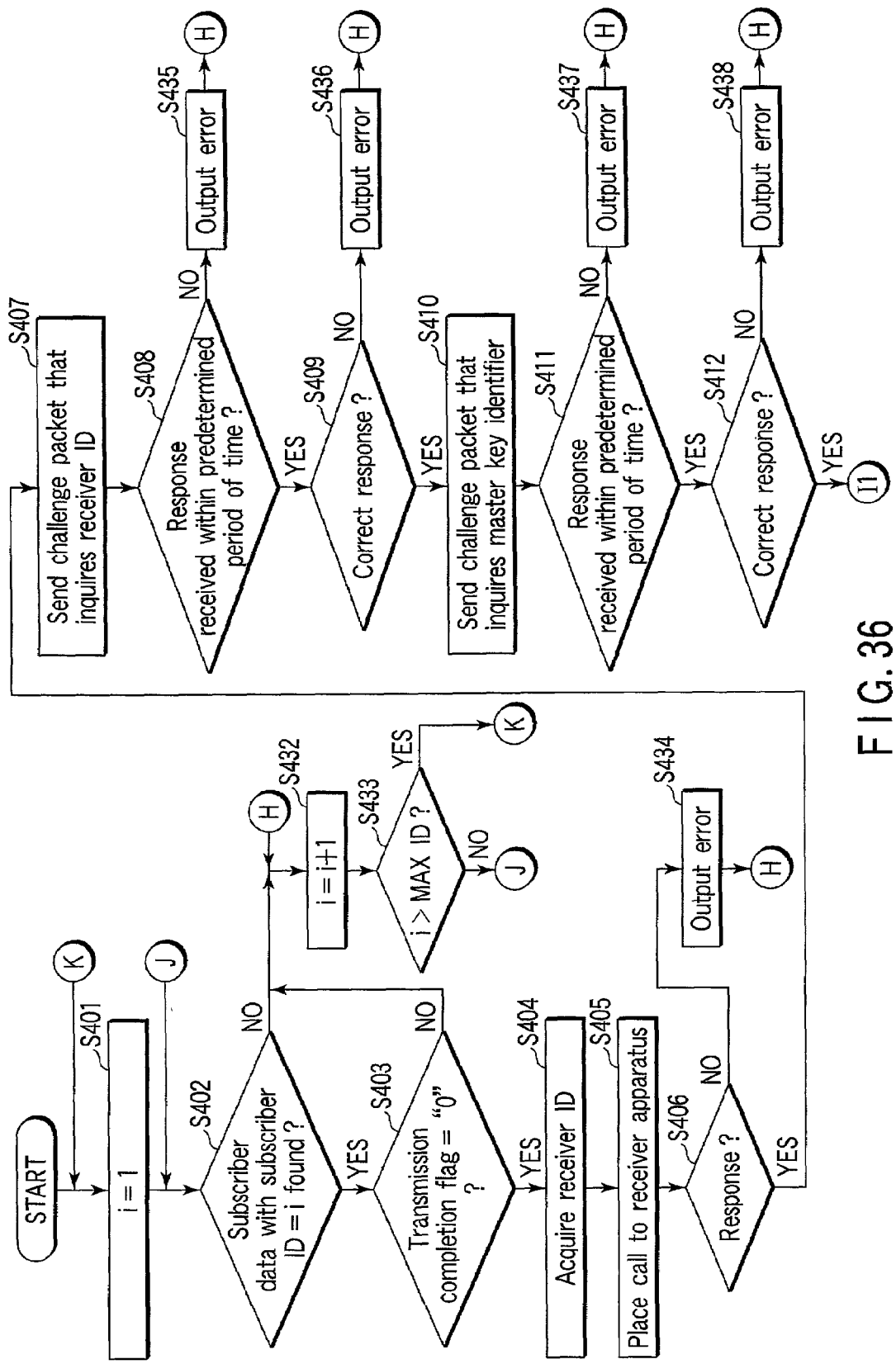
FIG. 36 is a flow chart for explaining the processing operation of the information distributor apparatus shown in FIG. 35.
Figure 37:
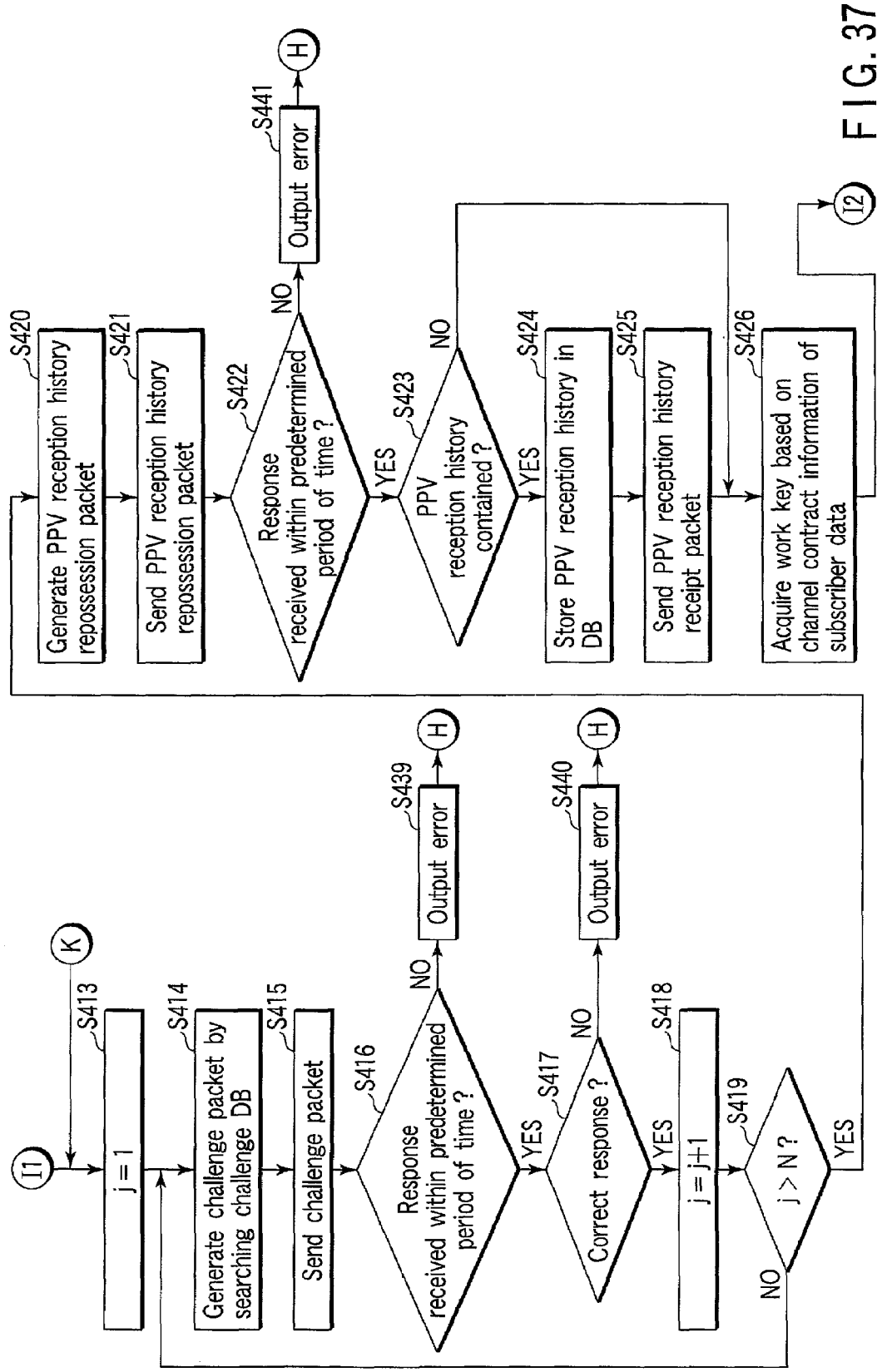
FIG. 37 is a flow chart for explaining the processing operation of the information distributor apparatus shown in FIG. 35.
Figure 38:
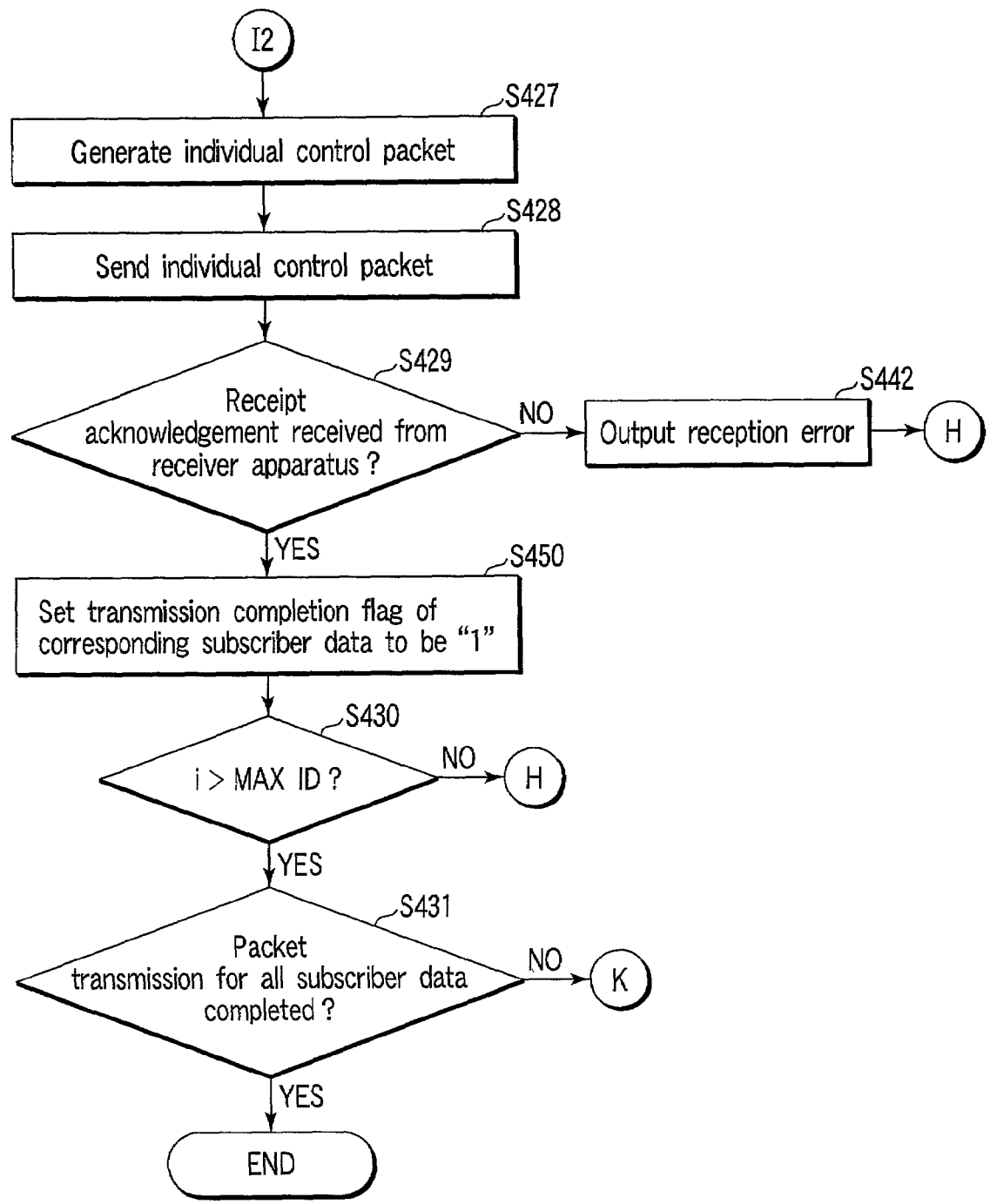
FIG. 38 is a flow chart for explaining the processing operation of the information distributor apparatus shown in FIG. 35.

FIG. 35 shows an example of the arrangement of principal part of an information distributor apparatus according to the sixth embodiment. The processing operation of the information distributor apparatus shown in FIG. 35 will be described below with reference to the flow charts shown in FIGS. 36 to 38. This process is launched at an appropriate timing (e.g., every month) in consideration of a contract update period. A controller 221 sets i=1 (step S401), and searches the subscriber DB 202 to check if subscriber data having a subscriber ID=i is stored (step S402). If such subscriber data is not found, the increment process described in the fifth embodiment is executed, and the flow returns to check the next subscriber data. If subscriber data is found in step S402, the transmission completion flag of that subscriber data is checked. If the flag is "0", the controller 221 acquires the receiver ID and dial number from the subscriber data, and calls the corresponding receiver using the dial number via the transceiver controller 207 (steps S404 and S405). If the receiver apparatus does not respond (receive) to the call (step S406), a reception error message is output (step S434).

If the receiver apparatus responds, the flow advances to step S407, and the controller 221 requests a challenge generator 222 to generate a challenge that inquires the receiver ID. The challenge generator 222 generates the corresponding challenge packet by looking up a challenge database (DB) 224.

Note that the challenge DB 224 stores pairs of challenge numbers and processes of various challenges. In this case, the challenge generator 222 extracts processing contents from the challenge DB 224 using a challenge number of the receiver ID inquiry as a key. The generated challenge packet is sent to the transceiver controller 207, which transmits the packet to the receiver apparatus (step S407).

If no response packet is received from the receiver apparatus within a predetermined period after transmission, an error indicating the unsuccessful challenge of the receiver ID inquiry is output (step S435), the flow advances to step S432 to execute the increment process, and the process for the next subscriber record then starts (steps S433 and S402). If a response packet is received, that response packet is sent to a response checker 223 via the transceiver controller 207 and controller 221. The response checker 223 checks if the received receiver ID matches that in the subscriber data (step S409). If the two IDs do not match, an error indicating mismatch of the receiver IDs is output (step S436), the flow advances to step S432 to execute the increment process, and the process for the next subscriber record then starts.

If the response checker 223 confirms in step S409 that a correct response is obtained, a challenge that inquires a master key identifier is similarly generated, and its response is checked (steps S410 to S412). If the master key identifier in the subscriber data does not match that sent as the response, an error indicating mismatch of the master key identifiers is output (step S438), and the process for the next subscriber record starts after the increment process. If the two identifiers match, the flow advances to step S413 in FIG. 37, and a receiver authentication process to be described below is executed.

In the receiver authentication process, one or more challenges that inquire using information only an authentic receiver apparatus knows are generated, and authentication is made using their responses. The controller 221 sets "1" in variable j (step S413), and requests the challenge generator 222 to issue an authentication challenge. Upon receiving the request, the challenge generator 222 randomly extracts a challenge from the challenge DB 224, generates a challenge packet, and passes it to the controller 221 (step S414). This challenge packet is sent to the receiver apparatus via the transceiver controller 207 (step S415). If no response is received from the receiver apparatus within a predetermined period after transmission (step S416), an error indicating the unsuccessful challenge is output (step S439), the increment process is executed (steps S432 and S433), and the process for the next subscriber record starts.

Upon receiving a response, that response packet is sent to the response checker 223 via the transceiver controller 207 and controller 221, and the response checker 223 checks authenticity in accordance with an authentication algorithm specified in the challenge DB 224 (step S417). If authentication succeeds, since it is confirmed that a correct response is received, the flow advances to step S418 to increment j by one, and it is then checked if j>N (step S419). N is a constant depending on the system, and indicates the number of times of trial of the authentication challenge. If j<N, the authentication process is repeated until j exceeds N.

If authentication fails in step S417, since a wrong response is received, an error indicating unsuccessful authentication is output (step S440), and the process for the next subscriber record starts after the increment process (steps S432 and S433).

As a result of the above authentication process, if j>N (step S419), this means that authentication is complete, and it is confirmed that the receiver apparatus with which the information distributor apparatus is now communicating is authentic. The controller 221 requests the challenge generator 222 to generate a PPV reception history repossession packet. The challenge generator 222 generates a challenge packet for repossessing a PPV reception history (PPV reception history repossession packet) by looking up, e.g., the challenge DB 224, and passes it to the controller 221 (step S420). The controller 221 sends the challenge packet to the receiver apparatus via the transceiver controller 207 and a modem 208 (step S421). The control waits for a predetermined period of time after transmission, and if no response is received, an error indicating no response to the PPV reception history repossession challenge is output (steps S422 and S441), and the process for the next subscriber record starts after the increment process (steps S432 and S433).

If a response is received, the received response packet is passed to the response checker 223 via the controller 221. The response checker 223 checks the format of the response packet, and also the presence/absence of a reception history (step S423). If the PPV reception history is contained, the reception history is passed to the controller 221, which stores it in a PPV reception history database (DB) 225 (step S424). Although a detailed description will be omitted, an audiovisual fee is collected from the subscriber later on the basis of this reception history.

On the other hand, after the controller 221 confirms that the PPV reception history is registered in the DB 225, it generates a PPV reception history receipt packet, and sends it to the receiver apparatus (step S425). If no PPV reception history is contained in step S423, the control skips the processes in steps S424 and S425.

Upon completion of the PPV reception history repossession process, the controller 221 requests the individual control information generator 203 to generate an individual control packet of the subscriber data of interest. Upon reception of this request, the individual control information generator 203 acquires work keys of channels that the subscriber can watch from the work key DB 204 on the basis of the channel contract information of the subscriber data of interest (step S426). In this embodiment, since work keys are set for respective channels, a process for acquiring a work key is required in correspondence with the number of contract channels.

The individual control information generator 203 generates a contract information segment except for a digital signature on the basis of the pairs of acquired work keys and work key identifiers, and the receiver ID and channel contract information of the subscriber data of interest, and generates contract information shown in FIG. 5 using a digital signature generating key. Furthermore, the generator 203 encrypts the contract information using the master key of the subscriber data of interest, and appends the master key identifier and information identifier, thus generating an individual control packet shown in FIG. 7 (step S427).

The generated packet is sent to the transceiver controller 207 via the controller 221, and is transmitted to the receiver apparatus (step S428). If a receipt acknowledgement is received from the receiver apparatus within a predetermined period after transmission (step S429), the transmission completion flag of that subscriber data is set at "1" (step S450), the increment process is executed (steps S432 and S433), and the process for the next subscriber data then starts. If no receipt acknowledgement is received (step S429), an error indicating receipt failure of the individual control packet is output (step S442), the increment process is executed (steps S432 and S433), and the process for the next subscriber data then starts. After the transmission completion flags of all subscriber data are set at "1" (step S431), the overall process ends.

As described above, according to the sixth embodiment, since repossession of a PPV reception history and transmission of an individual control packet can be executed after the authenticity of the receiver apparatus is confirmed, a highly secure conditional access system which can prevent unauthorized subscription can be built. Especially, a PPV reception history cannot often be repossessed since the subscriber can disconnect a telephone line. However, according to this embodiment, since individual control information is updated after the PPV reception history is repossessed, if the PPV reception history cannot be repossessed, even normal broadcast programs cannot be watched. In other words, the processing order is essential in this embodiment, and the PPV reception history must be repossessed prior to update of individual control information.

As can be seen from the above description, an embodiment that partially carries out this embodiment can also be achieved. For example, repossession of a PPV reception history can be omitted. In practice, this embodiment is carried out by omitting repossession of a PPV reception history for broadcast business that does not provide any PPV service. Even in this case, this embodiment is effective upon checking the authenticity of a receiver apparatus, and this is the first variation. On the other hand, an embodiment that omits authentication of a receiver apparatus is also available. In this case, when a PPV reception history is repossessed prior to delivery of individual control information, the PPV reception history can be repossessed securely, and this is the second variation. The first and second variations have been explained.

(Seventh Embodiment)

In this embodiment, a charge for an audiovisual fee is changed depending on whether or not an individual control packet is received. When a subscriber changes contract contents (e.g., changes a channel he or she wants to watch, and so forth), the conventional system collects an audiovisual fee according to the changed contract contents from the month or next month of application of the change (regardless of whether or not the channel contract information is changed on the receiver side). In this embodiment, in order to charge an audiovisual fee in accordance with an actual audiovisual form, a change in charge for an audiovisual fee is determined depending on whether or not the receiver apparatus receives an individual control packet that updates the contract information of that receiver apparatus in accordance with a change in contract. With this arrangement, free subscription after the contract of all channels is canceled can be prevented.

An information distributor apparatus of individual control information according to the seventh embodiment has the same arrangement as that of the information distributor apparatus according to the fifth embodiment shown in FIG. 29. In the seventh embodiment, however, the contents of a subscriber record of the subscriber DB 202 are different. That is, as shown in FIG. 39, subscriber data contains old channel contract information before subscribed channels are changed (change in contract), and new channel information after subscribed channels are changed (change in contract) in place of the current channel contract information shown in FIG. 31, and an audiovisual validity flag is appended.

The old channel contract information is that of the receiver apparatus before change, and the new channel contract information is that after change. However, for a new subscriber who joins the pay broadcast service, channel contract information with "1" bits corresponding to channels designated upon contract is contained as the new channel contract information, and channel contract information with "0" bits corresponding to all channels (except for free channels) is contained as the old channel contract information. The audiovisual validity flag is 1-bit data which indicates whether or not the new channel contract information is reflected in the receiver apparatus (the channel contract information stored in the receiver apparatus has been updated to the new channel contract information). If this flag is "1", it indicates that the new channel contract information is valid; if the flag is "0", it indicates that the old channel contract information is valid.

The process of this embodiment is substantially the same as that shown in FIG. 32 of the fifth embodiment, except that the following process is added. That is, if the receipt acknowledgement of the individual control packet is received in step S310, the transmission completion flag of that subscriber record is set at "1", and the audiovisual validity flag is also set at "1" in step S312, thus reflecting it on the subscriber DB 202. In this manner, since the currently valid channel information (stored in the contract information storage 121) on the actual receiver apparatus side can also be detected on the subscriber DB 202, a charge can be changed based on the actually valid channel contract information upon charging an audiovisual fee. In practice, in the prior art and the fifth embodiment, a fee is uniformly collected based on a new contract form irrespective of the state of the channel contract information in the receiver apparatus. However, using the seventh embodiment, since audiovisual fee account closer to an actual contract form can be realized, not only free subscription can be avoided, and claims from subscribers due to collection of an audiovisual fee for channel contract information which he or she did not receive in practice can be avoided.

(Eighth Embodiment)

The eighth embodiment will explain an information distributor apparatus for sending an individual control packet to the broadcast receiver apparatus described in the fourth embodiment. Since the information distributor apparatus according to the eighth embodiment has many overlaps in a description of the arrangement and processing operation of the information distributor apparatus according to the fifth embodiment shown in FIG. 29, only differences will be explained.

The broadcast receiver apparatuses of the first and fourth embodiments similarly process individual control packets except for their data formats (the contract information contained in the individual control packet according to the fourth embodiment does not contain any work keys). That is, in FIG. 32, an individual control packet can be generated in step S305 by skipping step S304 of acquiring a work key.

For this reason, the information distributor apparatus of an individual control packet of the eighth embodiment has substantially the same arrangement as that shown in FIG. 29, except that the work key DB 204 is excluded from the arrangement of the information distributor apparatus in the fifth embodiment.

Hence, the following explanation will be given focused on an information distributor apparatus of a common control packet. As for a common control packet, the first embodiment sends channel key information alone as a common control packet, while the fourth embodiment sends two pieces of information, i.e., a channel key and master key generation information, using independent packets. For this reason, the eighth embodiment is essentially different from the fifth embodiment in that two different types of common control packets must be generated.

Figure 40:
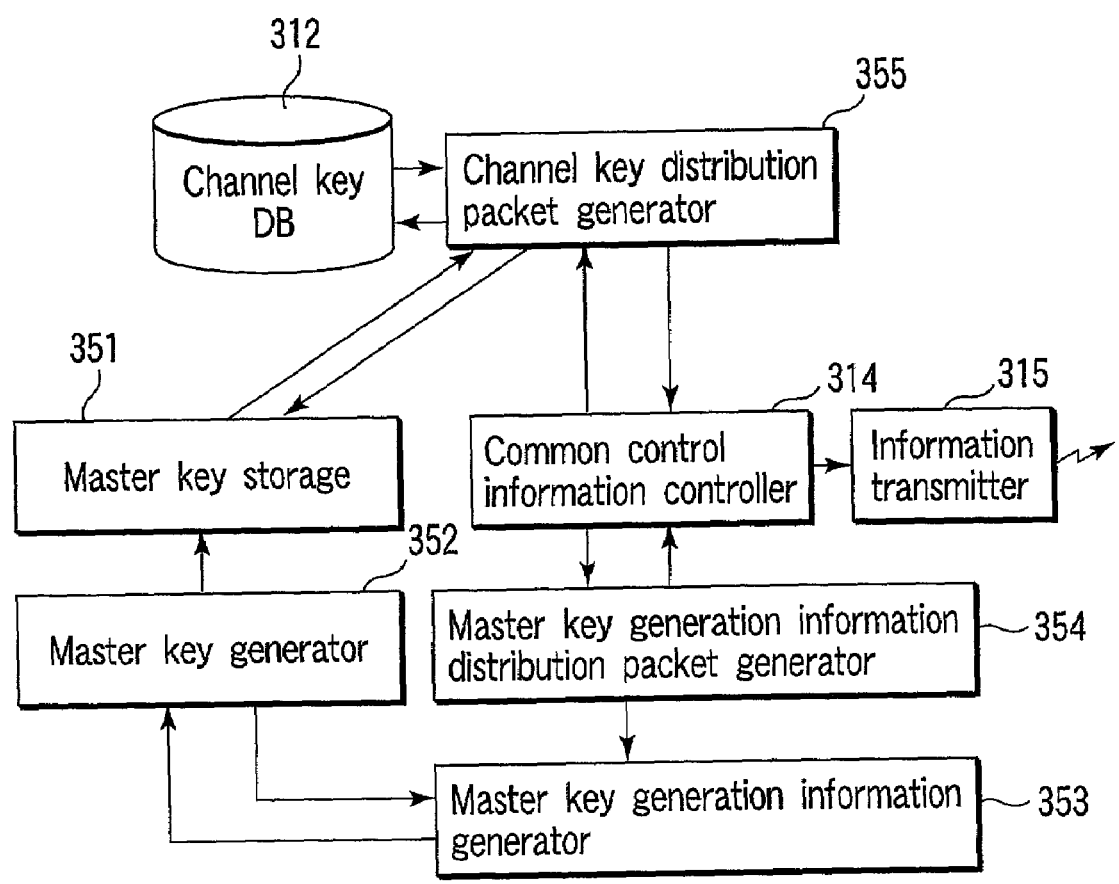
FIG. 40 is a block diagram showing an example of the arrangement of principal part of an information distributor apparatus of a common control packet according to the eighth embodiment of the present invention, which corresponds to the broadcast receiver apparatus according to the fourth embodiment.
Figure 41:
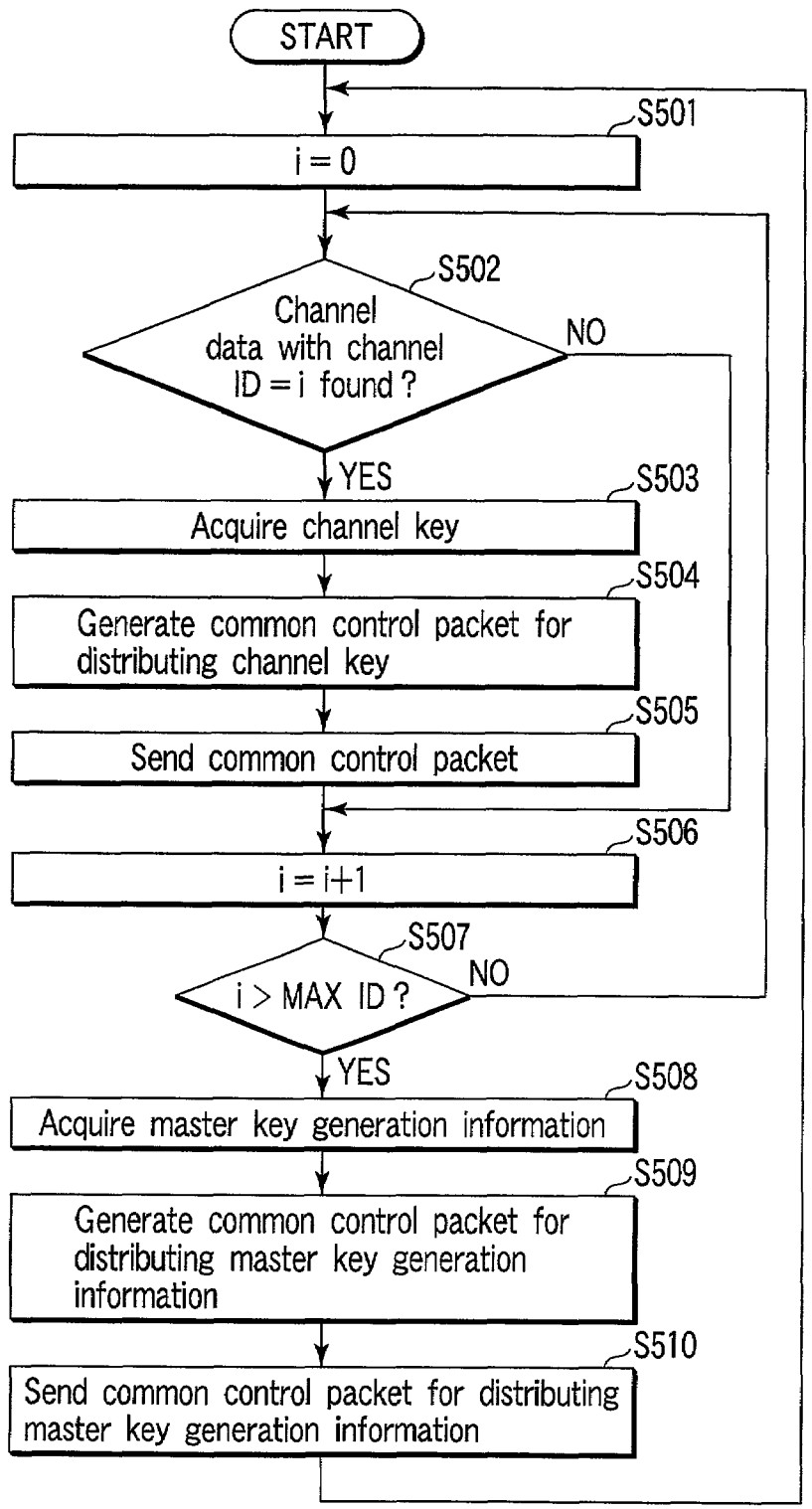
FIG. 41 is a flow chart for explaining the transmission processing operation of a common control packet by the information distributor apparatus shown in FIG. 40.

FIG. 40 shows the arrangement of an information distributor apparatus according to the eighth embodiment, and FIG. 41 shows its processing operation. The processing operation will be explained below based on FIG. 41 with reference to FIG. 40.

This process starts simultaneously with the beginning of broadcast, and is repeated without any interruption until the broadcast ends. Upon receiving a processing start instruction from a common control information controller 314, a channel key distribution packet generator 355 sets i=1 (step S501), and searches the channel key DB 312 to check if channel key data with the channel ID=i is present (step S502). If a channel key with the channel ID=i is found, the generator 355 acquires a channel identifier, channel key identifier (1), channel key (1), channel key identifier (2), and channel key (2) from that channel key data (step S503), and generates a part of a common control packet for distributing channel keys. Furthermore, the generator 355 extracts the currently valid master key from a master key storage 351, and encrypts a section to be encrypted (from the channel identifier to channel key (2)) of the common control packet for distributing channel keys shown in FIG. 27 using the master key. Moreover, the generator 355 generates a common control packet by appending a master key identifier of the master key used upon encrypting the common control packet for distributing channel keys, and an information identifier for identifying a common control packet for distributing channel keys (step S504), and passes the packet to the information transmitter 315. The information transmitter 315 transmits the packet via a broadcast wave (step S505).

On the other hand, if a channel key with a channel ID=i is not found in step S502, the flow jumps to step S506 to increment i by one. If i<"MAXID" (step S507), the flow returns to step S502 to check the next channel ID. If i>"MAXID", since this means that a channel key transmission process for all data has been completed once, the channel key transmission process is temporarily interrupted, and the flow enters the transmission process of master key generation information in step S508 and subsequent steps.

Upon receiving a packet generation request from the common control information controller 314, a master key generation information distribution packet generator 354 acquires the currently valid master key generation information generated by a master key generation information generator 353 and a master key identifier corresponding to that master key generation information (step S508), combines them in accordance with the structure of a packet for distributing master key generation information shown in FIG. 27B, and appends a digital signature to that packet. Furthermore, the generator 353 generates a common control packet for distributing master key generation information by appending an information identifier thereto (step S509), and passes it to the information transmitter 315, which transmits that packet via a broadcast wave (step S510).

Note that the master key generation information generator 353 periodically generates master key generation information as random number seed information using, e.g., known random number generation means, and a master key generator 352 holds the same algorithm as that of the master key generator 182 in the receiver apparatus and generates the currently valid key using the master key generation information generated by the master key generation information generator 353 and that algorithm. The master key storage 351 stores that currently valid master key.

The eighth embodiment has been explained. Principal part of this embodiment can be applied to the information distributor apparatuses described in the fifth to seventh embodiments, as can be seen from the above description.

In broadcast using a fewer number of channels, conditional access can be implemented using work keys alone without any channel contract information. In practice, since the work keys are set for respective channels, when the work keys are updated every reception term (e.g., one month), and the updated work keys are sent as individual control information to only subscribers who subscribe to those channels, thus achieving defined subscription by only contractors.

In such arrangement, upon receiving a channel key of a given channel in the form of a common control packet, the receiver apparatus checks using a work key identifier described in the header of the common control packet as a key if the work key of that channel is stored in the work key storage. If the work key is stored, the receiver apparatus decrypts the encrypted section of the control packet to acquire the channel key of that channel. If such work key is not stored, the process for the common control packet ends. In this way, since only a contractor of that channel, who has the work key of the channel, can acquire the channel key, conditional access can be implemented.

In this manner, a conditional access system can be constructed by only updating work keys of respective channels every reception term. However, when the number of channels is large like in the current CS broadcast, it is not practical to update work keys every reception term since the update information of the work keys becomes huge. Therefore, the current CS broadcast preferably adopts a system that uses the channel contract information described in the first to eighth embodiments together. However, it is effective for broadcast using only one channel (or having only one contract form) to adopt a conditional access system using the work key alone, since only one work key need be used.

In the first embodiment and associated embodiments, the channel contract information and work keys stored in the receiver apparatus may be simultaneously updated by a single individual control packet or either of the channel contract information and work keys may be updated.

In the first to eighth embodiments, a digital signature may be generated by encrypting an information section to be digitally signed, and a hash value as its feature amount. That is, a digital signature in contract information in, e.g., FIG. 5 may be generated by encrypting a section other than the digital signature and its hash value.

(Ninth Embodiment)

Figure 42:
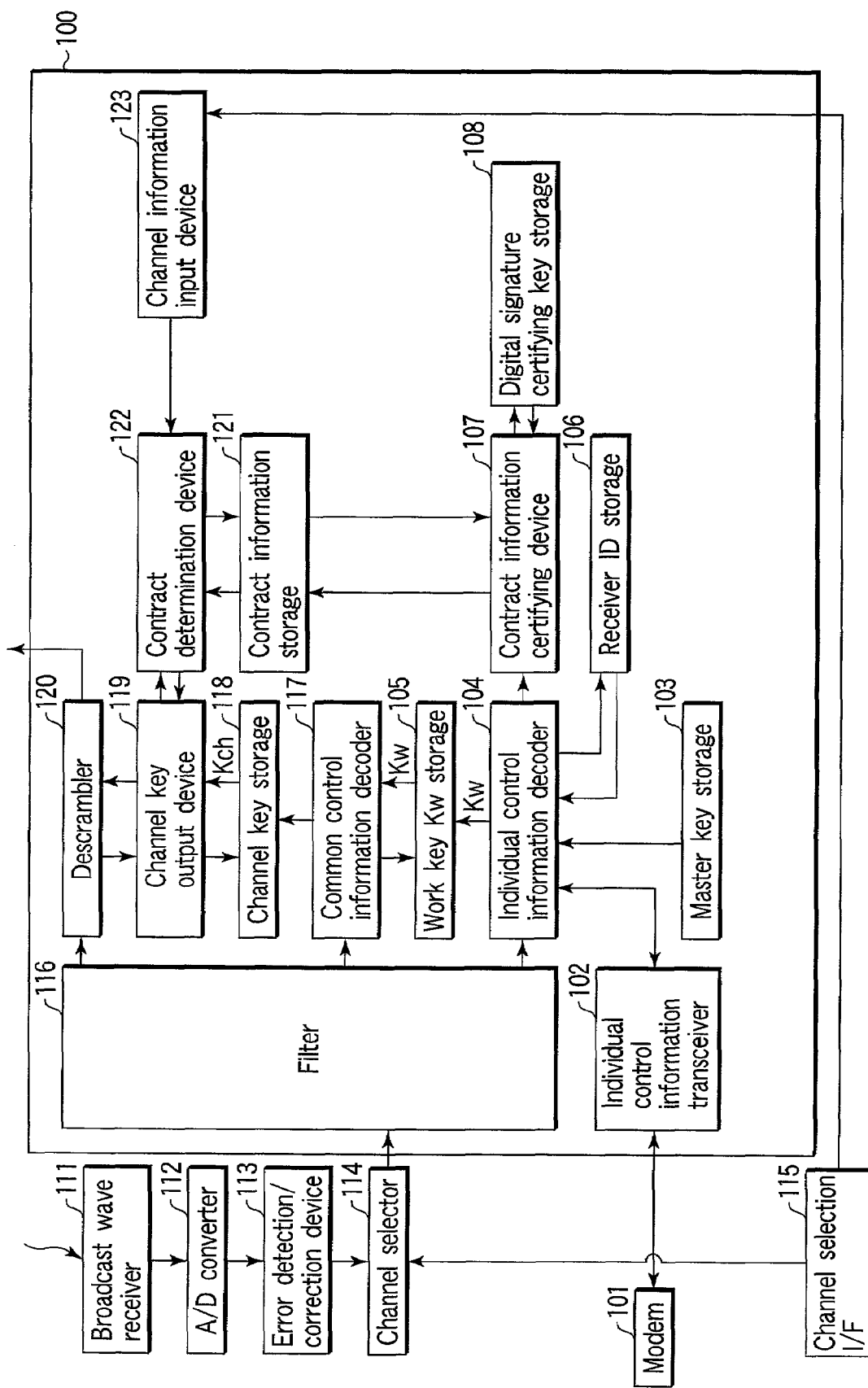
FIG. 42 is a block diagram of a broadcast receiver apparatus according to the ninth embodiment of the present invention.

An information distributor apparatus according to the ninth embodiment will be described below with reference to FIG. 42. This embodiment is characterized in that when reception of individual control information at a receiver apparatus cannot be confirmed, the individual control information is broadcasted.

The arrangement and processing operation of a broadcast receiver apparatus according to the ninth embodiment will be explained below. The individual control packet reception processing operation of the broadcast receiver apparatus shown in FIG. 42 via bi-directional communications is the same as that in FIG. 9, and a detailed description thereof will be omitted.

Figure 43:
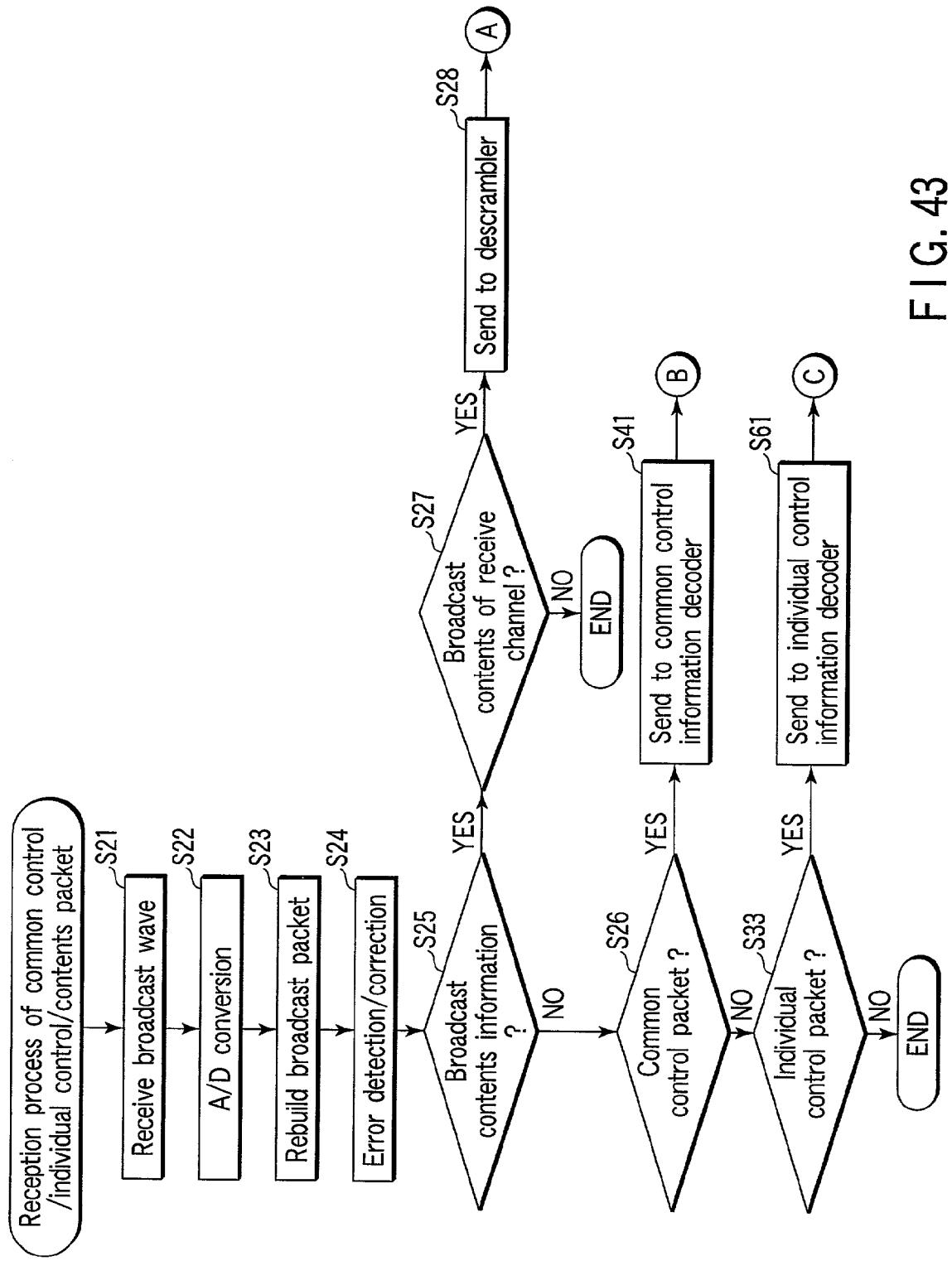
FIG. 43 is a flow chart for explaining the reception processing operation of an individual control packet/common control packet/contents packet via a broadcast wave by the broadcast receiver apparatus shown in FIG. 42.
Figure 44:
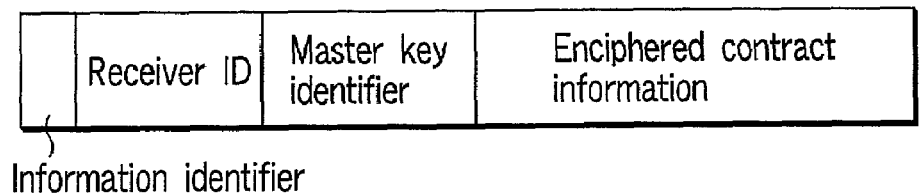
FIG. 44 shows an example of the data format of an individual control packet.

The processing operation when the broadcast receiver apparatus shown in FIG. 42 receives individual control information, contents information, and common control information from a broadcast wave will be explained below with reference to the flow chart in FIG. 43. In this embodiment, when an error message is sent back to the center in the operation shown in the flow chart of FIG. 9 and reception of individual control information at the receiver apparatus cannot be confirmed in the individual control packet reception processing operation via bi-directional communications, the center transmits a broadcast wave containing not only common control information and a contents packet but also individual control information. In this case, an individual control packet to be broadcasted is that for distributing contract information, and a receiver ID is appended to an unencrypted section, as shown in FIG. 44. This receiver ID is information indicating a receiver apparatus as a destination of this individual control packet, and is indispensable since a master key (used to decrypt this packet) differs for respective receiver apparatuses.

The receiver apparatus receives a broadcast wave which is transmitted from the center and contains common control information, individual control information, and a contents packet, by a broadcast receiver 111 to obtain an electrical signal (step S21). This broadcast wave is converted by an A/D converter 112 from an analog signal into a digital signal, i.e., digital data in the form of a packet (steps S22 and S23). The digital data is sent to an error detection/correction device 113 to undergo error detection/correction (step S24). It is then checked with reference to the information identifier of the received packet if the received packet is a contents packet, common control packet, or individual control packet, and the flow branches in accordance with the checking result.

A channel selection interface (I/F) 115 acquires the channel identifier of the currently selected channel, and passes the acquired channel identifier to a channel selector 114 and channel information input device 123 (this process is the same as steps S51 to S53 in FIG. 12).

It is checked if the digital data is a contents packet (step S25), and if the digital data is a contents packet, the channel selector 114 detects the currently selected channel via the channel selection I/F 115, and passes only a contents packet of that channel to a filter 116 of a conditional access device 100 (step S27). The filter 116 sends the packet to a descrambler 120 (step S28).

On the other hand, if the digital data is a common control packet (step S26), that packet is sent to a common control information decoder 117 via the channel selector 114 and filter 116, thus starting decrypting (step S41).

Since the process for the contents packet sent to the descrambler 120 in step S28 is the same as that shown in FIG. 11, a description thereof will be omitted. Also, since the process for the common control packet sent from the filter 116 to the common control information decoder 117 is the same as that shown in FIG. 13, a description thereof will be omitted.

Figure 45:
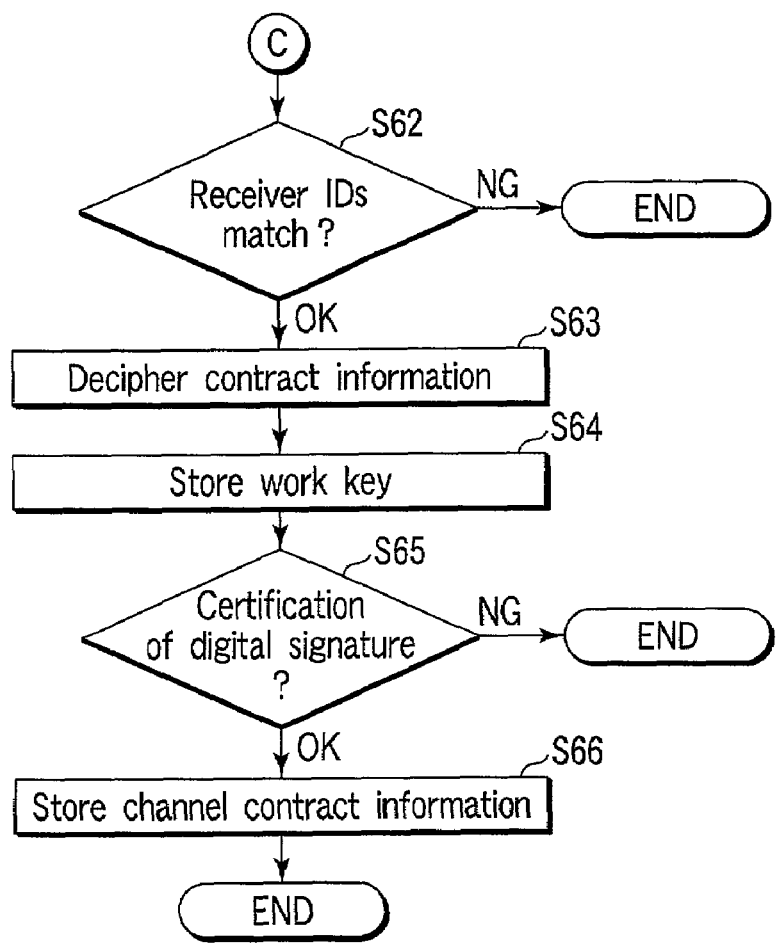
FIG. 45 is a flow chart for explaining the reception processing operation of an individual control packet/common control packet/contents packet via a broadcast wave.

The process for an individual control packet will be explained below with reference to the flow chart shown in FIG. 45. If it is determined that the digital data is an individual control packet (step S33 in FIG. 43), the individual control packet is sent from the filter 116 to an individual control information decoder 104 (step S61). The decoder 104 extracts the receiver ID from (the unencrypted section of) the individual control packet, and compares it with the receiver ID of the self apparatus stored in a receiver ID storage 106 (step S62 in FIG. 45). If the extracted receiver ID does not match that of the self apparatus, the process of this packet ends. On the other hand, if the two IDs match, the decoder 104 acquires a master key from a master key storage 103 using the master key identifier extracted from (the unencrypted section of) the individual control packet as a key. Furthermore, the decoder 104 decrypts the contract information in the individual control packet using the master key (step S63), extracts work keys and their identifiers from the decrypted contract information (see FIG. 5), and stores them in a work key storage 105 (step S64).

The decrypted contract information is sent to a contract information certifying device 107. The contract information certifying device 107 acquires a digital signature by encrypting a section other than the digital signature of this contract information using a digital signature certifying key stored in a digital signature certifying key storage 108, and compares it with the digital signature in the contract information, thus certifying the digital signature (step S65). If certification succeeds, the channel contract information in the contract information is stored in a contract information storage 121 (step S66), thus ending the process. If certification fails, since the channel contract information may have been tampered with or broken by reception errors, the process ends without storing any information.

As described above, according to the broadcast receiver apparatus of the ninth embodiment, since individual control information can be received in two ways, i.e., via bi-directional communications using the public telephone network or the like and a broadcast wave, when channel contract information or the like stored in the receiver apparatus is to be updated upon changing a channel a user wants to subscribe (updating changing contract contents), an individual control packet can be sent to a receiver apparatus connected to a bi-directional communication line via secure bi-directional communications, and to a receiver apparatus which is not connected for some reason via a broadcast wave.

(10th Embodiment)

This embodiment is directed to an information distributor apparatus which transmits a command for turning on the power supply of a bi-directional communication function (e.g., a portable telephone function) of the receiver apparatus via a broadcast wave prior to transmission of individual control information from the center using a bi-directional communication line.

In this manner, the receiver apparatus need not maintain the power supply ON (to set a call reception wait state) for individual control information, the reception timing of which is unknown, thus achieving power savings. Such power savings are important for a mobile environment using a battery as a main power supply.

FIG. 46 shows the arrangement of principal part of a broadcast receiver apparatus according to the 10th embodiment. In FIG. 46, the bi-directional communication function corresponds to a transceiver 102 and modem 101. However, since the present invention is characterized by the conditional access device, a detailed arrangement and description of a bi-directional communication function device will be omitted, and only the arrangement that pertains to power ON/OFF control of that function will be explained. For example, a portable phone may be connected to the transceiver 102 via a predetermined connection cable to build a bi-directional communication function device.

In FIG. 46, the format that pertains to the reception process of an individual control packet sent via a broadcast wave is different from the first embodiment. In practice, since the reception sequence of a common control packet is the same as that in the first embodiment, only differences, i.e., the format of an individual control packet received via a broadcast wave and its reception processing operation will be explained below.

In the 10th embodiment, an individual control packet received via a broadcast wave includes two different packets, i.e., a packet for distributing contract information, and a packet for distributing a command. Since the individual control packet for distributing contract information is the same as that in the ninth embodiment (see FIG. 44), only the individual control packet for distributing a command (to be also referred to as a command packet hereinafter) will be explained.

Figure 47:
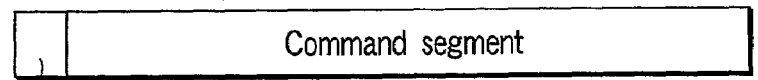
FIG. 47 shows an example of the data format of a command packet.
Figure 48:
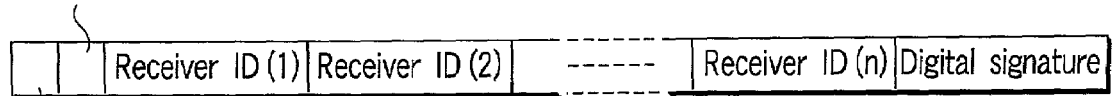
FIG. 48 shows an example of the data format of a command segment.

The command packet is comprised of an information identifier and a command segment, as shown in FIG. 47. The command segment roughly contains a command identifier, the number of receiver IDS, a sequence of receiver IDs in correspondence with the number of receiver IDS, and a digital signature, as shown in FIG. 48. The digital signature is appended to prevent the number of receiver IDS and the sequence of receiver IDS from being tampered with. The command identifier identifies a "power ON" command that starts power supply to the bi-directional communication function of the broadcast receiver apparatus to set the function to receive an incoming call anytime it comes in (call reception wait state). The command that that distributes the "power ON" command will be referred to as a power ON command packet hereinafter.

Figure 49:
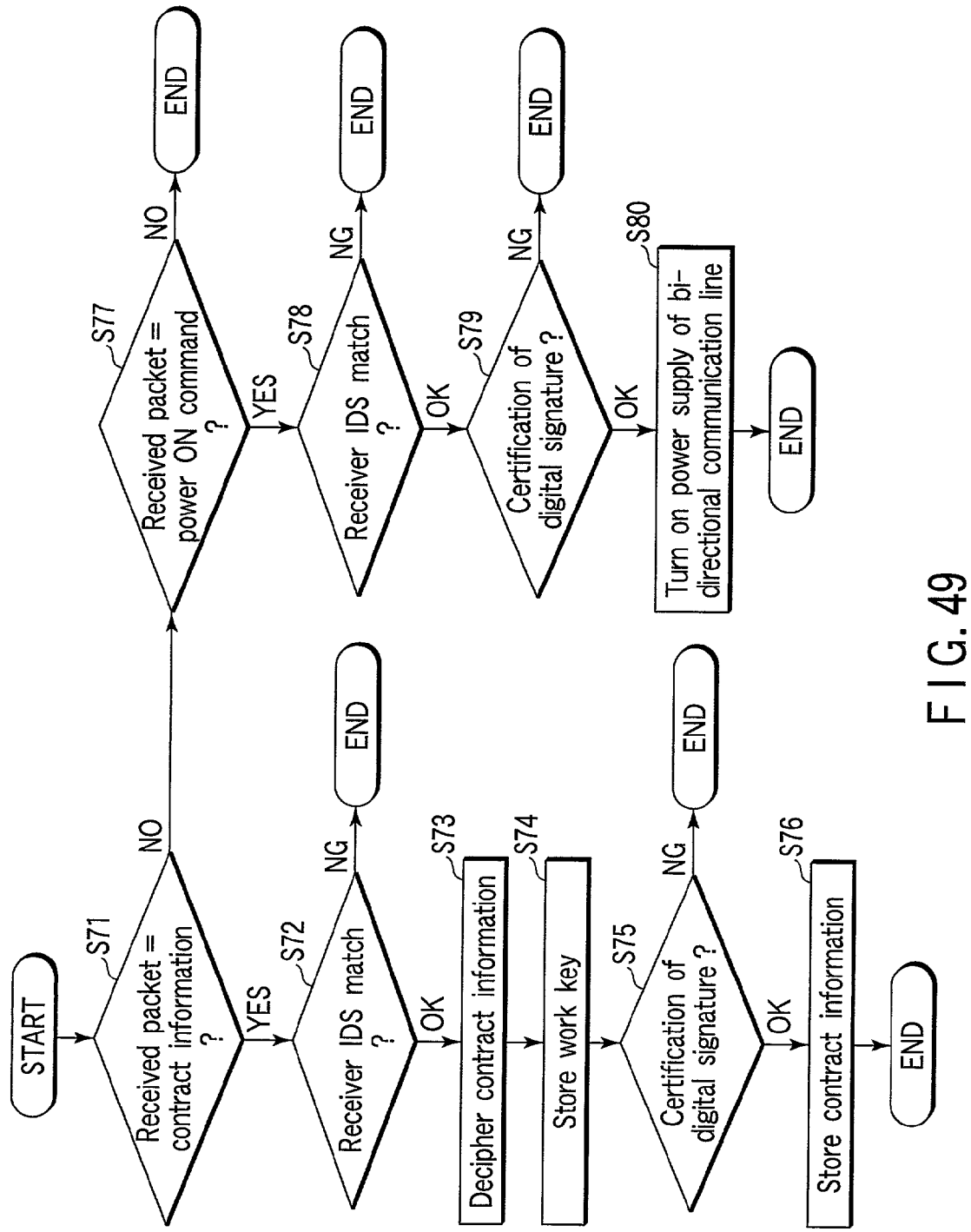
FIG. 49 is a flow chart for explaining the reception processing operation of an individual control packet via a broadcast wave by the broadcast receiver apparatus shown in FIG. 46.

FIG. 49 is a flow chart for explaining the reception processing operation of an individual control packet by the broadcast receiver apparatus shown in FIG. 46 via a broadcast wave. The processing flow will be explained based on FIG. 46 with reference to FIG. 49.

The filter 116 passes a packet to the individual control information decoder 104. The decoder 104 checks the information identifier of that packet, and if the packet is an individual control packet for distributing contract information, the same process as in the ninth embodiment (see FIG. 45) is executed (steps S71 to S76).

If the packet is a command packet, the individual control information decoder 104 checks with reference to the command identifier in the packet if the packet is a power ON command packet (step S77). If the packet is not a power ON command packet, the process ends.

If the packet is a power ON command packet, the decoder 104 compares the receiver ID of the self apparatus stored in the receiver ID storage 106 with the receiver IDS in the packet one by one (step S78). If the receiver ID of the self apparatus is not contained in the packet, the process ends. If the receiver ID of the self apparatus is contained, the decoder 104 sends that packet to the individual control information certifying device 107.

The individual control information certifying device 107 acquires a certifying key from the digital signature certifying key storage 108, and certifies the digital signature (step S79). If certification of the digital signature fails, the process ends; otherwise, a signal that instructs a power supply management device 125 to start to supply electric power to function devices which pertain to the bi-directional communication function such as the modem 101, transceiver 102, and the like (to turn on the power supply) is sent. Upon receiving this signal, the power supply management device 125 begins to supply electric power to these function devices to set a call reception wait state (step S80).

Since the bi-directional communication function is set in the call reception wait state, the broadcast receiver apparatus can receive an individual control packet for distributing contract information via the bi-directional communication line in the sequence shown in FIG. 9.

Note that the power supply means a standby power supply (electric power) of the bi-directional communication line to wait for an incoming call. In some arrangements, the power supply for other building devices can be turned on (or off) by the command packet. Note that the power supply management device 125 preferably turns off the power supply which is turned on according to this embodiment after an individual communication packet for distributing contract information is received via the bi-directional communication line or after an elapse of a predetermined period of time if it is not received.

Since an individual control packet is sent by selectively using a broadcast wave and communication line, a conditional access system which is effective in terms of bandwidth reduction and power saving can be constructed.

(11th Embodiment)

The 11th embodiment is directed to a system in which the broadcast receiver apparatus places a call to allow the center to send individual control information via a bi-directional communication line. When the receiver apparatuses place calls, since calls are not distributed uniformly, the system on the center side cannot often receive them. This embodiment solves this problem. To this end, this embodiment comprises means for authenticating if the calling receiver apparatus is authentic. Making calls uniformly distribute does not always require authentication. However, when the receiver apparatus places a call, it is not easy to check the authenticity of the receiver apparatus and to maintain high security unless certifying means is provided, unlike in the ninth and 10th embodiments in which the center places a call.

FIG. 50 shows the arrangement of principal part of a broadcast receiver apparatus according to the 11th embodiment. In FIG. 50, the processing operation for receiving an individual control packet distributed via a broadcast wave is different from the first embodiment. Hence, only the format of an individual packet received from a broadcast wave, and its reception processing operation will be explained.

In the 11th embodiment, two types of individual control packets, i.e., a packet for distributing contract information and that for distributing a command (command packet), are received via a broadcast wave as in the 10th embodiment. The data format of an individual control packet used to distribute contract information is the same as that described in the first embodiment (see FIG. 38B), and the format of a command packet is substantially the same as that described in the 10th embodiment (see FIGS. 47 and 48), except that a command identifier is an identifier of a command that instructs the broadcast receiver apparatus to call the center. Such command is called a call originating command, and its packet is called a call originating command packet.

Figure 51:
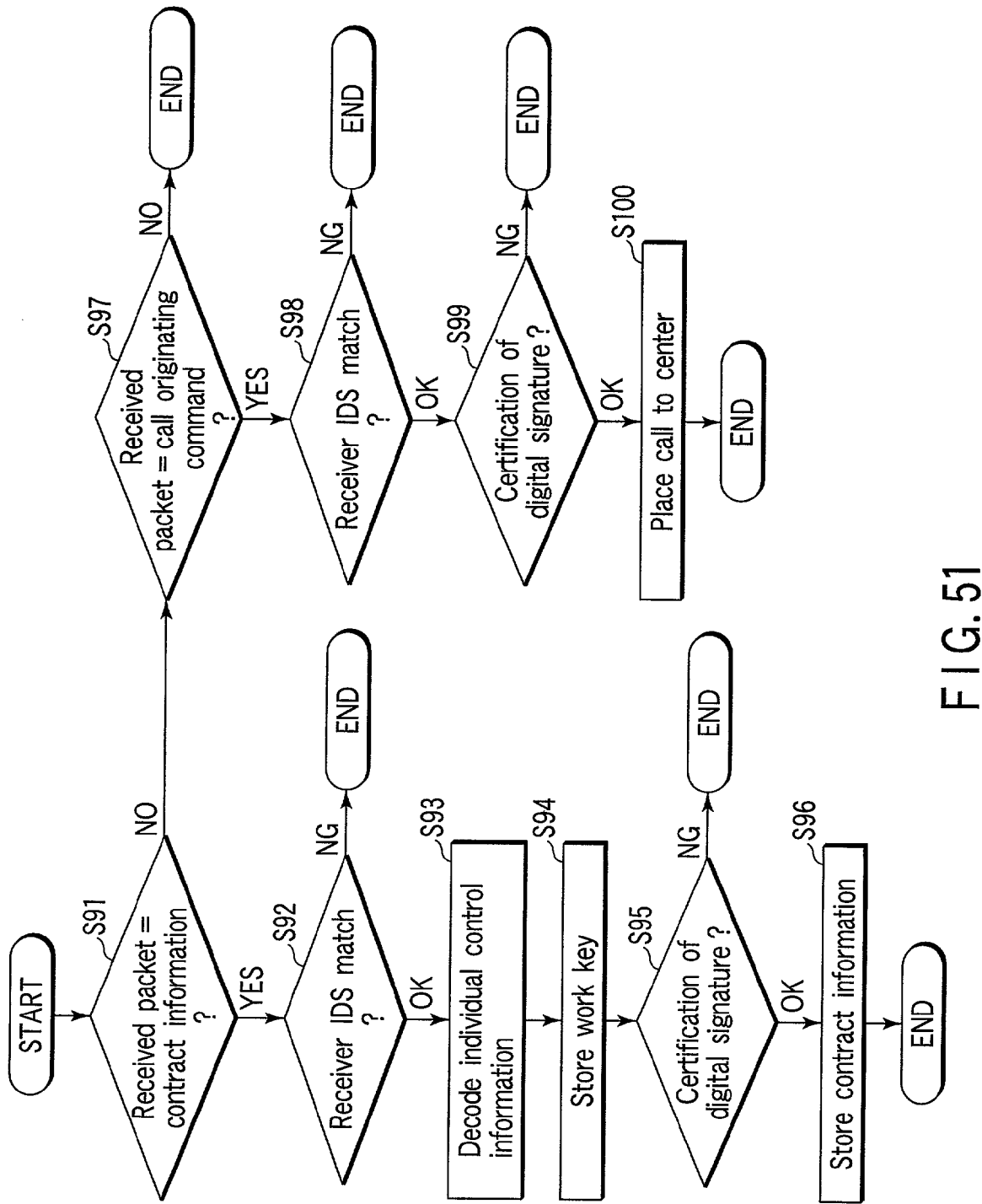
FIG. 51 is a flow chart for explaining the reception processing operation of an individual control packet via a broadcast wave by the broadcast receiver apparatus shown in FIG. 50.

FIG. 51 is a flow chart for explaining the reception processing operation of an individual control packet via a broadcast wave by the broadcast receiver apparatus shown in FIG. 50. The processing flow will be explained below using FIG. 51 on the basis of FIG. 50.

The filter 116 passes an individual control packet received via a broadcast wave to the individual control information decoder 104. The information identifier of that packet is checked, and if the packet is a packet for distributing contract information, the same process as in the first embodiment (see FIG. 45) is executed (steps S91 to S96).

If the packet is a command packet, it is checked with reference to the command identifier in the packet if that packet is a call originating command packet (step S97). If the packet is not a call originating command packet, the process ends.

If the packet is a call originating command packet, the receiver ID of the self apparatus stored in the receiver ID storage 106 is compared with the receiver IDs in the packet one by one (step S98). If the receiver ID of the self apparatus is not contained in the packet, the process ends. If the receiver ID of the self apparatus is contained, that packet is sent to the individual control information certifying device 107.

The individual control information certifying device 107 acquires a certifying key from the digital signature certifying key storage 108, and certifies the digital signature (step S99). If certification of the digital signature fails, the process ends; otherwise, a signal that instructs to call the center is sent to a center call originating unit 162, which calls the center via the inter-center communication device 152 and modem 101 (step S100).

In the conditional access system that sends an individual control packet using both a broadcast wave and bi-directional communication, when a bi-directional communication line between the receiver apparatus and center is connected in response to a call placed by the receiver apparatus, the center instructs receiver apparatuses to call, and manages their call generation timings, thus preventing heavy traffic on the line to the center due to calls from the receiver apparatuses concentrated in a given time band.

Figure 52:
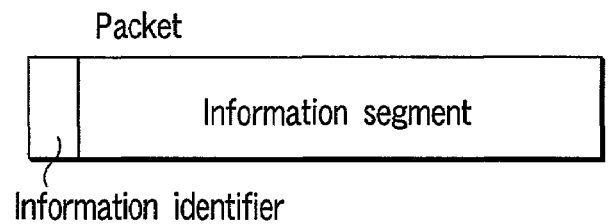
FIG. 52 shows an example of the data format of a packet exchanged via bi-directional communications.

The processing operation from when the broadcast receiver apparatus calls the center until it receives an individual control packet will be explained below. A packet exchanged via a bi-directional communication between the center and broadcast receiver apparatus is comprised of an information identifier and information segment, as shown in FIG. 52. The packet can be categorized into three packets by different contents of the information segment. In this embodiment, for example, the same packet as the individual control packet shown in FIG. 38A (this packet will be referred to as an individual control packet hereinafter to be distinguished from other two types of packets), a challenge packet, and a response packet are available.

Figure 53:
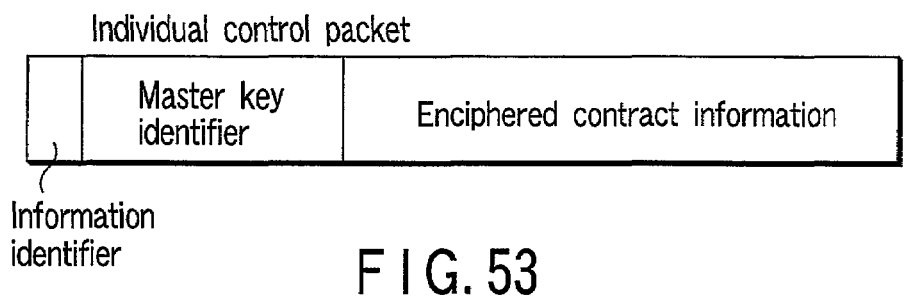
FIG. 53 shows an example of the data format of an individual control packet.
Figure 54:
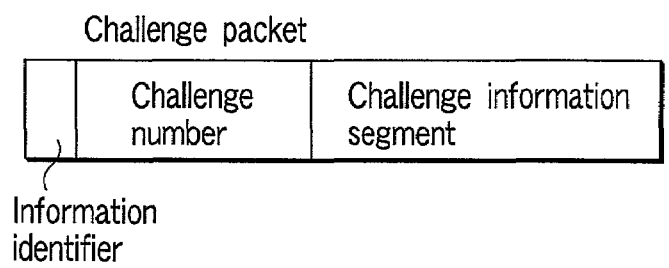
FIG. 54 shows an example of the data format of a challenge packet.

The individual control packet is comprised of an information identifier, master key identifier, and encrypted contract information, as shown in FIG. 53. Note that the contract information is the same as that shown in FIG. 36. The challenge packet is comprised of an information identifier used to identify the challenge packet, a challenge number, and a challenge information segment, as shown in FIG. 54. The challenge number is a management number of an inquiry or question called a challenge sent from the center to the receiver apparatus. Challenges assumed in this embodiment include a challenge for inquiring a receiver ID, a challenge for inquiring a master key identifier, and a challenge for generating a signature in challenge information using a secret key (unique to the receiver apparatus). In addition, a challenge for decrypting encrypted challenge information, and returning the decrypted result as a response is available. When objective data is required like in the challenge for signing using the secret key, that data is described in the challenge information to be sent.

The basis of challenge and response is to make an inquiry that cannot be answered unless information only the receiver apparatus as a destination and the center know is used, and confirm that the receiver apparatus is an authentic apparatus (registered in the center) if a right answer to that inquiry is obtained.

Figure 55:
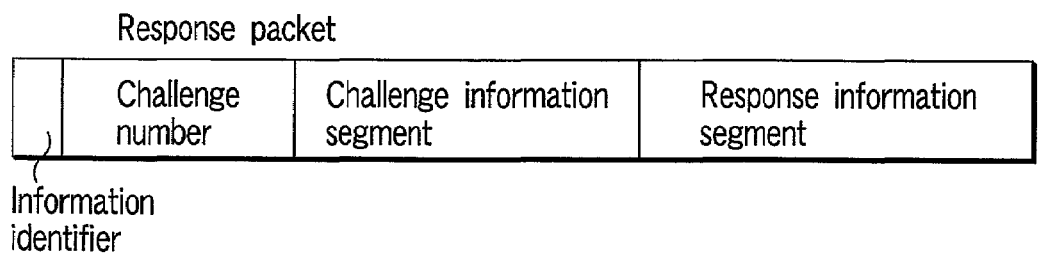
FIG. 55 shows an example of the data format of a response packet.

The response packet is comprised of an information identifier used to identify the response packet, a challenge number, a challenge information segment, and a response information segment, as shown in FIG. 55. Assume that the response information segment has a predetermined format depending on the challenge number (as in the challenge information segment).

FIG. 56 is a flow chart showing the processing operation after the receiver apparatus receives the call originating command, and the processing flow will be explained below using FIG. 56 on the basis of FIG. 50. The receiver apparatus calls the center (step S101), and if a bi-directional communication line is connected between the receiver apparatus and center, the center sends an individual control packet. The inter-center communication analyzer 151 of the receiver apparatus receives the individual control packet via the connected bi-directional communication line, modem 101, and inter-center communication device 152 (step S102). The received packet is passed to the inter-center communication analyzer 151, which identifies the type of packet based on its information identifier.

If the received packet is a challenge packet (step S103), the inter-center communication analyzer 151 passes it to the response generator 152 (step S106). If the received packet is an individual control packet for distributing contract information (step S104), the analyzer 151 passes it to the individual control information decoder 104 (step S107) to execute authentication and storage processes of the individual control information by the same process (steps S3 to S9 in FIG. 9) as in the first embodiment (step S108). If the received packet is neither of them, an error message is sent to the center (step S105).

The generation and transmission processing operations of a response packet will be described below with reference to the flow chart shown in FIG. 57. The response generator 154 confirms the type of challenge with reference to the challenge number in the challenge packet. If the challenge is a receiver ID inquiry (step S111), the response generator 154 extracts the receiver ID from the receiver ID storage 106 (step S115), converts the receiver ID into a predetermined response information format to generate a response packet shown in FIG. 54 (step S116), and sends that packet to the center (step S117). If the challenge is a master key identifier inquiry (step S112), the response generator 154 acquires a master key identifier from the master key storage 103, similarly generates a response packet, and sends that packet to the center (steps S118 to S120).

If the challenge is a signature generation inquiry (step S113), the response generator 154 acquires a challenge information segment as data to be signed from the received packet (step S121), acquires a secret key from the secret key storage 153 (step S122), and generates a signature for the challenge information segment (step S123). The generated signature is converted into the format of a response information segment in accordance with the predetermined format, and is sent in the form of a response packet shown in FIG. 55 to the center (steps S124 and S125). If the received challenge applies to none of the above three challenges, an error message is sent to the center (step S114).

With the above process, the center can send an individual control packet after it confirms the authenticity of the receiver apparatus based on the received response packet. In this embodiment, the receiver apparatus authenticates the information distributor apparatus (center) on the basis of the digital signature appended to the individual control packet (as described in the first embodiment). Hence, mutual authentication between the receiver apparatus and center can be made in this embodiment. However, as described in the first embodiment, such embodiment is not indispensable in the present invention, and an embodiment in which the center authenticates a receiver apparatus as in the present invention is essential.

In the conditional access system in which both the receiver apparatus and center can place a call to (receive) send an individual control packet, a conditional access system that can simultaneously satisfy the 10th and 11th embodiments can be realized. Since the receiver apparatus and center are independent from each other although they use different types of commands (command identifiers), both the embodiments can be practiced at the same time. In this sense, the ninth and 10th embodiments can be considered as embodiments in which a receiver-dependent command packet is sent via a broadcast wave, and an individual control packet for distributing contract information is sent via a bi-directional communication.

In the above embodiments, principal processes are done only within the conditional access device 100. But only the descrambler 120 may be mounted outside the conditional access device 100. The descrambler 120 requires a high-speed process since it must decrypt in real time (since it decrypts broadcast contents). On the other hand, other portions need not always operate and have a slight margin in processing time. Hence, such implementation can provide many advantages. Furthermore, when the receiver apparatus is used common to other broadcast systems, all the broadcast systems may adopt a common scramble system of broadcast contents, and only a conditional access device 100 (that must hold secret information for each broadcast system) may be implemented on a detachable medium such as an IC card or the like.

The present invention is designed to allow each of a plurality of receiver apparatuses for receiving encrypted contents information, which is distributed via broadcast, to select and decrypt contents information to be decrypted using control information (e.g., channel contract information, work key) containing information which is unique to each receiver apparatus and required for each receiver apparatus to select contents information that the receiver apparatus can decrypt. The receiver apparatus stores the control information in a storage device, receives individual control information for each receiver apparatus, which is used to update some or all contents of the control information (e.g., channel contract information+work key, channel contract information alone, work key alone) via bi-directional communications, updates the stored control information, receives key information (e.g., channel key) which is independent from the receiver apparatus and required to decrypt the distributed contents information, and selects and decrypts the distributed contents information on the basis of the key information and control information.

The present invention is designed to allow each of a plurality of receiver apparatuses for receiving encrypted contents information, which is distributed via broadcast, to decrypt contents information to be decrypted using decrypt control information (e.g., channel contract information+work key+master key, channel contract information+master key, work key+master key) containing information which is required to decrypt contents information that each receiver apparatus can decrypt, and is unique to each receiver apparatus. The receiver apparatus stores the decrypt control information in a storage device, receives individual control information for each receiver apparatus, which is used to update some or all contents of the decrypt control information (e.g., channel contract information+work key, channel contract information alone, work key alone) via bi-directional communications, updates the stored decrypt control information, receives key information (e.g., channel key) which is independent from the receiver apparatus and required to decrypt the distributed contents information, and decrypts the distributed contents information on the basis of the key information and decrypt control information.

Preferably, the individual control information is encrypted to be able to be decrypted using key information unique to each receiver apparatus. Preferably, the key information is encrypted to be able to be decrypted using another key information contained in the individual control information. Preferably, the key information is encrypted to be able to be decrypted using another key information generated based on separately received key generation information. Preferably, the individual control information is received after it is certified by a communication partner. Preferably, receipt of the individual control information is acknowledged to the communication partner.

According to the present invention, since each receiver apparatus acquires key information common to all receiver apparatuses via broadcast, and individual control information unique to each receiver apparatus via bi-directional communications such as a public telephone network or the like, a highly secure pay broadcast service that can prevent wrong audience without pressing the broadcast band by distributing a large amount of individual control information even when the number of subscribers increases can be provided.

Since the receiver apparatus receives the individual control information after it sends a use history required to charge a fee for use of the contents information to the communication partner, the audiovisual history indispensable to a PPV service can be easily repossessed, and an audiovisual fee can also be securely and reliably collected.

The present invention is characterized by distributing individual control information used to update some or all contents of decrypt control information, which contains information required to decrypt contents information stored in a receiver apparatus, that receives encrypted contents information distributed via broadcast, and decrypt contents information it can decrypt, and is unique to the receiver apparatus. Preferably, the individual control information is encrypted and distributed to be able to be decrypt using key information unique to the receiver apparatus. Preferably, the individual control information is distributed after the receiver apparatus is certified. Preferably, receipt of the individual control information is acknowledged from the receiver apparatus to confirm if decrypt control information of the receiver apparatus has been updated.

According to the present invention, since each receiver apparatus acquires key information common to all receiver apparatuses via broadcast, and individual control information unique to each receiver apparatus via bi-directional communications such as a public telephone network or the like, a highly secure pay broadcast service that can prevent wrong audience without pressing the broadcast band by distributing a large amount of individual control information even when the number of subscribers increases can be provided.

Since the individual control information is distributed after a use history required to charge a fee for use of the contents information is received from the receiver apparatus, the audiovisual history indispensable to a PPV service can be easily repossessed, and an audiovisual fee can also be securely and reliably collected.

The present invention is characterized by distributing via broadcast key information to a receiver apparatus, which receives encrypted contents information, that is distributed via broadcast, and decrypts contents information it can decrypt, and which receiver apparatus decrypts the distributed contents information on the basis of decrypt control information that contains information which is required to decrypt the contents information and unique to the receiver apparatus, and key information which is independent from the receiver apparatus and required to decrypt the contents information. Preferably, the key information is encrypted and distributed to be able to be decrypted using another key information contained in individual control information used to update some or all contents of the decrypt control information which is distributed independently. Preferably, the key information is encrypted and distributed to be able to be decrypted using another key information generated based on separately distributed key generation information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A broadcast receiving method comprising:
   storing first control information in a storage device of a receiver, the first control information containing identification information unique to the receiver and contract information for selecting some of a plurality of different channels, the first control information required for the receiver to select broadcasted and encrypted contents information, the contract information including a work key encrypted by a master key;

receiving second control information with the receiver via a bi-directional communications channel, the second control information containing contract information for updating;

periodically updating at a first period the contract information of the first control information in the storage device to the contract information contained in the second control information;

sending back a receipt acknowledgement from the receiver via the bi-directional communications channel when the contract information of the first control information is updated;

periodically receiving encrypted key information which is independent of the receiver and broadcasted to decrypt the contents information at a second period shorter than the first period, the encrypted key information being encrypted by the work key;

decrypting the encrypted key information to obtain decrypted key information;

storing the decrypted key information in the storage device;

determining whether the stored decrypted key information is valid based on the contract information; and decrypting the contents information based on the decrypted key information that has been determined to be valid.

2. A broadcast receiving method comprising:

storing first control information in a storage device of a receiver, the first control information containing identification information unique to the receiver and contract information for selecting some of a plurality of different channels, the first control information required for the receiver to select broadcasted and encrypted contents information, the contract information including a work key encrypted by a master key;

receiving second control information with the receiver via a bi-directional communications channel, the second control information containing contract information for updating;

periodically updating at a first period the contract information of the first control information in the storage device to the contract information of the second control information;

sending back a receipt acknowledgement from the receiver via the bi-directional communications channel when the contract information of the first control information is updated;

periodically receiving encrypted key information which is independent of the receiver and broadcasted to decrypt the contents information at a second period shorter than the first period, the encrypted key information being encrypted by the work key;

decrypting the encrypted key information to obtain decrypted key information;

storing the decrypted key information in the storage device;

determining whether the stored decrypted key information is valid based on the contract information; and decrypting the contents information based on the decrypted key information that has been determined to be valid and updated contract information of the first control information.

3. A broadcast receiving apparatus communicating with a first distributor which performs bi-directional communications, and a second distributor which performs a broadcast transmission, comprising:

a storage device configured to store first control information containing identification information and contract information, the first control information being required to select encrypted contents information broadcasted by the second distributor, and the contract information including a work key encrypted by a master key;

a first receiver configured to receive second control information distributed by the first distributor via a bi-directional communications channel, the second control information containing contract information for updating;

an update device configured to periodically update at a first period the contract information of the first control information in the storage device to the contract information of the second control information;

a certifying device configured to send back a receipt acknowledgement via the bi-directional communications channel when the contract information of the first control information is updated;

a second receiver configured to periodically receive encrypted key information broadcasted by the second distributor at a second period shorter than the first period, the encrypted key information being required to decrypt the contents information, the encrypted key common to all broadcast receiving apparatuses and encrypted by the work key;

a key decrypting device configured to decrypt the encrypted key information to obtain decrypted key information and store the decrypted key information in the storage device;

a determination device configured to determine whether the stored decrypted key information is valid based on the contract information; and a contents decrypting device configured to decrypt the contents information based on the decrypted key information that has been determined to be valid.

4. An apparatus according to claim 3, wherein the first receiver receives the second control information after the broadcast receiving apparatus is certified by the first distributor.

5. An apparatus according to claim 3, wherein said first receiver sends a use history required to charge a fee for use of the contents information to the first distributor, and then receives the second control information.

6. A broadcast receiving apparatus communicating with a first distributor which performs bi-directional communications, and a second distributor which performs a broadcast transmission, comprising:

a storage device configured to store first control information containing identification information and contract information, the first control information including contract information for selecting some of a plurality of different channels, the first control information required to decrypt encrypted contents information broadcasted by the second distributor, and the contract information including a work key encrypted by a master key;

a first receiver configured to receive second control information distributed by the first distributor via a bi-directional communications channel, the second control information containing contract information for updating;

an update device configured to periodically update at a first period the contract information of the first control information in the storage device to the contract information of the second control information;

a certifying device configured to send back a receipt acknowledgement via the bi-directional communications channel when the contract information of the first control information is updated;

a second receiver configured to periodically receive encrypted key information broadcasted by the second distributor at a second period shorter than the first period, the encrypted key information being required to decrypt the contents information, the key information common to all broadcast receiving apparatuses and encrypted by the work key;

a key decrypting device configured to decrypt the encrypted key information to obtain decrypted key information and store the decrypted key information in the storage device:

a determination device configured to determine whether the stored decrypted key information is valid based on the contract information; and a contents decrypting device configured to decrypt the contents information based on the decrypted key information that has been determined to be valid and updated contract information of the first control information.

7. An apparatus according to claim 6, wherein the first receiver receives the second control information after the broadcast receiving apparatus is certified by the first distributor.

8. An apparatus according to claim 6, wherein the first receiver sends a use history required to charge a fee for use of the contents information to the first distributor, and then receives the second control information.

9. An information receiving apparatus which communicates with first and second distributors, comprising:

a storage device configured to store first control information required to decrypt broadcasted and encrypted contents information, the first control information containing identification information unique to the receiving apparatus and contract information for selecting some of different channels, the first control information required for the receiving apparatus to select broadcasted and encrypted contents information, the contract information including a work key encrypted by a master key;

a first receiver configured to receive second control information distributed from the first distributor via a bi-directional communication channel, the second control information containing contract information used to update at least contract information of the first control information stored in the storage device or broadcasted by the first distributor;

a transmitter configured to transmit receipt of the information when the first receiver receives the second control information via the bi-directional communications channel;

an update device configured to periodically update at a first period the contract information of the first control information in the storage device to the contract information of the second control information received by the first receiver;

a certifying device configured to send back a receipt acknowledgement via the bi-directional communications channel when the contract information of the first control information is updated;

a second receiver configured to periodically receive encrypted key information broadcasted by the second distributor, the encrypted key information being required to decrypt the encrypted contents information and common to a plurality of broadcast receiving apparatuses at a second period shorter than the first period, the encrypted key information being encrypted by the work key;

a key decrypting device configured to decrypt the encrypted key information to obtain decrypted key information and store the decrypted key information in the storage device;

a determination device configured to determine whether the stored decrypted key information is valid based on the contract information; and a contents decrypting device configured to decrypt the contents information based on the decrypted key information that has been determined to be valid.

* * * * *